United States Patent
Breed et al.

(10) Patent No.: US 6,526,352 B1
(45) Date of Patent: Feb. 25, 2003

(54) METHOD AND ARRANGEMENT FOR MAPPING A ROAD

(75) Inventors: David S. Breed, Boonton Township, Morris County, NJ (US); Wendell C. Johnson, Signal Hill, CA (US); Vittorio Castelli, Yorktown Heights, NY (US); William E. Seitz, Bedford, NH (US); Wilbur E. DuVall, Kimberling City, MO (US)

(73) Assignee: Intelligent Technologies International, Inc., Denville, NJ (US)

( * ) Notice: Subject to any disclaimer, the term of this patent is extended or adjusted under 35 U.S.C. 154(b) by 0 days.

(21) Appl. No.: 09/909,466

(22) Filed: Jul. 19, 2001

(51) Int. Cl.$^7$ .............................................. G06F 165/00
(52) U.S. Cl. ....................... 701/213; 701/200; 701/208; 701/210; 342/357.13
(58) Field of Search ................................ 701/200, 207, 701/208, 210, 213, 214, 215; 340/988, 990, 995; 342/357, 357.13, 357.03

(56) References Cited

U.S. PATENT DOCUMENTS 6,047,234 A * 4/2000 Cherveny et al. ........... 340/988

OTHER PUBLICATIONS

SRI International, Centimeter–Level GPS for Highway Systems, J.W. Sinko et al., Jul. 1998.
SRI International, An Evolutionary Automated Highway System Concept Based on GPS, J.W. Sinko, Sep., 1996 (p. 5, second column to p. 7).
SRI International, Using GPS for Automated Vehicle Convoying, T.M. Nguyen, Sep. 1998.
Autovue: Active Lane Departure Warning System, Odetics.
V. Morellas et al., Preview Based Control of a Tractor trailer Using DGPS for Preventing Road Departure Accidents, 1998 IEEE International Conference on Intelligent Vehicles, pp. 797–805.
S. Bajikar et al., Evaluation of In–Vehicle GPS–Based Lane Position Sensing for Preventing Road Departure, 1998 IEEE International Conference on Intelligent Vehicle, pp. 397–402.
B. Schiller et al., Collison Avoidance for Highway Vehicles Using the Virtual Bumper Controller, 1998 IEEE International Conference on Intelligent Vehicles, pp. 149–155.
M. O'Shea and V. Shuman, Looking Ahead: Map Database in Predictive Positioning and Safety Systems.
J. Pierowicz, Use of Map Data Information in an On–Board Intersection Violation Detection System, 1998, IEEE.
P. Mims, P. Pilkington and J. Blizzard, An Object Oriented Transfer Format for the Future.
P.G. Hardy, Integrating Active Objects with Stereo Images for Map Production, Kartdagar 2000, Gothenburg, Mar. 27, 2000.

(List continued on next page.)

Primary Examiner—William A. Cuchlinski, Jr.
Assistant Examiner—Arthur D. Donnelly
(74) Attorney, Agent, or Firm—Brian Roffe

(57) ABSTRACT

Arrangement and method for mapping a road during travel of a vehicle having two data acquisition modules arranged on sides of the vehicle, each including a GPS receiver and antenna for enabling the vehicle's position to be determined and a linear camera which provides one-dimensional images of an area on the respective side in a vertical plane perpendicular to the road such that information about the road is obtained from a view in a direction perpendicular to the road. A processor unit forms a map database of the road by correlating the vehicle's position and the information about the road. Instead of or in addition to the linear cameras, scanning laser radars are provided and transmit waves downward in a plane perpendicular to the road and receive reflected waves to provide information about distance between the laser radars and the ground for use in forming the database.

40 Claims, 17 Drawing Sheets

OTHER PUBLICATIONS

S. Shekhar and Y Huang, Discovering Spatial Co–location Patterns: A Summary of Results.

P.G. Hardy, Map Production from an Active Object Database Using Dynamic Representation and Automated Generalisation, Oct. 15, 1998.

P.G. Hardy, S57 ECDIS Data Production and Update Using and Object–Oreinted Spatial Database, Jul. 26, 1998.

P.G. Hardy, Mobile Mapping on–demand–Active Representation and Automated Generalisation of Spatial Databases for the Wireless Handheld Information Appliance, Oct. 17, 2000.

P. Hardy and P. Woodsford, Incremental Updating Using the Gothic Versioned Object Database with the Hydrographic S57 ENC and SOTF Spatial Object Transfer Formats, Jul. 9, 2000.

W. Carter and R. Shrestha, Airborne Laser Swath Mapping: Results from Project Laser, SPIE Conference on Laser Radar Technology and Applications III, Apr. 1998, pp. 270–277.

T. Bucher, Measurement of Distance and Height in Images Based on Easy Attainable Calibration Parameters, Proceedings of the IEEE Intelligent Vehicles Symposium 2000, Oct. 3–5, 2000, pp. 314–319.

Lambda Tech Asset Inventory & Digital Mapping Systems, Capturing Road and Railway Network Data Using Mobile Mapping Technology, The GPSVision™ System.

* cited by examiner

Data acquisition module

METHOD AND ARRANGEMENT FOR MAPPING A ROAD

CROSS REFERENCE TO RELATED APPLICATIONS

This application is related to on the grounds that it includes common subject matter as, but does not claim priority from, U.S. patent application Ser. No. 09/679,317 filed Oct. 4, 2000. U.S. patent application Ser. No. 09/523,559 filed Mar. 10, 2000 and U.S. patent application Ser. No. 09/177,041 filed Oct. 22, 1998.

BACKGROUND OF THE INVENTION

Field of the Invention

This invention is in the fields of automobile safety, intelligent highway safety systems, accident avoidance, accident elimination, collision avoidance, blind spot detection, anticipatory sensing, automatic vehicle control, intelligent cruise control, vehicle navigation and other automobile, truck and train safety, navigation and control related fields.

The invention relates generally to methods for mapping a road in which a vehicle-mounted arrangement is used and the vehicle-mounted arrangement.

The invention also relates generally to an apparatus and method for precisely determining the location and orientation of a host vehicle operating on a roadway and location of multiple moving or fixed obstacles that represent potential collision hazards with the host vehicle to thereby eliminate collisions with such hazards. In the early stages of implementation of the apparatus and method and when collisions with such hazards cannot be eliminated, the apparatus and method will generate warning signals and initiate avoidance maneuvers to minimize the probability of a collision and the consequences thereof. More particularly, the invention relates to the use of a Global Positioning System ("GPS"), differential GPS ("DGPS"), other infrastructure-based location aids, cameras, radar and laser radar and an inertial navigation system as the primary host vehicle and target locating system with centimeter accuracy. The invention is further supplemented by a digital computer system to detect, recognize and track all relevant potential obstacles, including other vehicles, pedestrians, animals, and other objects on or near the roadway. More particularly, the invention further relates to the use of centimeter-accurate maps for determining the location of the host vehicle and obstacles on or adjacent the roadway. Even more particularly, the invention further relates to an inter-vehicle and vehicle to infrastructure communication systems for transmitting GPS and DGPS position data, as well as, relevant target data to other vehicles for information and control action, The present invention still further relates to the use of neural networks and neural-fuzzy rule sets for recognizing and categorizing obstacles and generating and developing optimal avoidance maneuvers where necessary.

Automobile accidents are one of the most serious problems facing society today, both in terms of deaths and injuries, and in financial losses suffered as a result of accidents. The suffering caused by death or injury from such accidents is immense. The costs related to medical treatment, permanent injury to accident victims and the resulting loss of employment opportunities, and financial losses resulting from damage to property involved in such accidents are staggering. Providing the improved systems and methods to eventually eliminate these deaths, injuries and other losses deserves the highest priority. The increase in population and use of automobiles worldwide with the concomitant increased congestion on roadways makes development of systems for collision elimination even more urgent. While many advances have been made in vehicle safety, including, for example, the use of seatbelts, airbags and safer automobile structures, much room for improvement exists in automotive safety and accident prevention systems.

There are two major efforts underway that will significantly affect the design of automobiles and highways. The first is involved with preventing deaths and serious injuries from automobile accidents. The second involves the attempt to reduce the congestion on highways. In the first case, there are approximately forty two thousand (42,000) people killed each Year in the United States by automobile accidents and another several hundred thousand are seriously injured. In the second case, hundreds of millions of man-hours are wasted every year by people stuck in traffic jams on the world's roadways. There have been many attempts to solve both of these problems; however, no single solution has been able to do so.

When a person begins a trip using an automobile, he or she first enters the vehicle and begins to drive, first out of the parking space and then typically onto a local or city road and then onto a highway. In leaving the parking space, he or she may be at risk from an impact of a vehicle traveling on the road. The driver must check his or her mirrors to avoid such an event and several electronic sensing systems have been proposed which would warn the driver that a collision is possible. Once on the local road, the driver is at risk of being impacted from the front, side and rear, and electronic sensors are under development to warn the driver of such possibilities. Similarly, the driver may run into a pedestrian, bicyclist, deer or other movable object and various sensors are under development that will warn the driver of these potential events. These various sensors include radar, optical, infrared, ultrasonic. and a variety of others sensors, each of which attempts to solve a particular potential collision event. It is important to note that in none of these cases is there sufficient confidence in the decision that the a control of the vehicle is taken away from the driver. Thus, action by the driver is still invariably required.

In some proposed future Intelligent Transportation System (ITS) designs, hardware of various types is embedded into the highway and sensors which sense this hardware are placed onto the vehicle so that it can be accurately guided along a lane of the highway. In various other systems, cameras are used to track lane markings or other visual images to keep the vehicle in its lane. However, for successful ITS, additional information is needed by the driver, or the vehicle control system, to take into account weather, road conditions, congestion etc., which typically involves additional electronic hardware located on or associated with the highway as well as the vehicle. From this discussion, it is obvious that a significant number of new electronic systems are planned for installation onto automobiles. However, to date, no product has been proposed or designed which combines all of the requirements into a single electronic system. This is the intent of this invention.

The safe operation of a vehicle can be viewed as a process in the engineering sense. To achieve safe operation, first the process must be designed and then a vehicle control system must be designed to implement the process. The goal of a process designer is to design the process so that it does not fail. The fact that so many people are being seriously injured and killed in traffic accidents and the fact that so much time is being wasted in traffic congestion is proof that the current process is not working and requires a major redesign. To design this new process the information required by the process must be identified, the source of that information determined and the process designed so that the sources of information can communicate effectively to the user of the information, which will most often be a vehicle control system. Finally, the process must have feedback that self-corrects the process when it is tending toward failure.

Although it is technologically feasible, it is probably socially unacceptable at this time for a vehicle safety system to totally control the vehicle. The underlying premise of this invention, therefore, is that people will continue to operate their vehicle and control of the vehicle will only be seized by the control system when such an action is required to avoid an accident or when such control is needed for the orderly movement of vehicles through potentially congested areas on a roadway. When this happens, the vehicle operator will be notified and given the choice of exiting the road at the next opportunity. In some implementations, especially when this invention is first implemented on a trail basis, control will not be taken away from the vehicle operator but a warning system will alert the driver of a potential collision, road departure or other infraction.

Let us consider several scenarios and what information is required for the vehicle control process to prevent accidents. In one case, a driver is proceeding down a country road and falls asleep and the vehicle begins to leave the road, perhaps heading toward a tree. In this case, the control system would need to know that the vehicle was about to leave the road and for that it must know the position of the vehicle relative to the road. One method of accomplishing this would be to place a wire down the center of the road and to place sensors within the vehicle to sense the position of the wire relative to the vehicle. An alternate approach would be for the vehicle to know exactly where it is on the surface of the earth and to also know exactly where the edge of the road is.

These approaches are fundamentally different because in the former solution every road in the world would require the placement of appropriate hardware as well as the maintenance of this hardware. This is obviously impractical. In the second case, the use of the global positioning satellite system (GPS), augmented by additional systems to be described below, will provide the vehicle control system with an accurate knowledge of its location. Whereas it would be difficult to install and maintain hardware such as a wire down the center of the road for every road in the world, it is not difficult to survey every road and record the location of the edges, and the lanes for that matter, of each road. This information must then be made available through one or more of a variety of techniques to the vehicle control system.

Another case might be where a driver is proceeding down a road and decides to change lines while another vehicle is in the driver's blind spot. Various companies are developing radar, ultrasonic or optical sensors to warn the driver if the blind spot is occupied. The driver may or may not heed this warning, perhaps due to an excessive false alarm rate, or he or she may have become incapacitated, or the system may fail to detect a vehicle in the blind spot and thus the system will fail.

Consider an alternative technology where again each vehicle knows precisely where it is located on the earth surface and additionally can communicate this information to all other vehicles within a certain potential danger zone relative to the vehicle. Now, when the driver begins to change lanes, his or her vehicle control system knows that there is another vehicle in the blind spot and therefore will either warn the driver or else prevent him or her from changing lanes thereby avoiding the accident.

Similarly, if a vehicle is approaching a stop sign or red traffic light and the operator fails to bring the vehicle to a stop, if the existence of this traffic light or stop sign has been made available to the vehicle control system, the system can warn the driver or seize control of the vehicle to stop the vehicle and prevent a potential accident. Additionally, if an operator of the vehicle decides to proceed across an intersection without seeing an oncoming vehicle, the control system will once again know the existence and location and perhaps velocity of the oncoming vehicle and warn or prevent the operator from proceeding across the intersection.

Consider another example where water on the surface of a road is beginning to freeze. Probably the best way that a vehicle control system can know that the road is about to become slippery, and therefore that the maximum vehicle speed must be significantly reduced, is to get information from some external source. This source can be sensors located on the highway that are capable of determining this condition and communicating it to the vehicle. Alternately, the probability of icing occurring can be determined analytically from meteorological data and a historical knowledge of the roadway and communicated to the vehicle over a LEO satellite system, the Internet or an FM sub-carrier or other means. A combination of these systems can also be used.

Studies have shown that a combination of meteorological and historic data can accurately predict that a particular place on the highway will become covered with ice. This information can be provided to properly equipped vehicles so that the vehicle knows to anticipate slippery roads. For those roads that are treated with salt to eliminate frozen areas, the meteorological and historical data will not be sufficient. Numerous systems are available today that permit properly equipped vehicles to measure the coefficient of friction between the vehicle's tires and the road. It is contemplated that perhaps police or other public vehicles will be equipped with such a friction coefficient measuring apparatus and can serve as probes for those roadways that have been treated with salt. Information from these probe vehicles will be fed into the information system that will then be made available to control speed limits in the those areas.

Countless other examples exist, however, from those provided above it can be seen that for the vehicle control system to function without error, certain types of information must be accurately provided. These include information permitting the vehicle to determine its absolute location and means for vehicles near each other to communicate this location information to each other. Additionally, map information that accurately provides boundary and lane information of the road must be available. Also, critical weather or road-condition information is necessary. The road location information need only be generated once and changed whenever the road geometry is altered. This information can be provided to the vehicle through a variety of techniques including prerecorded media such as CD-ROM or DVD disks or through communications from transmitters located in proximity to the vehicle, satellites, radio and cellular phones.

Consider now the case of the congested highway. Many roads in the world are congested and are located in areas where the cost of new road construction is prohibitive or such construction is environmentally unacceptable. It has been reported that an accident on such a highway typically ties up traffic for a period of approximately four times the time period required to clear the accident. Thus, by eliminating accidents, a substantial improvement of the congested highway problem results. This of course is insufficient. On such highways, each vehicle travels with a different spacing, frequently at different speeds and in the wrong lanes. If the proper spacing of the vehicles could be maintained, and if the risk of an accident could be substantially eliminated, vehicles under automatic control could travel at substantially higher velocities and in a more densely packed configuration thereby substantially improving the flow rate of vehicles on the highway by as much as a factor of 3 to 4 times. This not only will reduce congestion but also improve air pollution. Once again, if each vehicle knows exactly where it is located, can communicate its location to surrounding vehicles and knows precisely where the road is located, then the control system in each vehicle has sufficient information to accomplish this goal.

Again the intent of the system and process described here is to totally eliminate automobile accidents as well as reduce highway congestion. This process is to be designed to have no defective decisions. The process employs information from a variety of sources and utilizes that information to prevent accidents and to permit the maximum vehicle throughput on highways.

The information listed above is still insufficient. The geometry of a road or highway can be determined once and for all, until erosion or construction alters the road. Properly equipped vehicles can know their location and transmit that information to other properly equipped vehicles. There remains a variety of objects whose location is not fixed, which have no transmitters and which can cause accidents. These objects include broken down vehicles, animals such as deer which wander onto highways, pedestrians, bicycles, objects which fall off of trucks, and especially other vehicles which are not equipped with location determining systems and transmitters for transmitting that information to other vehicles. Part of this problem can be solved for congested highways by restricting access to these highways to vehicles that are properly equipped. Also, these highways are typically in urban areas and access by animals can be effectively eliminated. Heavy fines can be imposed on vehicles that drop objects onto the highway. Finally. since every vehicle and vehicle operator becomes part of the process, each such vehicle and operator becomes a potential source of information to help prevent catastrophic results. Thus, each vehicle should also be equipped with a system of essentially stopping the process in an emergency. Such a system could be triggered by vehicle sensors detecting a problem or by the operator strongly applying the brakes, rapidly turning the steering wheel or by activating a manual switch when the operator observes a critical situation but is not himself in immediate danger. An example of the latter case is where a driver witnesses a box falling off of a truck in an adjacent lane.

To solve the remaining problems, therefore, each vehicle should also be equipped with an anticipatory collision sensing system, or collision forecasting system, which is capable of identifying or predicting and reacting to a pending accident. As the number of vehicles equipped with the control system increases, the need for the collision forecasting system will diminish.

Once again, the operator will continue to control his vehicle provided he or she remains within certain constraints. These constraints are like a corridor. As long as the operator maintains his vehicle within this allowed corridor, he or she can operate that vehicle without interference from the control system. That corridor may include the entire width of the highway when no other vehicles are present or it may be restricted to all eastbound lanes, for example. In still other cases, that corridor may be restricted to a single line and additionally, the operator may be required to keep his vehicle within a certain spacing tolerance from the preceding vehicle. If a vehicle operator wishes to exit a congested highway, he could operate his turn signal that would inform the control system of this desire and permit the vehicle to safely exit from the highway. It can also inform other adjacent vehicles of the operator's intent, which could then automatically cause those vehicles to provide space for lane changing, for example. The highway control system is thus a network of individual vehicle control systems rather than a single highway resident computer system.

U.S. Department of Transportation (DOT) Policy

In the DOT. FY 2000 Budget in Brief Secretary Rodney Slater states that "Historic levels of federal transportation investment . . . are proposed in the FY 2000 budget." Later, Secretary Slater states that "Transportation safety is the number one priority." DOT has estimated that $165 billion per year are lost in fatalities and injuries on U.S. roadways. Another $50 billion are lost in wasted time of people on congested highways. Presented herein is a plan to eliminate fatalities and injuries and to substantially reduce congestion. The total cost of implementing this plan is minuscule compared to the numbers stated above. This plan has been named "The Road to Zero Fatalities™", or RtZF™ for short.

In the DOT Performance Plan FY 2000. Strategic Goal: Safety, it is stated that "The FY 2000 budget process proposes over $3.4 billion for direct safety programs to meet this challenge." The challenge is to "Promote the public health and safety by working toward the elimination of traffic related deaths, injuries and property damage". The goal of the RtZF is the same and herein a plan is presented for accomplishing this goal. The remainder of the DOT discussion centers around wishful thinking to reduce the number of transportation related deaths, injuries, etc. However, the statistics presented show that in spite of this goal, the number of deaths is now increasing. As discussed below, this is the result of a failed process.

Reading through the remainder of the DOT Performance Plan FY 2000, one is impressed by the billions of dollars that are being spent to solve the highway safety problem coupled with the enormous improvement that has been made until the last few years. It can also be observed that the increase in benefits from these expenditures has now disappeared. For example, the fatality rate per 100 million vehicle miles traveled fell from 5.5 to 1.7 in the period from the mid-1960s to 1994. But this decrease has now substantially stopped! This is an example of the law of diminishing returns and signals the need to take a totally new approach to solving this problem.

U.S. Intelligent Vehicle Initiative (IVI) Policy

Significant funds have been spent on demonstrating various ITS technologies. It is now time for implementation. With over 40,000 fatalities and almost four million people being injured every year on US roadways, it is time to take affirmative action to stop this slaughter. The time for studies and demonstrations is past. However, the deployment of technologies that are inconsistent with the eventual solution of the problem will only delay implementation of the proper systems and thereby result in more deaths and injuries.

A primary goal of the Intelligent Vehicle Initiative is to reduce highway related fatalities per 100 million vehicle miles traveled from 1.7 in 1996 to 1.6 in 2000. Of course the number of fatalities may still increase due to increased road use. If this reduction in fatalities comes about due to slower travel speeds, because of greater congestion, then has anything really been accomplished? Similar comments apply to the goal of reducing the rate of injury per 100 million vehicle miles from 141 in 1996 to 128 in 2000. An alternate goal is to have the technology implemented on all new vehicles by the year 2010 that will eventually eliminate all fatalities and injuries. As an intermediate milestone, it is proposed to have the technology implemented on all new vehicles by 2007 to reduce or eliminate fatalities caused by road departure, yellow line crossing, stop sign infraction, rear end and excessive speed accidents. The invention described herein will explain how these are goals can be attained.

In the IVI Investment Strategy, Critical Technology Elements And Activities of the DOT, it saves "The IVI will continue to expand these efforts particularly in areas such as human factors, sensor performance, modeling and driver acceptance". An alternate, more effective, concentration for investments would be to facilitate the deployment of those technologies that will reduce and eventually eliminate highway fatalities. Driver acceptance and human factors will be discussed below. Too much time and resources have already been devoted to these areas. Modeling can be extremely valuable and sensor performance is in a general sense a key to eliminating fatalities.

On Jul. 15, 1998, the IVI light vehicle steering committee met and recommended that the IVI program should be conducted as a government industry partnership like the PNGV. This is wrong and the IVI should now move vigorously toward the deployment of proven technology. The time has past for endless committee meetings, seminars and planning sessions.

The final recommendations of the committee was "In the next five years, the IVI program should be judged on addressing selected impediments preventing deployment, not on the effect of IVI services on accident rates." This is a mistake. The emphasis for the next five years should be to deploy proven technologies and to start down the Road to Zero Fatalities™. Five years from now technology should be deployed on production vehicles sold to the public that have a significant effect toward reducing fatalities and injuries.

As described in the paper "Preview Based Control of A Tractor Trailer Using DGPS For Preventing Road Departure Accidents" the basis of the technology proposed has been demonstrated.

REVIEW OF RELEVANT PRIOR ART

The complete disclosure of the following patents is incorporated by reference herein in their entirety. Also, the systems disclosed in the patents may be used in the invention in appropriate part.

a. Vehicle Collision Warning and Control

The ALVINN project of Carnegie Mellon University describes an autonomous land vehicle using a neural network. The neural network is trained based on how a driver drives the vehicle given the output from a video camera. The output of the neural network is the direction that the vehicle should head based on the input information from the video camera and the training based on what a good driver would do. Such a system can be used in the present invention to guide a vehicle to a safe stop in the event that the driver becomes incapacitated or some other emergency situation occurs wherein the driver is unable to control the vehicle. The input to the neural network in this case would be the map information rather than a video camera. Additionally, the laser radar imaging system of this invention could also be an input to the system. This neural network system can additionally take over in the event that an accident becomes inevitable. Simple neural networks are probably not sufficient for this purpose and neural fuzzy and modular neural networks are probably required.

U.S. Pat. No. 5,479,173 to Yoshioka, et al. uses a steering angle sensor, a yaw rate sensor and a velocity of the vehicle sensor to predict the path that the vehicle will take. It uses a radar unit to identify various obstacles that may be in the path of the vehicle, and it uses a CCD camera to try to determine that the road is changing direction in front of the vehicle. No mention is made of the accuracy with which these determinations are made. It is unlikely that sub-meter accuracy is achieved. If an obstacle is sensed the brakes can be automatically activated.

U.S. Pat, No. 5,540,298 to Yoshioka, et al. is primarily concerned with changing the suspension and steering characteristics of the vehicle in order to prevent unstable behavior of the vehicle in response to the need to exercise a collision avoidance maneuver. The collision anticipation system consists of an ultrasonic unit and two optical laser radar units.

U.S. Pat. No. 5,572,428 to Ishida is concerned with using a radar system plus a yaw rate sensor and a velocity sensor to determine whether a vehicle will collide with another vehicle based on the area occupied by each vehicle. Naturally, since radar cannot accurately determine this area it has to be assumed by the system.

U.S. Pat. No. 5,613,039 to Wang, et al. is a collision warning radar system utilizing a real time adaptive probabilistic neural network. Wang discloses that 60% of roadway collisions could be avoided if the operator of the vehicle was provided warning at least one-half second prior to a collision. The radar system used by Wang consists of two separate frequencies. The reflective radar signals are analyzed by a probabilistic neural network that provides an output signal indicative of the likelihood and threat of a collision with a particular object. The invention further includes a Fourier transform circuit that converts the digitized reflective signal from a time series to a frequency representation. It is important to note that in this case, as in the others above, true collision avoidance will not occur since, without a knowledge of the roadway, two vehicles can be approaching each other on a collision course, each following a curved lane on a highway and yet the risk of collision is minimal due to the fact that each vehicle remains in its lane. Thus, true collision avoidance cannot be obtained without an accurate knowledge of the road geometry.

U.S. Pat. No. 5,983,161 to Lemelson describes a GPS-based collision avoidance and warning system that contains some of the features of the present invention. This patent is primarily concerned with using centimeter-accuracy DGPS systems to permit vehicles on a roadway to learn and communicate their precise locations to other vehicles. In that manner, a pending collision can, in some cases, be predicted.

Lemelson does not use an inertial navigation system for controlling the vehicle between GPS updates. Thus, the vehicle can travel a significant distance before its position can be corrected. This can lead to significant errors. Lemelson also does not make use of accurate map database and thus it is unable to distinguish cases where two cars are on separate lanes but on an apparent collision course. Although various radar and lidar systems are generally disclosed, the concept of range gating is not considered. Thus, the Lemelson system is unable to provide the accuracy and reliability required by the Road to Zero Fatalities system described herein.

b. Accurate Navigation

U.S. Pat. No. 5,504,482 to Schreder describes an automobile equipped with an inertial and satellite navigation system as well as a local area digitized street map. The main use of this patent is for route guidance in the presence of traffic jams, etc. Schreder describes how information as to the state of the traffic on a highway can be transmitted and utilized by a properly equipped vehicle to change the route the driver would take in going to his destination. Schreder does not disclose sub-meter vehicle location accuracy determination, nevertheless, this patent provides a good picture of the state of the art as can be seen from the following quoted paragraphs:

". . . there exists a wide range of technologies that have disadvantageously not been applied in a comprehensive integrated manner to significantly improve route guidance, reduce pollution, improve vehicular control and increase safety associated with the common automobile experience. For example, it is known that gyro based inertial navigation systems have been used to generate three-dimensional position information, including exceedingly accurate acceleration and velocity information over a relatively short travel distance, and that GPS satellite positioning systems can provide three-dimensional vehicular positioning and epoch timing, with the inertial system being activated when satellite antenna reception is blocked during "drop out" for continuous precise positioning. It is also known that digitized terrain maps can be electronically correlated to current vehicular transient positions, as have been applied to military styled transports and weapons. For another example, it is also known that digitally encoded information is well suited to RF radio transmission within specific transmission carrier bands, and that automobiles have been adapted to received AM radio, FM radio, and cellular telecommunication RF transmissions. For yet another example, it is further known that automobile electronic processing has been adapted to automatically control braking, steering, suspension and engine operation, for example, anti-lock braking, four-wheel directional steering, dynamic suspension stiffening during turns and at high speeds, engine governors limiting vehicular speed, and cruise control for maintaining a desired velocity. For still another example, traffic monitors, such as road embedded magnetic traffic light sensor loops and road surface traffic flow meters have been used to detect traffic flow conditions. While these sensors, meters, elements, systems and controls have served limited specific purposes, the prior art has disadvantageously failed to integrate them in a comprehensive fashion to provide a complete dynamic route guidance, dynamic vehicular control, and safety improvement system."

"Recently, certain experimental integrated vehicular dynamic guidance systems have been proposed. Motorola has disclosed an Intelligent Vehicle Highway System in block diagram form in copyright dated 1993 brochure. Delco Electronics has disclosed another Intelligent Vehicle Highway System also in block diagram form in Automotive News published on Apr. 12, 1993. These systems use compass technology for vehicular positioning. However, displacement wheel sensors are plagued by tire slippage, tire wear and are relatively inaccurate requiring recalibration of the current position. Compasses are inexpensive, but suffer from drifting particularly when driving on a straight road for extended periods. Compasses can sense turns, and the system may then be automatically recalibrated to the current position based upon sensing a turn and correlating that turn to the nearest turn on a digitized map, but such recalibration, is still prone to errors during excessive drifts. Moreover, digitized map systems with the compass and wheel sensor positioning methods operate in two dimensions on a three dimensional road terrain injecting further errors between the digitized map position and the current vehicular position due to a failure to sense the distance traveled in the vertical dimension."

"These Intelligent Vehicle Highway Systems appear to use GPS satellite reception to enhance vehicular tracking on digitized road maps as part of a guidance and control system. These systems use GPS to determine when drift errors become excessive and to indicate that recalibration is necessary. However, the GPS reception is not used for automatic accurate recalibration of current vehicular positioning, even though C-MIGITS and like devices have been used for GPS positioning, inertial sensing and epoch time monitoring, which can provide accurate continuous positioning."

"These Intelligent Vehicle Highway Systems use the compass and wheel sensors for vehicular positioning for route guidance, but do not use accurate GPS and inertial route navigation and guidance and do not use inertial measuring units for dynamic vehicular control. Even though dynamic electronic vehicular control, for example, anti-lock braking, anti-skid steering, and electronic control suspension have been contemplated by others, these systems do not appear to functionally integrate these dynamic controls with an accurate inertial route guidance system having an inertial measuring unit well suited for dynamic motion sensing. There exists a need to further integrate and improve these guidance systems with dynamic vehicular control and with improved navigation in a more comprehensive system."

"These Intelligent Vehicle Highway Systems also use RF receivers to receive dynamic road condition information for dynamic route guidance, and contemplate infrastructure traffic monitoring, for example, a network for road magnetic sensing loops, and contemplate the RF broadcasting of dynamic traffic conditions for dynamic route guidance. The disclosed two-way RF communication through the use of a transceiver suggests a dedicated two-way RF radio data system. While two-way RF communication is possible, the flow of necessary information between the vehicles and central system appears to be exceedingly lopsided. The flow of information from the vehicles to a central traffic radio data control system may be far less than the required information from traffic radio data control system to the vehicles. It seems that the amount of broadcasted dynamic traffic flow information to the vehicles would be far greater than the information transmitted from the vehicles to the central traffic control center. For example, road side incident or accident emergency, messages to a central system may occur far less than the occurrences of congested traffic points on a digitized map having a large number of road coordinate points."

"Conserving bandwidth capacity is an objective of RF communication systems. The utilization of existing infra structure telecommunications would seem cost-effective. AT&T has recently suggested improving the existing cellular communication network with high-speed digital cellular communication capabilities. This would enable the use of cellular telecommunications for the purpose of transmitting digital information encoding the location of vehicular incidents and accidents. It then appears that a vehicular radio data system would be cost-effectively used for unidirectional broadcasting of traffic congestion information to the general traveling public, while using existing cellular telecommunication systems for transmitting emergency information. The communication system should be adapted for the expected volume of information. The Intelligent Vehicular Highway Systems disadvantageously suggest a required two-way RF radio data system. The vast amount of information that can be transmitted may tend to expand and completely occupy a dedicated frequency bandwidth. To the extent that any system is bi-directional in operation tends to disadvantageously require additional frequency bandwidth capacity and system complexity."

c. Vehicle Location

Three attempts to improve the position accuracy of GPS are discussed here, the Wide Area Augmentation System (WAAS), the Local Area Augmentation System (LAAS) and various systems that make use of the carrier phase.

A paper by S. Malys et al., titled "The GPS Accuracy Improvement Initiative" provides a good discussion of the errors inherent in the GPS system without using differential corrections. It is there reported that the standard GPS provides a 9-meter RMS 3-D navigational accuracy to authorize precise positioning service users. This reference indicates that there are improvements planned in the GPS system that will further enhance its accuracy. The accuracies of these satellites independently of the accuracies of receiving units is expected to be between 1 and 1.5 meters RMS. Over the past eight years of GPS operations, a 50% (4.6 meter to 2.3 meter) performance improvement has been observed for the signal in space range errors. This, of course, is the RMS error. The enhancements contained in the accuracy improvement initiative will provide another incremental improvement from the current 2.3 meters to 1.3 meters and perhaps to as low as 40 centimeters.

Pullen, Samuel, Enge, Per and Parkinson, Bradford, "Simulation-Based Evaluation of WAAS Performance: Risk and Integrity Factors" discusses the accuracy that can be expected from the WAAS system. This paper indicates that the standard deviation for WAAS is approximately 1 meter. To get more accurate results requires more closely spaced differential stations. Using DGPS stations within 1,500 kilometers from the vehicle, high accuracy receivers can determine a location within 3 meters accuracy for DGPS according to the paper. Other providers of DGPS corrections claim considerably better accuracies.

From a paper by J. F. Zumberge, M. M. Watkins and F. H. Webb, titled "Characteristics and Applications of Precise GPS Clock Solutions Every 30 Seconds", Journal of the Institute of Navigation, Vol. 44, No. 4, Winter 1997–1998, it appears that using the techniques described in this reference that the WAAS system could eventually be improved to provide accuracies in the sub-decimeter range for moving vehicles without the need for differential other GPS systems. This data would be provided every 30 seconds.

W. I. Bertiger et al., "A Real-Time Wide Area Differential GPS System", Journal of the Institute of Navigation, Vol. 44. No. 4, Winter 1997–1998. This paper describes the software that is to be used with the WAAS System. The WAAS System is to be completed by 2001. The goal of the research described in this paper is to achieve sub-decimeter accuracies worldwide, effectively equaling local area DGPS performance worldwide. The full computation done on a Windows NT computer adds only about 3 milliseconds. The positioning accuracy is approximately 25 centimeters in the horizontal direction. That is the RMS value so that gives an error at ±3 sigma of 1.5 meters. Thus, this real time wide area differential GPS system is not sufficiently accurate for the purposes of this invention. Other systems claim higher accuracies.

According to the paper by R. Braff, titled "Description of the FAA's Local Area Augmentation System (LAAS)", Journal of the Institute of Navigation, Vol. 44, No. 4, Winter 1997–1998, the LAAS System is the FAA's ground-based augmentation system for local area differential GPS. It is based on providing corrections of errors that are common to both ground-based and aircraft receivers. These corrections are transmitted to the user receivers via very high frequency VHF, line of sight radio broadcast. LAAS has the capability of providing accuracy on the order of 1 meter or better on the final approach segment and through rollout. LAAS broadcasts navigational information in a localized service volume within approximately 30 nautical miles of the LAAS ground segment.

O'Connor, Michael, Bell, Thomas, Elkaim, Gabriel and Parkinson, Bradford, "Automatic Steering of Farm Vehicles Using GPS" describes an automatic steering system for farm vehicles where the vehicle lateral position error never deviated by more than 10 centimeters, using a carrier phase differential GPS system whereby the differential station was nearby.

The following quote is from Y. M. Al-Haifi et al., "Performance Evaluation of GPS Single-Epoch On-the Fly Ambiguity Resolution", Journal of the Institute of Navigation, Vol. 44, No. 4, Winter 1997–1998. This technique demonstrates sub-centimeter precision results all of the time provided that at least five satellites are available and multipath errors are small. A resolution of 0.001 cycles is not at all unusual for geodetic GPS receivers. This leads to a resolution on the order of 0.2 millimeters. In practice, multipath affects, usually from nearby surfaces, limit the accuracy achievable to around 5 millimeters. It is currently the case that the reference receiver can be located within a few kilometers of the mobile receiver. In this case, most of the other GPS error sources are common. The only major problem, which needs to be solved to carry out high precision kinematic GPS, is the integer ambiguity problem. This is because at any given instant the whole number of cycles between the satellite and the receiver is unknown. The recovery of the unknown whole wavelengths or integer ambiguities is therefore of great importance to precise phase positioning. Recently, a large amount of research has focused on so called on the fly (OTF) ambiguity resolution methodologies in which the integer ambiguities are solved for while the unknown receiver is in motion.

The half-second processing time required for this paper represents 44 feet of motion for a vehicle traveling at 60 mph, which would be intolerable unless supplemented by an inertial navigation system. The basic guidance system in this case would have to be the laser or MEMS gyro on the vehicle. With a faster PC, one-tenth a second processing time would be achievable, corresponding to approximately 10 feet of motion of the vehicle, putting less reliance on the laser gyroscope. Nowhere in this paper is the use of this system on automobiles suggested. The technique presented in this paper is a single epoch basis (OTF) ambiguity resolution procedure that is insensitive to cycle slips. This system requires the use of five or more satellites which suggests that additional GPS satellites may need to be launched to make the smart highway system more accurate.

F. van Diggelen. "GPS and GPS+GLONASS RTK", ION-GPS, September 1997 "New Products Descriptions", gives a good background of real time kinematic systems using the carrier frequency. The products described in this paper illustrate the availability of centimeter level accuracies for the purposes of the RtZF system. The product described in F. van Diggelen requires a base station that is no further than 20 kilometers away.

A paper by J. Wu and S. G. Lin, titled "Kinematic Positioning with GPS Carrier Phases by Two Types of Wide Laning", Journal of the Institute of Navigation, Vol. 44, No. 4, Winter 1997 discloses that the solution of the integer ambiguity problem can be simplified by performing other constructs other than the difference between the two phases. One example is to use three times one phase angle, subtracted from four times another phase angle. This gives a wavelength of 162.8 centimeters vs. 86.2 for the single difference. Preliminary results with a 20-kilometer base line show a success rate as high as 95% for centimeter level accuracies.

A paper by R. C. Hayward et al., titled "Inertially Aided GPS Based Attitude Heading Reference System (AHRS) for General Aviation Aircraft" provides the list of inertial sensors that can be used with the teachings of this invention.

K. Ghassemi et al., "Performance Projections of GPS IIF", describes the performance objectives for a new class of GPS 2F satellites to be launched in late 2001.

Significant additional improvement can be obtained for the WAAS system using the techniques described in the paper "Incorporation of orbital dynamics to improve wide-area differential GPS" which is included herein by reference.

Singh, Daljit and Grewal, Harkirat, "Autonomous Vehicle using WADGPS", discusses ground vehicle automation using wide-area DGPS. Though this reference describes many of the features of the present invention, it does not disclose sub-meter accuracy or sub-meter accurate mapping.

U.S. Pat. No. 5,272,483 to Kato describes an automobile navigation system. This invention attempts to correct for the inaccuracies in the GPS system through the use of an inertial guidance, geomagnetic sensor, or vehicle crank shaft speed sensor. However, it is unclear as to whether the second position system is actually more accurate than the GPS system. This combined system, however, cannot be used for sub-meter positioning of an automobile.

U.S. Pat. No. 5,383,127 to Shibata uses map matching algorithms to correct for errors in the GPS navigational system to provide a more accurate indication of where the vehicle is or, in particular, on what road the vehicle is. This procedure does not give sub-meter accuracy. Its main purpose is for navigation and, in particular, in determining the road on which the vehicle is traveling.

U.S. Pat. No. 5,416,712 to Geier, et al. relates generally to navigation systems and more specifically to global positioning systems that use dead reckoning apparatus to fill in as backup during periods of GPS shadowing such as occur amongst obstacles, e.g., tall buildings in large cities. This patent shows a method of optimally combining the information available from GPS even when less than 3 or 4 satellites are available with information from a low-cost, inertial gyro, having errors that range from 1–5%. This patent provides an excellent analysis of how to use a modified Kalman filter to optimally use the available information.

U.S. Pat. No. 5,606,506 to Kyrtsos provides a good background of the GPS satellite system. It discloses a method for improving the accuracy of the GPS system using an inertial guidance system. This is based on the fact that the GPS signals used by Kyrtsos do not contain a differential correction and the selective access feature is on. Key paragraphs from this application that is applicable to the instant invention follow.

"Several national governments, including the United States (U.S.) of America, are presently developing a terrestrial position determination system, referred to generically as a global positioning system (GPS). A GPS is a satellite-based radio-navigation system that is intended to provide highly accurate three-dimensional position information to receivers at or near the surface of the Earth.

"The U.S. government has designated its GPS the "NAVSTAR." The NAVSTAR GPS is expected to be declared fully operational by the U.S. government in 1993. The government of the former Union of Soviet Socialist Republics (USSR) is engaged in the development of a GPS known as "GLONASS". Further, two European systems known as "NAVSAT" and "GRANAS" are also under development. For ease of discussion, the following disclosure focuses specifically on the NAVSTAR GPS. The invention, however, has equal applicability to other global positioning systems. "In the NAVSTAR GPS, it is envisioned that four orbiting GPS satellites will exist in each of six separate circular orbits to yield a total of twenty-four GPS satellites. Of these, twenty-one will be operational and three will serve as spares. The satellite orbits will be neither polar nor equatorial but will lie in mutually orthogonal inclined planes."

"Each GPS satellite will orbit the Earth approximately once every 12 hours. This coupled with the fact that the Earth rotates on its axis once every twenty-four hours causes each satellite to complete exactly two orbits while the Earth turns one revolution."

"The position of each satellite at any given time will be precisely known and will be continuously transmitted to the Earth. This position information, which indicates the position of the satellite in space with respect to time (GPS time), is known as ephemeris data."

"In addition to the ephemeris data, the navigation signal transmitted by each satellite includes a precise time at which the signal was transmitted. The distance or range from a receiver to each satellite may be determined using this time of transmission which is included in each navigation signal. By noting the time at which the signal was received at the receiver, a propagation time delay can be calculated. This time delay when multiplied by the speed of propagation of the signal will yield a "pseudorange" from the transmitting satellite to the receiver."

"The range is called a "pseudorange" because the receiver clock may not be precisely synchronized to GPS time and because propagation through the atmosphere introduces delays into the navigation signal propagation times. These result, respectively, in a clock bias (error) and an atmospheric bias (error). Clock biases may be as large as several milliseconds."

"Using these two pieces of information (the ephemeris data and the pseudorange) from at least three satellites, the position of a receiver with respect to the center of the Earth can be determined using passive triangulation techniques."

"Triangulation involves three steps. First, the position of at least three satellites in "view" of the receiver must be determined. Second, the distance from the receiver to each satellite must be determined. Finally, the information from the first two steps is used to geometrically determine the position of the receiver with respect to the center of the Earth."

"Triangulation, using at least three of the orbiting GPS satellites, allows the absolute terrestrial position (longitude, latitude, and altitude with respect to the Earth's center) of any Earth receiver to be computed via simple geometric theory. The accuracy of the position estimate depends in part on the number of orbiting GPS satellites that are sampled. Using more GPS satellites in the computation can increase the accuracy of the terrestrial position estimate."

"Conventionally, four GPS satellites are sampled to determine each terrestrial position estimate. Three of the satellites are used for triangulation, and a fourth is added to correct for the clock bias described above. If the receiver's clock were precisely synchronized with that of the GPS satellites, then this fourth satellite would not be necessary. However, precise (e.g., atomic) clocks are expensive and are, therefore, not suitable for all applications."

"For a more detailed discussion on the NAVSTAR GPS, see Parkinson, Bradford W. and Gilbert, Stephen W., "NAVSTAR: Global Positioning System—Ten Years Later, "Proceedings of the WEEE, Vol. 71, No. 10, October 1983; and GPS: A Guide to the Next Utility, published by Trimble Navigation Ltd., Sunnyvale, Calif., 1989, pp. 147, both of which are incorporated herein by reference. For a detailed discussion of a vehicle positioning/navigation system which uses the NAVSTAR GPS, see commonly owned U.S. patent application Ser. No. 07/628,560, entitled "Vehicle Position Determination System and Method," filed Dec. 3, 1990, which is incorporated herein by reference."

"The NAVSTAR GPS envisions two modes of modulation for the carrier wave using pseudorandom signals. In the first mode, the carrier is modulated by a "C/A signal" and is referred to as the "Coarse/Acquisition mode". The Coarse/Acquisition or C/A mode is also known as the "Standard Positioning Service". The second mode of modulation in the NAVSTAR GPS is commonly referred to as the "precise" or "protected" (P) mode. The P-mode is also known as the "Precise Positioning Service".

The P-mode is intended for use only by Earth receivers specifically authorized by the United States government. Therefore, the P-mode sequences are held in secrecy and are not made publicly available. This forces most GPS users to rely solely on the data provided via the C/A mode of modulation (which results in a less accurate positioning system).

"Moreover, the U.S. government (the operator of the NAVSTAR GPS) may at certain times introduce errors into the C/A mode GPS data being transmitted from the GPS satellites by changing clock and/or ephemeris parameters. That is, the U.S. government can selectively corrupt the GPS data. The ephemeris and/or the clock parameters for one or more satellites may be slightly or substantially modified. This is known as "selective availability" or simply SA. SA may be activated for a variety of reasons, such as national security."

"When SA is activated, the U.S. government is still able to use the NAVSTAR GPS because the U.S. government has access to the P-mode modulation codes. The C/A mode data, however, may be rendered substantially less accurate."

"In addition to the clock error, the atmospheric error and errors from selective availability, other errors which affect GPS position computations include receiver noise, signal reflections, shading, and satellite path shifting (e.g., satellite wobble). These errors result in computation of incorrect pseudoranges and incorrect satellite positions. Incorrect pseudoranges and incorrect satellite positions, in turn, lead to a reduction in the precision of the position estimates computed by a vehicle positioning system."

Note, the selective access has now been permanently turned off by the U.S. Government but may be reintroduced during periods of national emergency.

U.S. Pat. No. 5,757,646 to Talbot, et al. illustrates the manner in which centimeter level accuracy on the fly in real time is obtained. It is accomplished by double differencing the code and carrier measurements from a pair of fixed and roving GPS receivers. This patent also presents an excellent discussion of the problem and of various prior solutions as in the following paragraphs:

"When originally conceived, the global positioning system (GPS) that was made operational by the United States Government was not foreseen as being able to provide centimeter-level position accuracies. Such accuracies are now conmmonplace."

"Extremely accurate GPS receivers depend on phase measurements of the radio carriers that they receive from various orbiting GPS satellites. Less accurate GPS receivers simply develop the pseudoranges to each visible satellite based on the time codes being sent. Within the granularity of a single time code, the carrier phase can be measured and used to compute range distance as a multiple of the fundamental carrier wavelength. GPS signal transmissions are on two synchronous, but separate carrier frequencies "L1" and "L2", with wavelengths of nineteen and twenty-four centimeters, respectively. Thus within nineteen or twenty-four centimeters, the phase of the GPS carrier signal will change 360°."

"However the numbers of whole cycle (360°) carrier phase shifts between a particular GPS satellite and the GPS receiver must be resolved. At the receiver, every cycle will appear the same. Therefore there is an "integer ambiguity". The computational resolution of the integer ambiguity has traditionally been an intensive arithmetic problem for the computers used to implement GPS receivers. The traditional approaches to such integer ambiguity resolution have prevented on-the-fly solution measurement updates for moving GPS receivers with centimeter accurate outputs. Very often such highly accurate GPS receivers have required long periods of motionlessness to produce a first and subsequent position fix."

"There are numerous prior art methods for resolving integer ambiguities. These include integer searches, multiple antennas, multiple GPS observables, motion-based approaches, and external aiding. Search techniques often require significant computation time and are vulnerable to erroneous solutions when only a few satellites are visible. More antennas can improve reliability considerably. If carried to an extreme, a phased array of antennas results whereby the integers are completely unambiguous and searching is unnecessary. But for economy the minimum number of antennas required to quickly and unambiguously resolve the integers, even in the presence of noise, is preferred."

"One method for integer resolution is to make use of the other observables that modulate a GPS timer. The pseudorandom code can be used as a coarse indicator of differential range, although it is very susceptible to multipath problems. Differentiating the L1 and L2 carriers provides a longer effective wavelength, and reduces the search space. However dual frequency receivers are expensive because they are more complicated. Motion-based integer resolution methods make use of additional information provided by platform or satellite motion. But such motion may not always be present when it is needed."

This system is used in an industrial environment where the four antennas are relatively close to each other. Practicing the teachings of this invention permits a navigational computer to solve for the position of the rover to within a few centimeters on the fly ten times a second. An example is given where the rover is an airplane.

The above comments related to the use of multiple antennas to eliminate the integer ambiguity suggest that if a number of vehicles are nearby and their relative positions are known, that the ambiguity can be resolved.

d. Mapping

It is intended that the map database of the instant invention will conform to the open GIS specification. This will permit such devices to additionally obtain on-line consumer information services such as driving advisories, digital yellow pages that give directions, local weather pictures and forecasts and video displays of local terrain since such information will also be in the GIS database format.

A paper by O'Shea, Michael and Shuman, Valerie entitled "Looking Ahead: Map Databases in Predictive Positioning And Safety Systems" discusses map databases which can assist radar and image-processing systems of this invention since the equipped vehicle would know where the road ahead is and can therefore distinguish the lane of the preceding vehicle. No mention, however, is made in this reference of how this is accomplished through range gating or other means. This reference also mentions that within five years it may be possible to provide real time vehicle location information of one-meter accuracy. However, it mentions that this will be limited to controlled access roads such as interstate highways. In other words, the general use of this information on all kinds of roads for safety purposes is not contemplated. This reference also states that "road geometry, for example, may have to be accurate to within one meter or less as compared to the best available accuracy of 15 meters today". This reference also mentions the information about lane configuration that can be part of the database including the width of each lane, the number of lanes, etc., and that this can be used to determine driver drowsiness. This reference also states that "at normal vehicle speeds, the vehicle location must be updated every few milliseconds. It is also stated that the combination of radar and map data can also help to interpret radar information such as the situation where a radar system describes an overpass as a semi truck . . . " Image processing in this reference is limited to assessing road conditions such as rain, snow, etc. The use of a laser radar system is not contemplated by this reference. The use of this information for road departures warnings is also mentioned, as is lane following. The reference also mentions that feedback from vehicles can be used to improve map configurations.

A great flow of commercially available data will begin with the new generation of high resolution (as fine as about 1 meter) commercial earth imaging satellites from companies like EarthWatch and SPOT Image. Sophisticated imaging software is being put in place to automatically process these imaging streams into useful data products. This data can be used to check for gross errors in the map database.

According to Al Gore, in "The Digital Earth: Understanding our Planet in the 21$^{st}$ Century", California Science Center, Jan. 31, 1998, the Clinton Administration licensed commercial satellites to provide one meter resolution imaging beginning in 1998. Such imaging can be combined with digital highway maps to provide an accuracy and reality check.

U.S. Pat. No. 5,367,463 to Tsuji describes a vehicle azimuth determining system. It uses regression lines to find the vehicle on a map when there are errors in the GPS and map data. This patent does not give sub-meter accuracy. The advantage of this invention is that it shows a method of combining both map matching data and GPS along with a gyro and a vehicle velocity and odometer data to improve the overall location accuracy of the vehicle.

e. Speed Control

U.S. Pat. No. 5,530,651 to Uemura, et al. discloses a combination of an ultrasonic and laser radar optical detection system which has the ability to detect soiled lenses, rain, snow, etc. The vehicle control system then automatically limits the speed, for example, that the vehicle can travel in adverse weather conditions. The speed of the vehicle is also reduced when the visibility ahead is reduced due to a blind, curved corner. The permitted speed is thus controlled based on weather conditions and road geometry. There is no information in the vehicle system as to the legal speed limit as provided for in the instant invention.

f. Precise Positioning

When the operator begins operating his vehicle with a version of the RtZF system of this invention, he or she will probably not be near a reference point as determined by the MIR or RFID locator system, for example. In this situation, he or she will use the standard GPS system with the WAAS or other DGPS corrections. This will provide accuracy of between a few meters to 6 centimeters. This accuracy might be further improved as he or she travels down the road through map-matching or through communication with other vehicles. The vehicle will know, however, that is not operating in the high accuracy mode. As soon as the vehicle passes an MRI, RFID or equivalent precise positioning system, it will be able to calculate exactly where it is within a few centimeters and the vehicle will know that it is in the accurate mode. Naturally, any travel on a controlled highway would require frequent MIR, RFID or equivalent stations and the vehicle can be accurately contained within its proper corridors. Also, the size of the corridors that the vehicle is permitted to travel in can be a function of the accuracy state of the vehicle.

A paper by Han, Shaowei entitled "Ambiguity Recovery For Long-Range GPS Kinematic Positioning" appears to say that if a mobile receiver is initially synchronized with a fixed receiver such that there is no integer ambiguity, and if the mobile receiver then travels away from the fixed receiver, and during the process it loses contact with the satellites for a period of up to five minutes, that the carrier phase can be recovered and the ambiguity eliminated, providing again centimeter-range accuracies. Presumably the fixed station is providing the differential corrections. This is important for the instant invention since the integer ambiguity can be eliminated each time the vehicle passes a precise positioning station such as the MIR or RFID triad or equivalent as explained below. After that, a five-minute loss of GPS signals should never occur. Thus, carrier phase accuracies will eventually be available to all vehicles.

This concept can be further expanded upon. If two vehicles are traveling near each other and have established communication, and assuming that each vehicle can observe at least four of the same GPS satellites, each vehicle can send the satellite identification and the time of arrival of the signal at a particular epoch to the other. Then each vehicle can determine the relative position of the other vehicle as well as the relative clock error. As one vehicle passes a Precise Positioning Station (PPS), it knows exactly where it is and thus the second vehicle also knows exactly where it is and can correct for satellite errors. All vehicles that are in communication with the vehicle at the PPS similarly can determine their exact position and the system again approaches perfection. This concept is based on the fact that the errors in the satellite signals are identical for all vehicles that are within a mile or so of each other.

U.S. Pat. No. 5,361,070 to McEwan, although describing a motion detector, discloses technology which is used as part of a system to permit a vehicle to precisely know where it is on the face of the earth at particular locations. The ultra wideband 200 picosecond radar pulse emitted by the low power radar device of McEwan is inherently a spread spectrum pulse which generally spans hundreds of megahertz to several gigahertz. A frequency allocation by the FCC is not relevant. Furthermore, many of these devices may be co-located without interference. The concept of this device is actually disclosed in various forms in the following related patents to McEwan. The following comments will apply to these patents as a group, all of which are incorporated herein by reference.

U.S. Pat. No. 5,510,802 to McEwan describes a time of flight radio-location system similar to what is described below. In this case, however, a single transmitter sends out a pulse, which is received by three receivers to provide sub-millimeter resolution. The range of this device is less than about 10 feet.

The concept described in McEwan's U.S. Pat. No. 5,519, 400 is that the MIR signal can be modulated with a coded sequence to permit positive identification of the sending device. In an additional McEwan patent, U.S. Pat. No. 5,589,838, .a short-range radio-location system is described. Additionally, in U.S. Pat. No. 5,774,091, McEwan claims that the MIR system will operate to about 20 feet and give resolutions on the order of 0.01 inches.

g. Radar and Laser Radar Detection and Identification of Objects External to the Vehicle A paper by Amamoto, Naohiro and Matsumoto, Koji entitled "Obstruction Detector By Environmental Adaptive Background Image Updating" describes a method for distinguishing between moving object pixels, stationary object pixels, and pixels that change due to illumination changes in a video image. This paper appears to handle the case of a camera fixed relative to the earth, not one mounted on a vehicle. This allows the system to distinguish between a congested area and an area where cars are moving freely. The video sampling rate was 100 milliseconds.

A paper by Doi, Ayumu, Yamamomo; Yasunori,and Butsuen, Tetsuro entitled "Development Of Collision Warning System and Its Collision Avoidance Effect" describes a collision warning system that has twice the accuracy of conventional systems. It uses scanning laser radar. In the system described in this paper, the authors do not appear to use range gating to separate one vehicle from another.

A paper by Min, Joon, Cho. Hyung, and Choi, Jong, entitled "A Learning Algorithm Using Parallel Neuron Model" describes a method of accurately categorizing vehicles based on the loop in the highway. This system uses a form of neural network, but not a back propagation neural network. This would essentially be categorizing a vehicle by its magnetic signature. Much information is lost in this system, however, due to the lack of knowledge of the vehicle's velocity.

Another paper describes work done at JPL (Jet Propulsion Laboratories) to develop a target recognition system. In this paper, neural networks pay a key role in that target recognition process. The recognition of vehicles on a roadway is a considerably simpler process. Although not disclosed in this paper, most of the cluttering information can be eliminated through range gating. The three-dimensional image obtained as described below will permit simple rotations of the image to artificially create a frontal view of the object being investigated. Also, the targets of interest here are considerably closer than was considered by JPL. Nevertheless, the techniques described in this reference and in the references cited by this reference, all of which are included herein by reference, are applicable here in a simplified form. The JPL study achieved over a 90% success rate at 60 frames per minute.

U.S. Pat. No. 4,521,861 to Logan describes a method and apparatus for enhancing radiometric imaging and a method and apparatus for enhancing target detection through the utilization of an imaging radiometer. The radiometer, which is a passive thermal receiver, detects the reflected and emitted thermal radiation of targets. Prior to illumination, foliage will appear hot due to its high emissivity and metals will appear cold due to their low emissivities. When the target is momentarily illuminated foliage appears dark while metals appear hot. By subtracting the non-illuminated image from the illuminated image, metal targets are enhanced. The teachings of this patent thus have applicability to the instant invention as discussed below.

U.S. Pat. No. 5,463,384 to Juds uses a plurality of infrared beams to alert a truck driver that a vehicle is in his blind spot when he begins to turn the vehicle. The system is typically activated by the vehicle's turn signal. No attempt is made to measure exactly where the object is, only whether it is in the blind spot or not.

U.S. Pat. No. 5,467,072 to Michael relates to a phased array radar system that permits the steering of a radar beam without having to rotate antennas. Aside from that, it suffers from all the disadvantages of radar systems as described here. In particular, it is not capable of giving accurate three-dimensional measurements of an object on the roadway.

U.S. Pat. No. 5,486,832 to Hulderman employs millimeter wave radar and optical techniques to eliminate the need for a mechanical scanning system. A 35-degree are is illuminated in the azimuth direction and 6 degrees in elevation. The reflected waves are separated into sixteen independent, simultaneously overlapping 1.8 degree beams. Each beam, therefore, covers a width of about 3 feet at 100 feet distance from the vehicle, which is far too large to form an image of the object in the field of view. As a result, it is not possible to identify the objects in the field of view. All that is known is that an object exists. Also, no attempt has been made to determine whether the object is located on the roadway or not. Therefore, this invention suffers from the limitations of other radar systems.

U.S. Pat. No. 5,530,447 to Henderson, et al. shows a system used to classify targets as threatening or non-threatening, depending on whether the target is moving relative to the ground. This system is only for vehicles in an adjacent lane and is primarily meant to protect against blind-spot type accidents. No estimation is made by the system of the position of the target vehicle or the threatening vehicle, only its relative velocity.

U.S. Pat. No. 5.576,972 to Harrison provides a good background of how neural networks are used to identify various of objects. Although not directly related to intelligent transportation systems or to accident-avoidance systems such as described herein, these techniques will be applied to the invention described herein as discussed below.

U.S. Pat. No. 5.585.798 to Yoshioka. et al. uses a combination of a CCD camera and a laser radar unit. The invention attempts to make a judgment as to the danger of each of the many obstacles that are detected. The load on the central processor is monitored by looking at different obstacles with different frequencies depending on their danger to the present system. A similar arrangement is contemplated for the invention as disclosed herein.

U.S. Pat. No. 5,767,953 to McEwan describes a laser tape measure for measuring distance. It is distinct from laser radars in that the width of the pulse is measured in subnanosecond times, whereas laser radars are typically in the microsecond range. The use of this technology in the current invention would permit a much higher scanning rate than by convention radar systems and thus provide the opportunity for obtaining an image of the obstructions on the highway. It is also less likely that multiple vehicles having the same system would interfere with each other. For example, if an area 20 feet by 5 feet were scanned with a 0.2 inch pixel size, this would give about one million pixels. If using laser radar, one pixel per microsecond is sent out, it would take one second to scan the entire area during which time the vehicle has traveled 88 feet at 60 miles an hour. On the other hand, if scanning this array at 100 feet, it would take 200 nanoseconds for the light to travel to the obstacle and back. Therefore, if a pulse is sent out every fifth of a microsecond, it will take a fifth of a second to obtain a million pixels, during which time the vehicle has traveled about 17 feet. If 250,000 pixels are used, the vehicle will only have traveled about 4 feet.

U.S. Pat. Nos. 4,352,105 and 4,298,280 to Harney describe an infrared radar system and a display system for use by aircraft. In particular, these patents describe an infrared radar system that provides high resolution, bad whether penetration, day-night operation and which can provide simultaneous range, intensity and high resolution angular information. The technology uses $CO_2$ laser and a 10.6 micron heterodyne detection. It is a compact imaging infrared radar system that can be used with the invention described herein. Harney applies this technology to aircraft and does not contemplate its application to collision avoidance or for other uses with automobiles.

h. Smart Highways

A paper entitled "Precursor Systems Analyses of Automated Highway Systems (Executive Summary)" discloses that "an AHS (automated highway system) can double or triple the efficiency of today's most congested lanes while significantly increasing safety and trip quality".

There are one million, sixty-nine thousand, twenty-two miles of paved non-local roads in the US. Eight hundred twenty-one thousand and four miles of these are classified as "rural" and the remaining two hundred forty-eight thousand, eighteen miles are "urban".

The existing interstate freeway system consists of approximately 50,000 miles which is 1% of the total of 3.8 million miles of roads. Freeways make up 3% of the total urban/suburban arterial mileage and carry approximately 30% of the total traffic.

In one study, dynamic route guidance systems were targeting at reducing travel time of the users by 4%. Under the system of this invention, the travel times would all be known and independent of congestion once a vehicle had entered the system. Under the current system, the dynamic delays can change measurably after a vehicle is committed to a specific route. According to the Federal Highway Administration Intelligent Transportation Systems (ITS Field Operational Test), dynamic route guidance systems have not been successful.

There are several systems presented in the Federal Highway Administration Intelligent Transportation Systems (ITS Field Operational Test) for giving traffic information to commuters, called "Advance Traveler Information System" (ATIS). In none of these articles does it discuss the variation in travel time during rush hour for example, from one day to the next. The variability in this travel time would have to be significant to justify such a system. Naturally, a system of this type would be unnecessary in situations where the instant invention has been deployed. The single most important cause of variability from day to day is traffic incidents such as accidents, which are eliminated or at least substantially reduced by the instant invention. One of the conclusions in a study published in the "Federal Highway Administration Intelligent Transportation Systems (ITS Field Operational Test)" entitled "Direct Information Radio Using Experimental Communication Technologies" was that drivers did not feel that the system was a significant advance over commercial radio traffic information. They did think the system was an improvement over television traffic information and changeable message signs. The drivers surveyed on average having changed their route only one time in the eight week test period due to information they received from the system.

i. Weather and Road Condition Monitoring

A paper by Miyata, Yasuhiro and Otomo, Katsuya, Kato, Haijime, Imacho, Nobuhiro, Murata, Shigeo, entitled "Development of Road Icing Prediction System" describes a method of predicting road icing conditions several hours in advance based on an optical fiber sensor laid underneath the road and the weather forecast data of that area.

There is likely a better way of determining ice on the road than described in this paper. The reflection of an infrared wave off the road varies significantly depending on whether there is ice on the road or snow, or the road is wet or dry. An unsupervised neural network could be a better solution. The system of this paper measures the road surface temperature, air temperature and solar radiation. A combination of active and passive infrared would probably be sufficient. Perhaps, a specially designed reflective surface could be used on the road surface in an area where it is not going to be affected by traffic.

What this paper shows is that if the proper algorithm is used, the actual road temperature can be predicted without the need to measure the road surface temperature. This implies that icing conditions can be predicted and the sensors would not be necessary. Perhaps, a neural network algorithm that monitors a particular section of road and compares it to the forecasted data would be all that is required. In other words, given certain meteorological data, the neural network ought to be able to determine the probability of icing. What is needed, therefore, is to pick a section of roadway and monitor that roadway with a state-owned vehicle throughout the time period when icing is likely to occur and determine if icing has occurred and compare that with the meteorological data using a neural network that is adapted for each section of road.

j. Vehicle to Vehicle Communication

U.S. Pat. No. 5,506,584 to Boles relates to a system for communication between vehicles through a transmit and transponder relationship. The patent mentions that there may be as many as 90 vehicles within one half mile of an interrogation device in a multi-lane environment, where many of them may be at the same or nearly the same range. Boles utilizes a transponder device, the coded responses which are randomized in time, and an interrogation device which processes the return signals to provide vehicle identification speed, location and transponder status information on vehicles to an operator or for storage in memory. No mention is made of how a vehicle knows its location or how accurate that knowledge is and therefore how it can transmit that location to other vehicles.

k. Infrastructure to Vehicle Communication

The DGPS correction information can be broadcast over the radio data system (RDS) via FM transmitters for land use. A company called Differential Correction, Inc. has come up with a technique to transmit this DGPS information on the RDS channel. This technique has been used in Europe since 1994 and, in particular, Sweden has launched a nation-wide DPGS service via the RDS (see, Sjoberg, Lars, "A '1 Meter' Satellite Based Navigation Solutions for the Mobile Environment That Already Are Available Throughout Europe"). This system has the potential of providing accuracies on the premium service of between about 1 and 2 meters. A 1 meter accuracy, coupled with the carrier phase system to be described below, provides an accuracy substantially better than about 1 meter as preferred in the Road to Zero Fatalities (RtZF) system of this invention.

In addition to the FM RDS system, the following other systems can be used to broadcast DGPS correction data: cellular mobile phones, satellite mobile phones, MCA (multi-channel access), wireless tele-terminals, DARCs/RBDS (radio data systems/radio broadcast data system), type FM sub-carrier, exclusive wireless, and pagers. In particular, DARC type is used for vehicle information and communication systems so that its hardware can be shared. Alternately, the cellular phone system, coupled with the Internet, could be used for transmitting corrections (see, Ito, Toru and Nishiguchi, Hiroshi entitled "Development of DGPS using FM Sub-Carrier For ITS") with the exception of the Internet comment.

One approach for the cellular system is to use the GSM mobile telephone system, which is the Europe-wide standard. This can be used for transmitting DGPS and possibly map update information (see, Hob, A., Ilg, J. and Hampel, A. entitled "Integration Potential Of Traffic Telematics).

In Choi, Jong and Kim, Hoi, "An Interim Report: Building A Wireless Internet-Based Traveler's Information System As A Replacement Of Car Navigation Systems", a system of showing congestion at intersections is broadcast to the vehicle through the Internet. The use of satellites is disclosed as well as VCS system.

This is another example of the use of the Internet to provide highway users with up-to-date traffic congestion information. Nowhere in this example, however, is the Internet used to transmit map information.

A paper by Sheu, Dennis, Liaw, Jeff and Oshizawa, Al, entitled "A Communication System For In-Vehicle Navigation System" provides another description of the use of the Internet for real traffic information. However, the author (unnecessarily) complicates matters by using push technology which isn't absolutely necessary and with the belief that the Internet connection to a particular vehicle to allow all vehicles to communicate, would have to be stopped which, of course, is not the case. For example, consider the ghome network where everyone on the network is connected all the time.

A paper by, Rick Schuman entitled "Progress Towards Implementing Interoperable DSRC Systems In North America" describes the standards for dedicated short-range communications (DSRC). DSRC could be used for inter-vehicle communications, however, its range according to the ITS proposal to the Federal Government would be limited to about 90 meters. Also, there may be a problem with interference from toll collection systems, etc. According to this reference, however, "it is likely that any widespread deployment of intersection collision avoidance or automated highways would utilize DSRC". Ultra wide band communication systems, on the other hand, are a viable alternative to DSRC as explained below. The DSRC physical layer uses microwaves in the 902 to 928 megahertz band. However, ITS America submitted a petition to the FCC seeking to use the 5.85 to 5.925 gigahertz band for DSRC applications.

A version of CDPD, which is a commercially available mobile, wireless data network operated in the packet-switching mode, extends Internet protocol capabilities to cellular channels. This is reported on in a paper entitled "Intelligent Transportation Systems (ITS) Opportunity".

According to a paper by Kelly, Robert, Povich, Doublas and Poole, Katherine entitled "Petition of Intelligent Transportation Society of America for Amendment Of The Commission's Rules to Add Intelligent Transportation Services (ITS) As A New Mobile Service With Co-Primary Status In The 5.850 to 5.925 GHz", from 1989 to 1993 police received an annual average of over 6.25 million vehicle accident reports. During this same period, the total comprehensive cost to the nation of motor vehicle accidents exceeded the annual average of 400 billion dollars. In 1987 alone, Americans lost over 2 billion hours (approximately 22,800 years) sitting in traffic jams. Each driver in Washington D.C. wastes an average of 70 hours per year idling in traffic. From 1986 to 1996, car travel has increased almost 40% which amounts to about a 3.4% increase per year.

Further, from Kelly et al., the FCC has allocated in Docket 94-124, 46.7 to 46.9 GHz and 76 to 77 GHz bands for unlicensed vehicular collision avoidance radar. The petition for DSRC calls for a range of up to about 50 meters. This would not be sufficient for the RtZF system. For example, in the case of a car passing another car at 150 kilometers per hour. Fifty meters amounts to about one second, which would be insufficient time for the passing vehicle to complete the passing and return to the safe lane. Something more in the order of about 500 meters would be more appropriate. This, however, may interfere with other uses of DSRC such as automatic toll taking, etc., thus DSRC may not be the optimum communication system for communication between vehicles. DSRC is expected to operate at a data rate of approximately 600 kbps. DSRC is expected to use channels that are six megahertz wide. It might be possible to allocate one or more of the six megahertz channels to RtZF.

On DSRC Executive Roundtable—Meeting Summary, Appendix I—Proposed Changes to FCC Regulations covering the proposed changes to the FCC regulations, it is stated that ". . . DSRCS systems utilize non-voice radio techniques to transfer data over short distances between roadside and mobile units, between mobile units and between portable and mobile units to perform operations related to the improvement of traffic flow, traffic safety and other intelligent transportation service applications . . . ", etc.

1. Transponders

Consider placing a requirement that all vehicles have passive transponders such as RFID tags. This could be part of the registration system for the vehicle and, in fact, could even be part of the license plate. This is somewhat disclosed in a paper by Shladover, Steven entitled "Cooperative Advanced Vehicle Control and Safety Systems (AVCSS)". AVCSS sensors will make it easy to detect the presence, location and identity of all other vehicles in their vicinity. Passive radio frequency transponders are disclosed. The use of differential GPS with accuracies as good as about two (2) centimeters, coupled with an inertial guidance system, is disclosed, as is the ability of vehicles to communicate their locations to other vehicles. It discloses the use of accurate maps, but not of lateral vehicle control using these maps. It is obvious from reading this paper that the author did not contemplate the safety system aspects of using accurate maps and accurate GPS. In fact, the author stresses the importance of cooperation between various government levels and agencies and the private sector in order to make AVCSS feasible. "Automotive suppliers cannot sell infrastructure-dependent systems to their customers until the very large majority of the infrastructure is suitable equipped."

m. Intelligent Transportation Infrastructure Benefits

A paper entitled "Intelligent Transportation Infrastructure Benefits: Expected and Experienced" provides a summary of costs and benefits associated with very modest ITS implementations. Although a complete cost benefit analysis has not been conducted on the instant invention, it is evident from reading this paper that the benefits to cost reference will be a very large number.

According to this paper, the congestion in the United States is increasing at about 9% per year. In 50 metropolitan areas, the cost in 1992 was estimated at 48 billion dollars and in Washington, DC it represented an annual cost of $822 per person, or $1,580 per registered vehicle. In 1993, there were 40,115 people killed and 3 million injured in traffic accidents. Sixty-one percent (61%) of all fatal accidents occurred in rural areas. This reference lists the 29 user services that make up the ITS program. It is interesting that the instant invention provides 24 of the 29 listed user services. A listing of the services and their proposed implementation with the RtZF system is:

IVI Services

In the tables below, L=Light Vehicle, H=Heavy Truck, T=Transit, S=Specialty Vehicle.

| (1) Rear-End Collision Avoidance | Gen. 0 | Gen. I | Gen. II |
|---|---|---|---|
| (1a) Monitors motion and location of other vehicles and other objects in front of vehicle. | LHTS | | |
| (1b) Advises the driver of imminent rear-end crashes. | LHTS | | |
| (1c) Provides automatic braking. | | | LHTS |

This service is available now with adaptive cruise control supplied by Autoliv, TRW and other companies.

| (2) Road-Departure Collision Avoidance | Gen. 0 | Gen. I | Gen. II |
|---|---|---|---|
| (2a) Monitors lane position of the vehicle and motion relative to edge of road. | LHTS | | |
| (2b) Monitors vehicle speed relative to road geometry and road conditions. | LHTS | | |
| (2c) Advises the driver of imminent unintentional road departure. | LHTS | | |
| (2d) Provides cooperative communication with highway infrastructure to automatically provide safe speeds for upcoming road geometry and conditions. | LHTS | | |

A virtual rumble strip noise will be used to warn the driver.

| | Gen. 0 | Gen. I | Gen. II |
|---|---|---|---|
| (3) Lane-Change and Merge Collision Avoidance | | | |
| (3a) Monitors lane position of the vehicle. | LHTS | | |
| (3b) Monitors the relative speed and lane position of vehicles (including motorcycles) beside and to the rear of the vehicle. | | LHTS | |
| (3c) Advises the driver during the decision phase (turn signal activated) of a lane-change maneuver of the potential for a collision. | | LHTS | |
| (3d) Advises the driver during the action phase (steering input) of a lane-change maneuver of an imminent collision. | | LHTS | |
| (3e) Advises the driver during the action phase (steering input) of an entry or exit maneuver of an imminent collision. | | LHTS | |
| (4) Intersection Collision Avoidance | | | |
| (4a) Monitors vehicle position relative to intersection geometry. | LHTS | | |
| (4b) Monitors relative speed and position of other vehicles. | | LHTS | |
| (4c) Advises the driver of appropriate action to avoid a violation of right-of-way at the intersection. | | LHTS | |
| (4d) Advises the driver of appropriate action to avoid an impending collision at the intersection. | | LHTS | |
| (4e) Determines the intent of other vehicles in the intersection to turn, slow down, stop, or violate the right-of-way. | | LHTS | |
| (5) Railroad Crossing Collision Avoidance | | | |
| (5a) Monitors vehicle position relative to railroad crossing. | LHTS | | |
| (5b) Monitors vehicle position and speed relative to position and speed of a train. | | LHTS | |
| (5c) Advises the driver of appropriate action to avoid an impending collision at railroad crossing. | | LHTS | |
| (6) Vision Enhancement | | | |
| (6a) Provides an enhanced view of pedestrians and roadside features with an infrared system. | | LHTS | |
| (6b) Provides an enhanced view of the environment using a UV system. | | NA | |
| (7) Location-Specific Alert and Warning | | | |
| (7a) Provides warning information by integrating vehicle speed with knowledge of road geometry. | LHTS | | |
| (7b) Provides warning information by integrating environmental conditions with road surface conditions. | | LHTS | |
| (7c) Provides warning information on road geometry by integrating vehicle speed, road conditions, and road geometry. | | LHTS | |
| (7d) Provides warning information on upcoming traffic signs and signalized intersections. | | LHTS | |
| (7e) Provides warnings that replicate one or more types of road signs in complex or hazardous highway locations. | | LHTS | |
| (8) Automatic Collision Notification | | | |
| (8a) Automatically transmits position/location of vehicle, when involved in a collision, using PSAP. | LHTS | | |
| (8b) Automatically provides crash severity information from vehicle to PSAP. | LHTS | | |
| (8c) Integrates with manually activated systems for requesting roadside assistance. | LHTS | | |

This service is already implemented on GM's OnStar system.

| (9) Smart Restraints and Occupant Protection Systems | Gen. 0 | Gen. I | Gen. II |
|---|---|---|---|
| (9a) Provides advance warning of an impending frontal collision to the vehicle protection system | | LHTS | |
| (9b) Provides advance warning of an impending side collision to the vehicle protection system. | | LHTS | |
| (9c) Pre-deploys appropriate occupant protection systems in vehicle prior to impact. | | LHTS | |

The scanning laser radar will identify both large and small objects.

| (10) Navigation/Routing | Gen. 0 | Gen. I | Gen. II |
|---|---|---|---|
| (10a) Provides location information to the driver. | LHTS | | |
| (10b) Provides route guidance information to the driver. | | LHTS | |
| (10c) Provides road geometry data to CAS. | | LHTS | |
| (10d) Provides location data to CAS. | | LHTS | |
| (10e) Displays only the traffic information that is applicable to vehicle location and route. | | LHTS | |
| (10f) Provides optimal routing based on driver preferences. | | LHTS | |
| (10g) Uses real-time traffic information in calculations of optimal routes. | | LHTS | |

The information for this service will be in the map database.

| (11) Real-Time Traffic and Traveler Information | Gen. 0 | Gen. I | Gen. II |
|---|---|---|---|
| (11a) Accesses in-vehicle databases to determine vehicle location and route guidance instructions. | LHTS | | |
| (11b) Receives travel-related information from the infrastructure (roadside or wide-area transmissions) to include: | | | |
| (11b-i) Motorist and traveler services information. | LHTS | | |
| (11b-ii) Safety and advisory information. | | LHTS | |
| (11b-iii) Real-time updates on congestion; work zones; environmental and road surface conditions. | | LHTS | |
| (11c) Provides an integrated approach to the presentation of information to the driver for safety warnings and other task-related advisories. | | LHTS | |
| (11d) Provides the capability of reacting to information on environmental and road conditions (augments static database). | | LHTS | |
| (12) Driver Comfort and Convenience | | | |
| NA | | | |

This is also already being done by various automobile manufacturers independently.

| (13) Vehicle Stability Warning and Assistance | Gen. 0 | Gen I | Gen. II |
|---|---|---|---|
| (13a) Measures rollover stability properties of a typical heavy vehicle. | | HTS | |
| (13b) Provides the driver with a graphical depiction of the vehicle's loading condition relative to its rollover propensity. | | NA | |
| (13c) Provides an active brake control system to selectively apply brakes to stabilize the vehicle. | | HTS | |
| (13d) Integrates the active brake control with electronic braking system technology and infrastructure-provided information. | | HTS | |

The vehicle and road properties must be known prior to the danger or else it is too late. In Phase One the vehicle inertial properties will be determined by monitoring its response to known road inputs.

| (14) Driver Condition Warning | Gen. 0 | Gen. I | Gen. II |
|---|---|---|---|
| (14a) Provides a driver monitoring and warning capability to alert the driver of drowsiness or other types of impairments (CVO or Transit first). | LHTS | | |

The system senses when driver goes off the road or commits other infractions and then tests driver response by turning on the hazard lights which the driver must turn off, for example.

| (15) Vehicle Diagnostics | Gen. 0 | Gen. I | Gen. II |
|---|---|---|---|
| (15a) Monitors and displays vehicle safety-related functions (i.e., braking system integrity, tire pressure, sensor and actuator performance, and communications system). | | | LHTS |

Cars do not now have a general diagnostic system. One is disclosed in U.S. Pat. No. 5,809,437.

| (16) Cargo Identification | Gen. 0 | Gen. I | Gen. II |
|---|---|---|---|
| NA | | | |

Cargo information can be part of the vehicle ID message.

| (17) Automated Transactions | Gen. 0 | Gen. I | Gen. II |
|---|---|---|---|
| (17a) Provides the driver with the capability of ETC and the payment of parking fees and transit fares. | LHTS | | |
| (17b) Provides heavy-vehicle drivers with the capability of electronically filing credentials and permit verifications. | LHTS or NA | | |

Automated transactions can be automatic with RtZF based on vehicle ID.

| (18) Safety Event Recorder | Gen. 0 | Gen. I | Gen. II |
|---|---|---|---|
| (18a) Records selected driver and vehicle parameters to support the reconstruction of an accident. | LHTS | | |
| (18b) Provides a notification system for transmission of collision data to the emergency service provider. | LHTS | | |

The Phase Zero recorder in the 1000 vehicles will record the following; (1) Time, place and velocity when infractions are sensed. (2) Weather, temperature, illumination etc. (3) Brake pressure, throttle, steering angle etc. (4) Occupant position. (5) In vehicle still pictures. (6) Number of satellites observed. (7) State of DGPS signals. (8) State of the system.

| (19) Obstacle/Pedestrian Detection | Gen. 0 | Gen. I | Gen. II |
|---|---|---|---|
| (19a) Warns the driver when pedestrians, vehicles, or obstacles are in close proximity to the driver's intended path using onboard sensors. | | LHTS | |
| (19b) Warns the driver when pedestrians, vehicles, or obstacles are in close proximity to the driver's intended path using infra-structure-based sensors. | | NA | |

In Phase One scanning laser radar, lenses & range gating will be used to cover all vehicle sides.

| (20) Tight Maneuver/Precision Docking | Gen. 0 | Gen. I | Gen. II |
|---|---|---|---|
| (20a) Provides sensors to continuously calculate the lateral distance to the curb, front and rear, in order to park the vehicle in a precise location. | HT | | |
| (20b) Provides sensors to continuously calculate the longitudinal distance to the end of the vehicle loading area in order to park the vehicle in the precise location | HT | | |
| (20c) Provides the driver with the ability to override automated system by pressing brakes or steering in emergency situations. | HT | | |

This service can be provided in Phase Zero. This will probably require MIR triads or equivalent.

| | Gen. 0 | Gen. I | Gen. II |
|---|---|---|---|
| (21) Transit Passenger Monitoring | | | |
| NA | | | |
| (22) Transit Passenger Information | | | |
| NA | | | |

RtZF can provide location information.

| (23) Fully Automated Control at Certain Facilities | Gen. 0 | Gen. I | Gen. II |
|---|---|---|---|
| NA | | | |

RtZF could provide accurate position information to support this service.

| (24) Low-Friction Warning and Control Assist | Gen. 0 | Gen. I | Gen. II |
|---|---|---|---|
| (24a) Provides drivers with a warning to indicate reduced traction, detected by onboard sensors. | | LHTS | |
| (24b) Provides drivers with control assist capabilities to help the driver regain control of the vehicle. | | LHTS | |

Historical road data and weather prediction plus roadway sensors and probes will provide this service in Phase One.

| (25) Longitudinal Control | Gen. 0 | Gen. I | Gen. II |
|---|---|---|---|
| (25a) Provides normal cruise control. | LHTS | | |
| (25b) Provides a cooperative intelligent cruise control. | LHTS | | |
| (25c) Monitors location and relative speed of near-by vehicles. | | LHTS | |
| (25d) Provides automatic speed adjustment by coasting or downshifting to maintain a safe operating envelope. | | LHTS | |
| (25e) Provides a system capable of detecting a vehicle located ahead in the same lane of traffic that is either traveling at any speed or fully stopped. | | LHTS | |
| (25f) Provides a full-range of braking capabilities and operating speeds to be used for all driving situations, including stop-and-go traffic. | | LHTS | |

Automatic Cruise Control (ACC) is provided in Phase Zero. The rest are basic services to be provided in Phase One.

| (26) Lateral Control | Gen. 0 | Gen. I | Gen. II |
|---|---|---|---|
| (26a) Provides a sensor capable of detecting the center of the lane using infrastructure support such as accurately painted lane marker stripes, embedded magnetic nails, or radar-reflective stripes. | | LHTS | |
| (26b) Provides automatic steering control that will maintain vehicle position in the center of the lane. | | LHTS | |

These are the main services to be provided in Phase Zero.

This paper further goes into considerable discussion on various means of communication between a vehicle and other vehicles as well as the infrastructure. However, no recommendations are made for vehicle-to-vehicle communication technologies.

The above references, among other things, demonstrate that there are numerous methods and future enhancements planned that will provide centimeter level accuracy to an RtZF equipped vehicle. There are many alternative paths that can be taken but which ever one is chosen the result is clear that such accuracies are within the start of the art today.

Limitations of the Prior Art

Previous inventions have attempted to solve the collision avoidance problem for each vehicle independently of the other vehicles on the roadway. Systems that predict vehicle trajectories generally fail because two vehicles can be on a collision course and within the last 0.1. second a slight change of direction avoids the collision. This is a common occurrence that depends on the actions of the individual drivers and no collision avoidance system now in existence is believed to be able to differentiate this case from an actual collision. In the present invention, every equipped vehicle will be confined to a corridor and to a position within that corridor where the corridor depends on sub-meter accurate digital maps. Only if that vehicle deviates from the corridor will an alarm sound or the vehicle control system take over control of the vehicle sufficiently to prevent the vehicle from leaving its corridor if an accident would result from the departure from that corridor.

Additionally, no prior art system has successfully used the GPS navigational system, or an augmented DGPS to locate a vehicle on a roadway with sufficient accuracy that that information can be used to prevent the equipped vehicle from leaving the roadway or striking another similarly equipped vehicle.

Prior art systems in addition to being poor at locating potential hazards on the roadway, have not been able to ascertain whether they are in fact on the roadway of off on the side, whether they are threatening vehicles, static signs over overpasses etc. In fact no credible attempt to date has been made to identify or categorize objects which may impact the subject vehicle.

The RtZF™ system of this invention also contemplates a different kind of interrogating system. It is based on scanning infrared laser radar with range gating. This system, when used in conjunction with accurate maps, will permit a precise imaging of an object on the road in front of the vehicle, for example, permitting it to be identified (using neural networks) and its location, velocity and the probability of a collision to be determined.

In particular, the system of this invention is particularly effective in eliminating accidents at intersections caused by drivers running stop signs, red stoplights and turning into oncoming traffic. There are approximately one million such accidents and they are the largest killer in older drivers who frequently get confused at intersections.

SUMMARY AND OBJECTS OF THE INVENTION

The above and other objects and advantages of the present invention are achieved by the preferred embodiments that are summarized and described in detail below.

It is an object of the present invention to provide a new and improved method and arrangement for mapping a road.

It is another object of the present invention to provide a new and improved method and arrangement for mapping a road quickly and more precisely than possible using prior art systems.

In order to achieve these objects, an arrangement for attaching to a vehicle to enable mapping of a road during travel of the vehicle comprises a first data acquisition module adapted to be arranged on a first side of the vehicle and a second data acquisition module adapted to be arranged on a second side of the vehicle. Each module comprises a GPS receiver and an antenna for enabling a determination of the position of the vehicle to be obtained and a linear camera adapted to provide one-dimensional images of an area on a respective one of the first and second sides of the vehicle. The linear cameras provide images of a vertical plane perpendicular to the road such that a view of the road in a direction perpendicular to the road is obtained and information about the road is obtainable from that view. A processor unit is coupled to the modules and forms a map database of the road by correlating the position of the vehicle on the road and the information about the road. The processor unit can be resident in the vehicle or data can be obtained and stored in a memory unit in the vehicle and the map database formed later from the stored data.

The linear cameras may be linear CCD, CMOS and other light sensitive arrays. The light cameras may comprise a lens for providing a field of view from an approximate center of the vehicle to the horizon whereby the linear cameras are thus adapted to record one-dimensional pictures covering the entire road starting with approximately the center of a lane in which the vehicle travels and extending out to the horizon.

Each module can also include a scanning laser radar adapted to transmit waves downward in a plane perpendicular to the road and receive reflected radar waves to thereby provide information about distance between the laser radar and the ground which constitutes information about the road. The laser radar may be coordinated or synchronized with the linear camera of its module to cover a common field of view. The laser radars may be pulse-modulated or tone-modulated. In one implementation, laser radars are used with the linear cameras being an optional enhancement.

Each module can also comprise a video camera adapted to provide images of an area in front of the vehicle whereby images of an environment of the road including traffic signs and other informational displays are obtained and provide information about the road. Such information is used to form the map database. The video cameras may be color video cameras, high-speed video cameras, wide angle cameras, telescopic cameras, black and white video cameras and infrared cameras. Artificial illumination devices can be incorporated into or with the modules to provide artificial illumination at least when an absence of sufficient natural illumination for obtaining images from the video cameras is detected. In this regard, a laser scanner may be adapted to illuminate a particular part of the area in front of the vehicle with a bright spot. A scanning laser rangefinder can be arranged in connection with at least one of the video cameras for determining the distance to particular objects in the images obtained by that video camera whereby the distance constitutes information about the road which is used to form the map database.

A method for mapping a road entails arranging a first data acquisition module on a first side of the vehicle, arranging a second data acquisition module on a second side of the vehicle, each module comprising a GPS receiver and an antenna and a linear camera oriented to provide one dimensional images in a vertical plane of an area on a respective one of the first and second sides of the vehicle, operating the vehicle on the road while continually obtaining the position of the vehicle using the GPS receiver and antenna and obtaining images from the linear cameras of vertical planes perpendicular to the road and forming a map database of the road by correlating the position of the vehicle on the road and information about the road obtained from the images from the linear cameras. The aspects of the arrangements described above can be incorporated into the mapping method.

Another method for mapping a road comprises (he steps of arranging a first data acquisition module on a first side of the vehicle, arranging a second data acquisition module on a second side of the vehicle, each module comprising a GPS receiver and an antenna and a scanning laser radar oriented to transmit waves downward in a plane perpendicular to the road and receive reflected radar waves, operating the vehicle on the road while continually obtaining the position of the vehicle using the GPS receiver and antenna and obtaining information about the distance between the laser radars and the ground by transmitting and receiving radar waves and forming a map database of the road by correlating the position of the vehicle on the road and the information about distance between the laser radars and the ground. The aspects of the arrangements described above can be incorporated into this mapping method.

Another aspect of the invention is a computer controlled vehicle and obstacle location system and method which includes the steps of receiving continuously from a network of satellites on a first communication link at one of a plurality of vehicles, GPS ranging signals for initially accurately determining, in conjunction with centimeter accurate maps, the host vehicle's position on a roadway on a surface of the earth; receiving continuously at the host vehicle on a second communication link from a station or satellite, DGPS auxiliary range correction signals for correcting propagation delay errors in the GPS ranging signals; determining continuously at the host vehicle from the GPS, DGPS, and accurate map database signals host vehicle's position on the surface of the earth with centimeter accuracy; communicating the host vehicle's position to another one of the plurality of vehicles, and receiving at the host vehicle, location information from at least one of a plurality of other vehicles; determining whether the other vehicle represents a collision threat to the host vehicle based on its position relative to the roadway and the host vehicle and generating a warning or vehicle control signal response to control the vehicles motion laterally or longitudinally to prevent a collision with the other vehicle.

In some implementations of the invention, the detecting step includes detecting objects by scanning with one or more cameras, radars or laser radars located on the host vehicle. The analyzing step includes processing and analyzing digital signals indicative of video images detected by the one or more cameras, radars or laser radars, and processing and analyzing the digital signals using pattern recognition and range determination algorithms. The objects detected may include fixed or moving, or known or unknown obstacles, people, bicycles, animals, or the like.

A still further feature of this aspect of the invention is to operate one or more of the following systems depending on the kind of response determined by the neural fuzzy logic control system: a brake pedal, accelerator pedal, steering system (e.g., steering wheel), horn, light, mirror, defogger and communication systems.

The first phase of implementation of this invention can be practiced with only minor retrofit additions to the vehicle. These include the addition of a differential GPS system and an accurate map database. In this first phase, the driver will only be warned when he or she is about to depart from the road surface. During the second phase of practicing this invention, the system will be augmented with a system that will prevent the operator from leaving the assigned corridor and in particular leaving the road at high speed. In further phases of the implementation of this invention, additional systems will be integrated which will scan the roadway and act to prevent accidents with vehicles that do not have the system installed. Also communication systems will be added to permit the subject vehicle to communicate its position, velocity, etc., to other nearby vehicles which are also equipped with a system.

A primary preferred embodiment of the system, therefore, is to equip a vehicle with a DGPS system, a laser gyro or other inertial guidance system, vehicle steering, throttle and brake control apparatus, a sub-meter accurate digital map system with the relevant maps (or ability to access the relevant maps), a scanning pulsed infrared laser radar, a system for sensing or receiving signals from a highway-based precise position determination system, and communications systems for (1) sending and receiving data from similarly equipped vehicles, (2) receiving updated maps and map status information, and (3) receiving weather and road condition information. A preferred embodiment for the infrastructure enhancements includes a DGPS system, a micropower impulse radar (MIR), Radio Frequency Identification (RFID) based or equivalent precise position determining system and local weather and road condition determination and transmission system.

This invention is thus a method and apparatus for preventing vehicle accidents. A vehicle is equipped with a differential GPS (DGPS) navigational system as well as an inertial navigation subsystem. Part of the system can be an array of infrastructure stations that permit the vehicle to exactly determine its position at various points along its path. Such stations would typically be located at interals such as every 50 miles along the roadway, or more or less frequently depending on requirements as described below. These stations permit the vehicle to become its own DGPS station and thus to correct for the GPS errors and to set the position of the vehicle based initial guidance system. It also provides sufficient information for the vehicle to use the carrier frequency to determine its absolute position to within a few centimeters or better for as long as satellite locks are maintained. Data is also available to the vehicle that provides information as to the edges of the roadway, and edges of the lanes of the roadway, at the location of the vehicle so that the vehicle control system can continuously determine its location relative to the roadway edges and/or lane edges. In the initial implementation, the operator operates his or her vehicle and is unaware of the presence of the accident avoidance system. If, however, the operator falls asleep go or for some other reason attempts to drive off the roadway at high speed, the system will detect that the vehicle is approaching an edge of the roadway and will either sound an alarm or prevent the vehicle from leaving the roadway when doing so would lead to an accident. In some cases, the system will automatically reduce the speed of the vehicle and stop it on the shoulder of the roadway.

It is important to note that the invention as described in the above paragraph is in itself a significant improvement to automotive safety. Approximately half of all fatal accidents involve only a single vehicle that typically leaves the roadway and impacts with a roadside obstacle, cross an yellow line or run a red light or stop sign. This typically happens when the driver in under the influence of alcohol or drugs, has a medical emergency or simply falls asleep. If this cause of accidents could be eliminated, the potential exists for saving many thousands of deaths per year when all vehicles are equipped with the system of this invention. This would make this the single greatest advance in automotive safety surpassing both seatbelts and airbags in lifesaving potential.

A first improvement to the basic invention is to provide the vehicle with a means using radar, laser radar, optical or infrared imaging, or a similar technology, to determine the presence, location and velocity of other vehicles on the roadway that are not equipped with the accident avoidance system. The accident avoidance system (RtZF™) of this invention will not be able to avoid all accidents with such vehicles for the reasons discussed above, but will be able to provide a level of protection which is believed to surpass all known prior art systems. Some improvement over prior art systems will result from the fact that the equipped vehicle knows the location of the roadway edges, as well as the lane boundaries, not only at the location of the equipped vehicle but also at the location of the other nearby vehicles. Thus, the equipped vehicle will be able to determine that an adjacent vehicle has already left its corridor and warn the driver or initiate evasive action. In prior art systems, the location of the roadway is not known leading to significantly less discrimination ability.

A second improvement to the RtZF of this invention is to provide communication ability to other nearby similarly equipped vehicles permitting the continuous transmission and reception of the locations of all equipped vehicles in the vicinity. With each vehicle knowing the location, and thus the velocity, of all potential impacting vehicles which are equipped with the RtZF, collisions between vehicles can be reduced and eventually nearly eliminated when all vehicles are equipped with the RtZF.

A third improvement comprises the addition of software to the system that permits vehicles on specially designated vehicle corridors for the operator to relinquish control of the vehicle to the vehicle-based system, and perhaps to a roadway computer system. This then permits vehicles to travel at high speeds in a close packed formation thereby substantially increasing the flow rate of vehicles on a given roadway. Naturally, in order to enter the designated corridors, a vehicle would be required to be equipped with the RtZF. Similarly, this then provides an incentive to vehicle owners to have their vehicles so equipped so that they can enter the controlled corridors and thereby shorten their travel time.

Prior art systems require expensive modifications to highways to permit such controlled high speed close packed travel. Such modifications also require a substantial infrastructure to support the system. The RtZF of the present invention, in its simplest form, does not require any modification to the roadway but rather relies primarily on the GPS or similar satellite system. The edge and lane boundary information is either present within the vehicle RtZF memory or transmitted to the vehicle as it travels along the road. The permitted speed of travel is also communicated to the vehicles on the restricted corridor and thus each vehicle travels at the appointed speed. Since each vehicle knows the location of all other vehicles in the vicinity, should one vehicle slow down, due to an engine malfunction, for example, appropriate action can be taken to avoid an accident. Vehicles do not need to travel in groups as suggested and required by some prior art systems. Rather, each vehicle may independently enter the corridor and travel at the system defined speed until it leaves, which may entail notifying the system of a destination.

Another improvement involves the transmission of additional data concerning weather conditions, traffic accidents etc. to the equipped vehicle so that the speed of that vehicle can be limited to a safe speed depending on road conditions, for example. If moisture is present on the roadway and the temperature is dropping to the point that ice might be building up on the road surface, the vehicle can be notified by the roadway information system and prevented from traveling at an unsafe speed.

Other objectives and advantages of the RtZF system of this invention disclosed herein include:

1. To provide a system based partially on the global positioning system (GPS) or equivalent that permits an onboard electronic system to determine the position of a vehicle with an accuracy of 1 meter or better.
2. To provide a system which permits an onboard electronic system to determine the position of the edges and/or lane boundaries of a roadway with an accuracy of 1 meter or less in the vicinity of the vehicle.
3. To provide a system which permits an onboard vehicle electronic system to determine the position of the edges and/or lane boundaries of a roadway relative to the vehicle with an accuracy of less than about 10 centimeters.
4. To provide a stem that substantially reduces the incidence of single vehicle accidents caused by the vehicle inappropriately leaving the roadway at high speed.
5. To provide a system which does not require modification to a roadway which permits high speed controlled travel of vehicles on the roadway thereby increasing the vehicle flow rate on congested roads.
6. To provide a collision avoidance system comprising a sensing system responsive to the presence of at least one other vehicle in the vicinity of the equipped vehicle and means to determine the location of the other vehicle relative to the lane boundaries of the roadway and thereby determine if the other vehicle has strayed from its proper position on the highway thereby increasing the risk of a collision, and taking appropriate action to reduce that risk.
7. To provide a means whereby vehicles near each other can communicate their position and/or their velocity to each other and thereby reduce the risk of a collision.
8. To provide a means for accurate maps of a roadway to be transmitted to a vehicle on the roadway.
9. To provide a means for weather, road condition and/or similar information can be communicated to a vehicle traveling on a roadway plus means within the vehicle for using that information to reduce the risk of an accident.
10. To provide a means and apparatus for a vehicle to precisely know its location at certain positions on a road by passing through or over an infrastructure based local subsystem thereby permitting the vehicle electronic systems to self correct for the satellite errors making the vehicle for a brief time a DGPS station.
11. To utilize government operated navigation aid systems such as the WAAS and LARS as well as other available or to become available systems to achieve sub-meter vehicle location accuracies.
12. To utilize the OpenGIS™ map database structure so as to promote open systems for accurate maps for the RtZF™ system.
13. To eliminate intersection collisions caused by a driver running a red light or stop sign.
14. To eliminate intersection collisions caused by a driver executing a turn into oncoming traffic.

In contrast to some prior art systems, with the RtZF™ system in accordance with the invention, especially when all vehicles are appropriately equipped, automatic braking of the vehicle should rarely be necessary and steering and throttle control should in most cases be sufficient to prevent accidents. In most cases, braking means the accident wasn't anticipated.

It is important to understand that this is a process control problem. The process is designed so that it should not fail and thus all accidents should be eliminated. Events that are troublesome to the system include a deer running in front of the vehicle, a box falling off of a truck, a rock rolling onto the roadway and a catastrophic failure of a vehicle. Continuous improvement to the process is thus required before these events are substantially eliminated. Each individual driver and vehicle control system is part of the system and upon observing that such an event has occurred he or she should have the option of stopping the process to prevent or mitigate an emergency. All equipped vehicles therefore have the capability of communicating that the process is stopped and therefore that the vehicle speed, for example, should be substantially reduced until the vehicle has passed the troubled spot or until the problem ceases to exist. In other words, each driver is part of the process.

The RtZF™ system in accordance with the invention will thus start simple by reducing single vehicle accidents and evolve. The system has the capability to solve the entire problem by eliminating automobile accidents.

This invention is a method and apparatus for eliminating accidents by accurately determining the position of a vehicle, accurately knowing the position of the road and communicating between vehicles and between the vehicle and the infrastructure supporting travel. People get into accidents when they go too fast for the conditions and when they get out of their corridor. This invention eliminates these and other causes of accidents. In multilane highways, this system prevents people from shifting lanes if there are other vehicles in the blind spot, thus, solving the blind spot problem. The vehicle would always be traveling down a corridor where the width of the corridor may be a lane or the entire road width or something in between depending on road conditions and the presence of other vehicles.

The invention is implemented through the use of both an inertial navigation system (INS) and a DGPS, in some cases with carrier frequency enhancement. Due to the fact that the signals from at least four GPS or GLONASS satellites are not always available and to errors caused by multiple path reception from a given satellite, the DGPS systems cannot be totally relied upon. Therefore the INS is a critical part of the system. This will improve as more satellites are launched and additional ground stations are added. It will also significantly improve when the WAAS and LAAS systems are implemented and refined to work with land vehicles as well as airplanes.

Other improvements will now be obvious to those skilled in the art. The above features are meant to be illustrative and not definitive.

BRIEF DESCRIPTION OF THE DRAWINGS

The various hardware and software elements used to cam, out the invention described herein are illustrated in the form of system diagrams, block diagrams, flow charts, and depictions of neural network algorithms and structures. The preferred embodiment is illustrated in the following figures.

Figure 1:
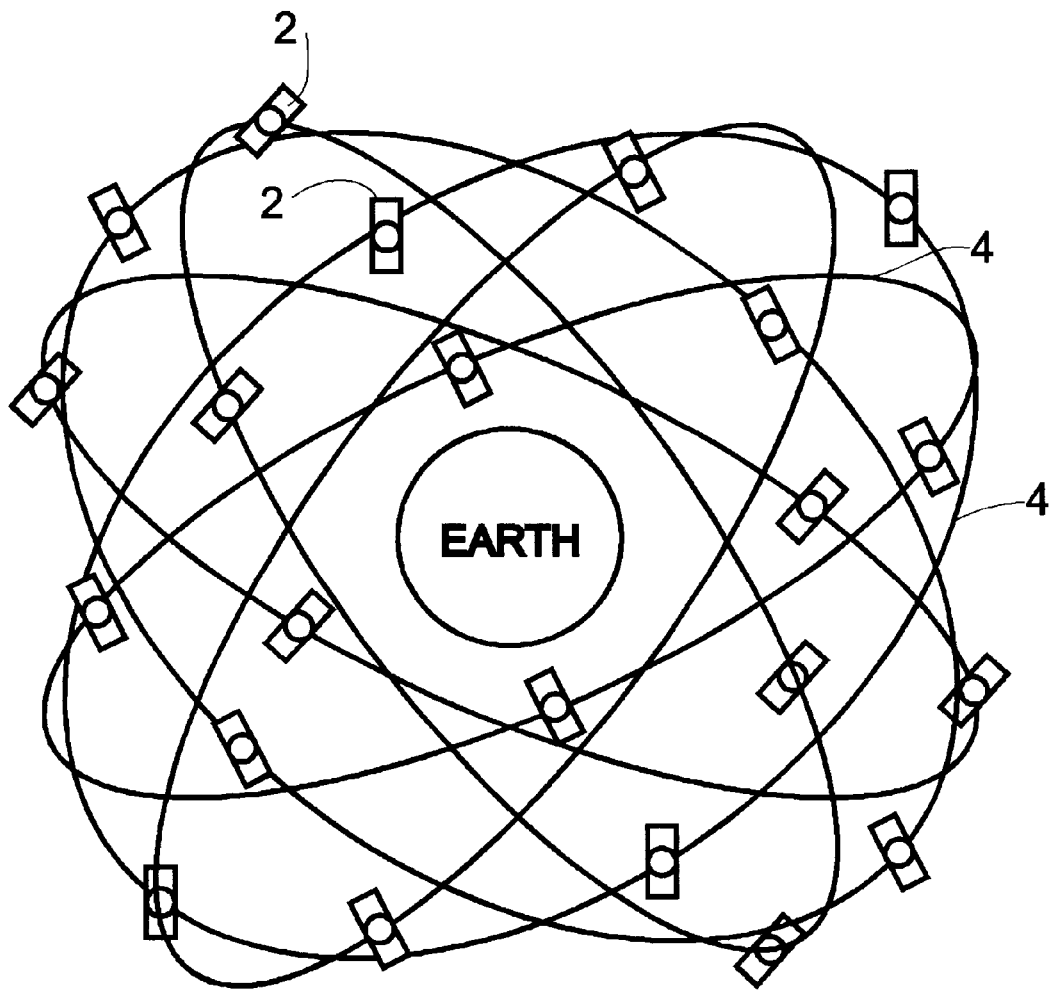
FIG. 1 illustrates the GPS satellite system with the 24 satellites revolving around the earth.

DETAILED DISCUSSION OF THE INVENTION a. Scope of the Disclosure

The preferred embodiments of the inventions are described in the Figures and Detailed Description below. Unless specifically noted, it is applicants intention that the words and phrases in the specification and claims be given the ordinary and accustomed meaning to those of ordinary skill in the applicable art(s). If applicants intend any other meaning, they will specifically state they are applying a special meaning to a word or phrase.

Likewise, applicants' use of the word "function" in the Detailed Description is not intended to indicate that the seeks to invoke the special provisions of 35 U.S.C. Section 112, paragraph 6 to define his invention. To the contrary, if applicants wish to invoke the provision of 35 U.S.C. Section 112, paragraph 6, to define their invention, they will specifically set forth in the claims the phrases "means for" or "step for" and a function, without also reciting in that phrase any structure, material or act in support of the function. Moreover, even if applicants invoke the provisions of 35

U.S.C. Section 112, paragraph 6, to define their invention, it is applicants intention that their inventions not be limited to the specific structure, material or acts that are described in their preferred embodiments. Rather, if applicants claim their invention by specifically invoking the provisions of 35 U.S.C. Section 112, paragraph 6. it is nonetheless their intention to cover and include any and all structures, materials or acts that perform the claimed function, along with any and all known or later developed equivalent structures, materials or acts for performing the claimed function.

For example, the present inventions make use of GPS satellite location technology, including the use of MIR or RFID triads, to derive kinematic vehicle location and motion trajectory parameters for use in a vehicle collision avoidance system and method. The inventions described herein are not to be limited to the specific GPS devices or PPS devices disclosed in the preferred embodiments, but rather, are intended to be used with any and all such applicable satellite location devices, systems and methods, as long as such devices, systems and methods generate input signals that can be analyzed by a computer to accurately quantify vehicle location and kinematic motion parameters in real time. Thus, the GPS devices and methods shown and referenced generally throughout this disclosure, unless specifically noted, are intended to represent any and all devices appropriate to determine such location and kinematic motion parameters.

Likewise, for example, the present inventions generate surveillance image information for analysis by scanning using any applicable image or video scanning system or method. The inventions described herein are not to be limited to the specific scanning or imaging devices disclosed in the preferred embodiments, but rather, are intended to be used with any and all applicable electronic scanning devices, as long as the device can generate an output signal that can be analyzed by a computer to detect and categorize objects. Thus, the scanners or image acquisition devices are shown and referenced generally throughout this disclosure, and unless specifically noted, are intended to represent any and all devices appropriate to scan or image a given area. Accordingly, the words "scan" or "image" as used in this specification should be interpreted broadly and generically.

Further, there are disclosed several computers or controllers, that perform various control operations. The specific form of computer is not important to the invention. In its preferred form, applicants divide the computing and analysis operations into several cooperating computers or microprocessors. However, with appropriate programming well known to those of ordinary skill in the art, the inventions can be implemented using a single, high power computer. Thus, it is not applicants intention to limit their invention to any particular form of computer.

Further examples exist throughout the disclosure, and it is not applicants intention to exclude from the scope of his invention the use of structures, materials, or acts that are not expressly identified in the specification, but nonetheless are capable of performing a claimed function.

b. Overview of the Invention

The above and other objects are achieved in the present invention which provides motor vehicle collision avoidance, warning and control systems and methods using GPS satellite location systems augmented with precise positioning systems to provide centimeter location accuracy, and to derive vehicle attitude and position coordinates and vehicle kinematic tracking information. GPS location and computing systems being integrated with vehicle video scanning, radar, laser radar, and on board speedometer and/or accelerometers and gyroscopes to provide accurate vehicle location information together with information concerning hazards and/or objects that represent impending collision situations for each vehicle. Advanced image processing techniques are used to quantify video information signals and to derive vehicle warning and control signals based upon detected hazards.

Outputs from multiple sensors as described above are used in onboard vehicle neural network and neural-fuzzy system computing algorithms to derive optimum vehicle warning and control signals designed to avoid vehicle collisions with other vehicles or with other objects or hazards that may be present on given roadways. In a preferred embodiment, neural fuzzy control algorithms are used to develop coordinated braking, acceleration and steering control signals to control individual vehicles in an optimal manner to avoid or minimize the effects of potential collisions. Video, radar, laser radar and GPS position and trajectory information are made available to each individual vehicle describing the movement of that vehicle and other vehicles in the immediate vicinity of that vehicle.

In addition, hazards or other obstacles that may represent a potential danger to a given vehicle are also included in the neural fuzzy calculations. Object, obstacles and/or other vehicles located anywhere to the front, rear or sides of a given vehicle are considered in the fuzzy logic control algorithms in the derivation of optimal control and warning signals.

Description of GPS System

Background of GPS

Referring to FIG. 1, the presently implemented Global Positioning System with its constellation of 24 satellites 2 is truly revolutionizing navigation throughout the world. The satellites orbit the Earth in six orbits 4. However, in order: to reach its full potential for navigation, GPS needs to be augmented both to improve accuracy and to reduce the time needed to inform a vehicle driver of a malfunction of a GPS satellite, the so-called integrity problem.

The Global Positioning System (GPS) is a satellite-based navigation and time transfer system developed by the U.S. Department of Defense. GPS serves marine airborne and terrestrial users, both military and civilian. Specifically, GPS includes the Standard Positioning Service (SPS) that provides civilian users with 100 meter accuracy as to the location or position of the user. It also serves military users with the Precise Positioning Service that provides 20-meter accuracy for the user. Both of these services are available worldwide with no requirement for any local equipment.

Differential operation of GPS is used to improve the accuracy and integrity of GPS. Differential GPS places one or more high quality GPS receivers at known surveyed locations to monitor the received GPS signals. This reference station(s) estimates the slowly varying components of the satellite range measurements, and forms a correction for each GPS satellite in view. The correction is broadcast to all DGPS users within the coverage area of the broadcast facilities.

DGPS

For a good discussion of DGPS, for following paragraphs are reproduced from OMNISTAR:

"The new OMNISTAR Model 6300A offers unprecedented versatility for portable, real-time, DGPS positioning. It can improve the accuracy of a GPS receiver by as much as 100 times. If your product or service needs precise positioning information. then chances are good that OMNISTAR can supply that need; and at a reasonable cost.

"What is a "DGPS" System?

"OMNISTAR is a Differential GPS (DGPS) System. It is capable of improving regular GPS to sub-meter accuracy. GPS computes a user's position by measuring ranges (actually, pseudoranges; which are ranges that are calculated by an iterative process) to three or more GPS satellites simultaneously. The Department of Defense (DOD) is intentionally limiting the accuracy of the calculation by continuously changing the onboard clock on the satellites. This process is called Selective Availability, or "SA". This appears as a continuous variation in the user's position. Using GPS in an uncorrected (stand-alone) mode, a user's calculated position mill continuously move around the true position in a near-random pattern. The indicated position may move out as far as 100 meters from the true position. The randomness makes it impossible to predict. If a user samples the position data over a long period of time, such as 24 hours, the average or mean will likely be within a meter of the true position. In statistical terms, the standard deviation will be approximately 15 to 20 meters in each horizontal coordinate.

"A DGPS System generates corrections for SA and other errors. This is accomplished by the use of one or more GPS "Base Stations" that measure the errors in the GPS system and generates corrections. A "real-time" DGPS System not only generates the corrections, but provides some methodology for getting those corrections to users as quickly as possible. This always involves some type of radio transmission system. They may use microwave systems for short ranges, low frequencies for medium ranges and geostationary satellites for coverage of entire continents.

"The method of generating corrections is similar in most DGPS systems. A GPS base station tracks all GPS Satellites that are in view at its location. The internal processor knows the precise surveyed location of the base station antenna, and it can calculate the location in space of all GPS satellites at any time by using the epheremis that is a part of the normal broadcast message from all GPS satellites. From these two pieces of information, an expected range to each satellite can be computed at any time. The difference between that computed range and the measured range is the range error. If that information can quickly be transmitted to other nearby users, they can use those values as corrections to their own measured GPS ranges to the same satellites. The key word is "quickly", because of the rapid change in the SA errors. In most radio systems, bandwidth is a finite limitation which dictates how much data can be sent in a given time period. That limitation can be eased somewhat by having the GPS base station software calculate the rate of change of the errors and add that information as part of the correction message. That term is called the range rate value and it is calculated and sent along with the range correction term. The range correction is an absolute value, in meters, for a given satellite at a given time of day. The range rate term is the rate that correction is changing, in meters per second. That allows GPS user sets to continue to use the "correction, plus the rate-of-change" for some period of time while it's waiting for a new message. The length of time you can continue to use that data without an update depends on how well the range rate was estimated. In practice, it appears that OMNISTAR would allow about 12 seconds before the DGPS error would cause a one meter position error. In other words, the "age of data" can be up to 12 seconds before the error from that term would cause a one meter position error. OMNISTAR transmits a new correction message every two and one/half seconds, so even if an occasional message is missed, the user's "age of data" is still well below 12 seconds.

"What is unique about the OMNISTAR DGPS system?

"The OMNISTAR DGPS System was designed with the following objectives: (1) continental coverage; (2) sub-meter accuracy over the entire coverage area; and (3) a portable system (backpack). The first objective dictated that the transmission system had to be from a geostationary satellite. We purchased a transponder on satellite Spacenet 3, which is located at 87 degrees West longitude. It has an antenna pattern that covers most of North America; specifically, all of the 48 states, the northern half of Mexico and the southern half of Canada. It also has sufficient power within that footprint that a tiny omnidirectional antenna can be used at the user's receiver.

"The methodology developed by John E. Chance & Assoc. of using multiple GPS base stations in a user's solution and reducing errors due to the GPS signal traveling through the atmosphere, met the second objective. It was the first widespread use of a "Wide Area DGPS Solution". It is able to use data from a relatively small number of base stations and provide consistent accuracy over extreme distances. A unique method of solving for atmospheric delays and weighting of distant base stations, achieves sub-meter capability over the entire coverage area—regardless of the user's proximity to any base station. This achieves a truly nationwide system with consistent characteristics. A user can take the equipment anywhere within the coverage area and get consistent results, without any intervention or intimate knowledge of GPS or DGPS.

"The units being sold today are sufficiently portable that they can used in a backpack. They can include an internal GPS engine (optional) that will provide a complete solution in a single system package. All that is needed is a data collector or notebook computer for display and storage of corrected GPS data.

"How does OMNI STAR work?

"The OMNISTAR Network consists of ten permanent base stations that are scattered throughout the Continental US, plus one in Mexico. These stations track all GPS Satellites above 5 degrees elevation and compute corrections every 600 milliseconds. The corrections are in the form of an industry standard message format called RTCM-104, Version II. The corrections are sent to the OMMSTAR Network Control Center in Houston via lease lines, with a dial back-up. At the NCC these messages are checked, compressed, and formed into a packet for transmission up to our satellite transponder. This occurs approximately every 2 to 3 seconds. A packet will contain the latest data from each of the 11 base stations.

"All OMNISTAR user sets receive these packets of data from the satellite transponder. The messages are first decoded from the spread-spectrum transmission format and then uncompressed. At that point, the message is an exact duplicate of the data as it was generated at each base station. Next, the atmospheric errors must be corrected. Every base station automatically corrects for atmospheric errors at it's location; but the user is not at any of those locations, so the corrections are not optimized for the user—and, OMNISTAR has no information as to each individual's location. If these errors are to be optimized for each user, then it must be done in each user's OMNISTAR. For this reason, each OMNISTAR user set must be given an approximation of its location. The approximation only needs to be within 50 to 100 miles of its true position. Given that information, the OMNISTAR user set can remove most of the atmospheric correction from each Base Station message and substitute a correction for his own location. In spite of the loose approximation of the user's location, this information is crucial to the OMNISTAR process. It makes the operation totally automatic and it is necessary for sub-meter positioning. If it is totally ignored, errors of up to ten meters can result.

"Fortunately, this requirement of giving the user's OMNISTAR an approximate location is easily solved. If OMNISTAR is purchased with the optional internal GPS receiver installed, the problem is taken care of automatically by using the position output of the GPS receiver as the approximation. It is wired internally to do exactly that. An alternate method—when the internal GPS receiver is not present—is to use the user's external GPS receiver for this function. In that case, the user's receiver must have an output message in one of the approved formats (NMEA) and protocols that OMNISTAR can recognize.

"That output can be connected back to the OMNISTAR set by using the same cable that normally supplies the RTCM-104 from OMNISTAR to the user's GPS receiver. This method works perfectly well when all the requirements on format and protocol are met. There is a third method, where a user uses a notebook computer to type in an estimated location into the, OMNISTAR user set. Any location entered by this method is preserved—with an internal battery—until it is changed. This method works fine where the user does not intend to go more than 50–100 miles from some central location.

"After the OMNISTAR processor has taken care of the atmospheric corrections, it then uses it's location versus the eleven base station locations, in an inverse distance-weighted least-squares solution. The output of that least-squares calculation is a synthesized RTCM-104 Correction Message that is optimized for the user's location. It is always optimized for the user's location that is input from the user's GPS receiver or as an approximation that is typed in from a notebook computer. This technique is called the "Virtual Base Station Solution". It is this technique that enables the OMNISTAR user to operate independently and consistently over the entire coverage area without regard to where he is in relation to our base stations. As far as we have determined, users are obtaining the predicted accuracy over the entire area."

The above description is provided to illustrate the accuracy which can be obtained from the DGPS system. It is expected that the WAAS system when fully implemented sill provide the same benefits as provided by the OMNISTAR system. However, when the standard deviation of approximately 0.5 meter is considered, it is evident that this WAAS system is insufficient by itself and will have to be augmented by other systems to improve the accuracy at least at this time.

GLONASS is a Russian system similar to GPS. This system provides accuracy that is better than GPS with SA on and not as good as GPS with SA off. It is expected that SA will be removed before the system described herein is implemented.

The Projected Position Accuracy of GPS and GLONASS, Based on the Current Performance is:

|  | Horizontal Error (m) | | Vertical Error (m) |
| --- | --- | --- | --- |
|  | (50%) | (95%) | (95%) |
| GPS (SA off) | 7 | 18 | 34 |
| GPS (SA on) | 27 | 72 | 135 |
| GLONASS | 10 | 26 | 45 |
| GPS + GLONASS | 9 | 20 | 38 |

The system described here will achieve a higher accuracy than reported in the above table due to the combination of the inertial guidance system that permits accurate changes in position to be determined and through multiple GPS readings. In other words, the calculated position will converge to the real position over its time. The addition of DGPS will provide an accuracy improvement of at least a factor of 10, which, with the addition of a sufficient number of DGPS stations in some cases is sufficient without the use of the carrier frequency correction. A further refinement where the vehicle becomes its own DGPS station through the placement of infrastructure stations at appropriate locations on roadways will further significantly enhance the system accuracy to the required level.

Multipath is the situation where more than one signal from a satellite comes to a receiver with one of the signals resulting from a reflection off of a building or the ground, for example. Since multipath is a function of geometry, the system can be designed to eliminate its effects based on highway surveying and appropriate antenna design. Multipath from other vehicles can also be eliminated since the location of the other vehicles will be known.

As discussed below. the Wide Area Augmentation System (WAAS) is being installed by the US Government to provide DGPS for airplane landings. The intent is to cover the entire continental U.S. (CONUS). This may be useful for much of the country for the purposes of this invention. Another alternative would be to use the cellular phone towers, since there are so many of them, if they could be programmed to act as pseudolites.

An important feature of DGPS is that the errors from the GPS satellites change slowly with time and therefore, only the corrections need be sent to the user from time to time. Using reference receivers separated by 25–120 km, accuracies from 10 cm to 1 m are achievable using local area DGPS which is marginal for RtZF. Alternately, through the placement of appropriate infrastructure transmitters as described below even better accuracies are obtainable.

A type of wide area DGPS (WADGPS) system has been developed spans the entire US continent which provides position RMS accuracy to better than 50 cm. This system is described in the Bertiger, et al, "A Prototype Real-Time Wide Area Differential GPS System," Proceedings of the National Technical Meeting, Navigation and Positioning in the Information Age, Institute of Navigation, Jan. 14–16, 1997 pp. 645–655. A RMS error of 50 cm would be marginally accurate for RtZF. Many of the teachings of this invention especially if the road edge and lane location error were much less which could be accomplished using more accurate surveying equipment. The OmniSTAR system is another WADGPS system that claims 6 cm (1σ) accuracy.

A similar DGPS system which is now being implemented on a nationwide basis is described in ""DGPS Architecture Based on Separating Error Components, Virtual Reference Stations and FM Subcarrier Broadcast", by Differential Corrections Inc., 10121 Miller Ave., Cupertino, Calif. 95041. The system described in this paper promises an accuracy on the order of 10 cm.

Suggested DGPS update rates are usually less than twenty seconds. DGPS removes common-mode errors, those errors common to both the reference and remote receivers (not multipath or receiver noise). Errors are more often common when receivers are close together (less than 100 km). Differential position accuracies of 1–10 meters are possible with DGPS based on C/A code SPS signals.

Using the CNET commercial system, 1 foot accuracies are possible if base stations are no more than 30 miles from the vehicle unit. This would require approximately 1000 base stations to cover CONUS. Alternately, the same accuracy is obtainable if the vehicle can become its ownDGPS system every 30 miles as described below.

Unfortunately, the respective error sources mentioned above rapidly decorrelate as the distances between the reference station and the vehicle increases. Conventional DGPS is the terminology used when the separation distances are sufficiently small that the errors cancel. The terms single-reference and multi-reference DGPS are occasionally used in order to emphasize whether there is a single reference station or whether there are multiple ones. If it is desired to increase the area of coverage and, at the same time, to minimize the number of fixed reference receivers, it becomes necessary to model the spatial and temporal variations of the residual errors. Wide Area Differential GPS (WADGPS) is designed to accomplish this. In addition, funds have now been appropriated for the US Government to deploy a national DGPS system.

Pseudolites

Pseudolites are artificial satellite like structures, located on the earth surface, that can be deployed to enhance the accuracy of the DGPS system. Such structures could become part of the RtZF™ system.

WAAS

The Wide Area Augmentation System (WAAS) is being deployed to replace the Instrument Landing System used at airports across the country. The WAAS system provides an accuracy of from about 1 to 2 meters for the purpose of aircraft landing. If the vertical position of the vehicle is known, as would be in the case of automobiles at a known position on a road, this accuracy can be improved significantly. Thus, for many of the purposes of this invention, the WAAS can be used, to provide accurate positioning information for vehicles on roadways. The accuracy of the WAAS is also enhanced by the fact that there is an atomic clock in every WAAS receiver station that would be available to provide great accuracy using carrier phase data. With this system sub-meter accuracies are possible for some locations.

The WAAS is based on a network of approximately 35 ground reference stations. Signals from GPS satellites are received by aircraft receivers as well as by ground reference stations. Each of these reference stations is precisely surveyed, enabling each to determine any error in the GPS signals being received at its own location. This information is then passed to a wide area master station. The master station calculates correction algorithms and assesses the integrity of the system. This data is then put into a message format and sent to a ground earth station for uplink to a geostationary communications satellite. The corrective information is forwarded to the receiver on board the aircraft, which makes the needed adjustments. The communications satellites also act as additional navigation satellites for the aircraft, thus, providing additional navigation signals for position determination.

This system will not meet all of FAA's requirements. For category III landings, the requirement is 1.6-m vertical and horizontal accuracy. To achieve this, FAA is planning to implement a network of local area differential GPS stations that will provide the information to aircraft. This system is referred to as the Local Area Augmentation System (LAAS).

The WAAS system, which consists of a network of earth stations and geo-synchronous satellites, is currently being funded by the U.S. Government for aircraft landing purposes. Since the number of people that die yearly in automobile accidents greatly exceeds those killed in airplane accidents, there is clearly a greater need for a WAAS type system for solving the automobile safety problem using the teachings of this invention. Also, the reduction in required highway funding resulting from the full implementation of this invention would more then pay for the extension and tailoring of the WAAS to cover the nations highways.

LAAS

The Local Area Augmented System (LAAS) is also being deployed in addition to the WAAS system to provide even greater coverage for the areas surrounding major airports. According to Newsletter of the Institute of Navigation, 1997, "the FAA's schedule for (LAAS) for Category II and III precision instrument approaches calls for development of standards by 1998 that will be sufficient to complete a prototype system by 2001. The next step will be to work out standards for an operational system to be fielded in about 2005, that could serve nationwide up to about 200 runways for Cat II-III approaches."

In a country like the United States, which has many airfields, a WAAS can serve a large market and is perhaps most effective for the control of airplane landings. The best way for other countries, with fewer airports, to participate in the emerging field of GPS-based aviation aids may be to build LAAS. In countries with a limited number of airports, LAAS is not very expensive while the costs of building a WAAS to get Category I type accuracy is very expensive. However, with the added benefit of less highway construction and greater automobile safety, the added costs for a WAAS system may well be justified for much of the world.

For the purposes of the RtZF™ system, both the WAAS and LAAS would be useful but probably insufficient unless the information is used in a different mathematical system such as used by the OmniSTAR™ WADGPS system. Unlike an airplane, there are many places where it might not be possible to receive LAAS and WAAS information or even more importantly the GPS signals themselves with sufficient accuracy and reliability. Initial RtZFT™ systems may therefore rely on the WAAS and LAAS but as the system develops more toward the goal of zero fatalities, road based systems which permit a vehicle to pinpoint its location will be preferred. However, there is considerable development ongoing in this field so that all systems are still candidates for use with RtZF™ system and the most cost effective will be determined in time.

Carrier Phase Measurements

An extremely accurate form of GPS is Carrier Based Differential GPS. This form of GPS utilizes the 1.575 GHz carrier component of the GPS signal on which the Pseudo Random Number (PRN) code and the data component are superimposed. Current versions of Carrier Based Differential GPS involve generating position determinations based on the measured phase differences at two different antennas, a base station or pseudolite and the vehicle, for the carrier component of a GPS signal. This technique initially requires determining how many integer wave-lengths of the carrier component exist between the two antennas at a particular point in time. This is called integer ambiguity resolution. A number of approaches currently exist for integer ambiguity resolution. Some examples can be found in U.S. Pat. Nos. 5,583,513 and 5,619,212. Such systems can achieve sub-meter accuracies and, in some cases; accuracies of about 1 cm or less. U.S. Pat. No. 5,477,458 discloses a DGPS system that is accurate to about 5 cm with the base stations located on a radius of about 3000 km. With such a system, very few base stations would be required to cover the continental United States. This system still suffers from the availability of accurate signals at the vehicle regardless of its location on the roadway and the location of surrounding vehicles and objects. Nevertheless, the principle of using the carrier frequency to precisely determine the location of a vehicle can be used with the highway based systems described below to provide extreme location accuracies. Using the PPS system described below where a vehicle becomes its own DGPS system, the carrier phase ambiguity problem also disappears since the number of cycles can be calculated if the precise location is known. There is no ambiguity when the vehicle is at the PPS station and that is maintained as long as the lock on a satellite is not lost for more than a few minutes.

Other Aids

There are other sources of information that can be added to increase the accuracy of position determination. The use of GPS with four satellites provides the three dimension location of the vehicle plus time. Of the dimensions, the vertical is the least accurately known, yet, if the vehicle knows where it is on the roadway, the vertical dimension is not only the least important but it is also already accurately known from the roadmap information plus the inertial guidance system.

Another aid is to provide markers along side the roadway which can be either visual, passive or active transponders, reflectors, or a variety of other technologies, which have the property that as a vehicle passes the marker it can determine the identity of the marker and from a database it can determine the exact location of the marker. If three or more of such markers are placed along side of the roadway, a passing vehicle can determine its exact location by triangulation. Although it may be impractical to initially place such markers along all roadways, it would be reasonable to place them in particularly congested areas or places where it is known that a view of one or more of the GP S satellites is blocked. A variation of this concept will be discussed below.

Although initially it is preferred to use the GPS navigational satellites as the base technology, the invention is not limited thereby and contemplates using all methods by which the location of the vehicle can be accurately determined relative to the earth surface. The location of the roadway boundaries and the location of other vehicles relative to the earth surface are also to be determined and all relevant information used in a control system to substantially reduce and eventually eliminate vehicle accidents. Only time and continued system development will determine the mix of technologies that provide the most cost effective solution. All forms of information and methods of communication to the vehicle are contemplated including direct communication with stationary and moving satellites, communication with fixed earth-based stations using infrared, optical, radar, radio and other segments of the electromagnetic spectrum. Some additional examples follow:

A pseudo-GPS can be delivered from cell phone stations, in place of or in addition to satellites. In fact, the precise location of a cell phone tower need not initially be known. If it monitors the GPS satellites over a sufficiently long time period, the location can be determined as the calculated location statistically converges to the exact location. Thus, every cell phone tower could become an accurate DGPS base station for very little cost. DGPS corrections can be communicated to a vehicle via FM radio via a sub-carrier frequency for example. An infrared or radar transmitter along the highway can transmit road boundary location information. A CD-ROM or other portable mass storage can be used at the beginning of a controlled highway to provide road boundary information to the vehicle. Finally, it is contemplated that eventually a satellite will broadcast periodically, perhaps every five minutes, a table of dates covering the entire CONUS that provides the latest update date of each map segment. If a particular vehicle does not have the latest information for a particular region where it is operating, it will be able to use its cell phone to call and retrieve such road maps perhaps through the Internet. Emergency information would also be handled in a similar manner so that if a tree fell across the highway, for example, all nearby vehicles would be notified.

Other Location Fixing Systems

It is expected, especially initially, that there will be many holes in the DGPS or GPS and their various implementations that will leave the vehicle without an accurate means of determining its location. The inertial navigation system described below will help in filling these holes but its accuracy is limited to a time period significantly less than an hour and a distance of less than 50 miles before it needs correcting. That may not be sufficient to cover the period between DGPS availability. It is therefore contemplated that the RtZF system will also make use of low cost systems located along the roadways that permit a vehicle to accurately determine its location. One example of such a system would be to use a group of three Micropower Impulse Radar (MIR) units such as developed by Lawrence Livermore Laboratory.

Figure 11:
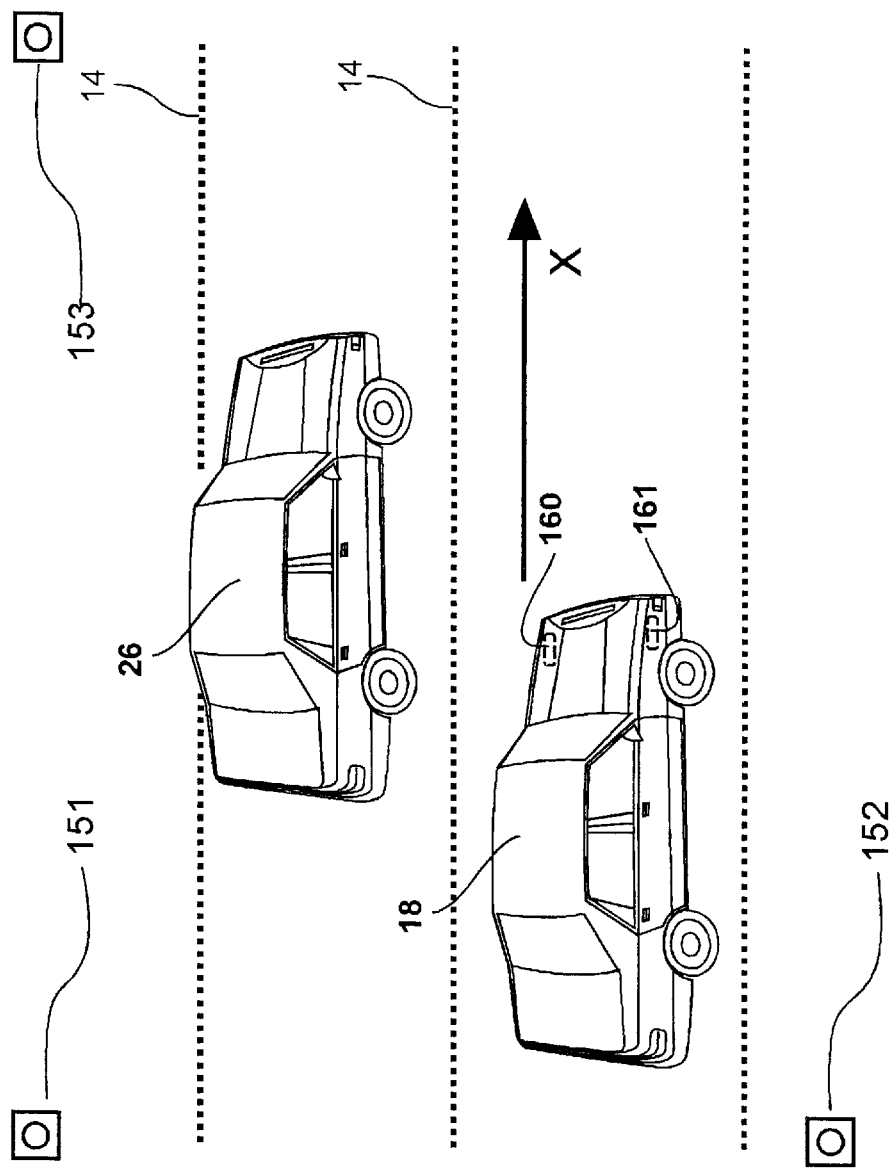
FIG. 11 illustrates the use of a precise positioning system employing three micropower impulse radar transmitters or three RFID tags in a configuration to allow a vehicle to accurately determine its position.

A MIR operates on very low power and periodically transmits a very short spread spectrum radar pulse. The estimated cost of a MIR is less than $10 even in small quantities. If three such MIR transmitters, 151, 152 and 153, as shown in FIG. 11, are placed along the highway and triggered simultaneously or with a known delay, and if a vehicle has an appropriate receiver system, the time of arrival of the pulses can be determined and thus the location of the vehicle relative to the transmitters determined. The exact location of the point where all three pulses arrive simultaneously would be the point that is equidistant from the three transmitters and would be located on the map information. Only three devices are required since only two dimensions need to be determined since it is assumed that the vehicle in on the road and thus the vertical position is known, otherwise four MIRs would be required. Thus it would not even be necessary to have the signals contain identification information since the vehicle would not be so far off in its position determination system to confuse different locations. By this method, the vehicle would know exactly where it was whenever it approached and passed such a triple-MIR installation. The MIR triad PPS or equivalent could also have a GPS receiver and thereby determine its exact location over time as described above for cell phone towers. After the location has been determined, the GPS receiver can be removed. In this case, the MIR triad PPS or equivalent could be placed at will and they could transmit their exact location to the passing vehicles. An alternate method would be to leave the GPS receiver with the PPS time of arrival of the GPS data from each satellite so that the passing vehicles that do not go sufficiently close to the PPS can still get an exact location fix. A similar system using RFID tags is discussed below.

Naturally, several such readings and position determinations can be made with one approach to the MIR installation, the vehicle need not wait until they all arrive simultaneously. Also the system can be designed so that the signals never arrive at the same time and still provide the same accuracy as long as there is a sufficiently accurate clock on board the vehicle. One way at looking at FIG. 11 is that transmitters 151 and 152 fix the lateral position of the vehicle while transmitters 151 and 153 fix the location of the vehicle longitudinally. The three transmitters 151,152,153 need not be along the edges on one lane but could span multiple lanes and they need not be at ground level but could be placed sufficiently in the air so that passing trucks would not block the path of the radiation from an automobile, Particularly in congested areas, it might be desirable to code the pulses and to provide more than three transmitters to further protect against signal blockage or multipath.

The power requirements for the MIR transmitters are sufficiently low that a simple photoelectric cell array can provide sufficient power for most if not all CONUS locations. With this exact location information, the vehicle can become its own DGPS station and can determine the corrections necessary for the GPS. It can also determine the integer ambiguity problem and thereby know the exact number of wave lengths between the vehicle and the satellites or between the vehicle and the MIR station.

MIR is one of several technologies that can be used to provide precise location determination. Others include the use of an RFID tag that is designed in cooperation with its interrogator to provide a distance to the tag measurement and radar or other reflectors where the time of flight can be measured.

Once a vehicle passes a Precise Positioning Station (PPS) such as the MIR triad described above, the vehicle can communicate this information to surrounding vehicles. If the separation distance between two communicating vehicles can also be determined by the time-of-flight method, then the vehicle that has just passed the triad can, in effect, become a satellite equivalent or moving pseudolite. Finally, if many vehicles are communicating their positions to many other vehicles along with an accuracy of position assessment, each vehicle can use this information along with the measured separation distances to improve the accuracy that its position is known. In this manner, as the number of such vehicles increases the accuracy of the whole system increases until an extremely accurate positioning system for all vehicles results. Such a system, since it combines many sources of position information, is tolerant of the failure of any one or even several such sources. Thus, the RtZF™ system becomes analogous to the Internet in that it can't be shut down and the goal of perfection is approached. Some of the problems associated with this concept will be discussed in more detail below.

Inertial Navigation System

In many cases, especially before the system implementation becomes mature and the complete infrastructure is in place, there will be times when a particular vehicle system is not operational. This could be due to obstructions hiding a clear view of a sufficient number of GPS satellites, such as when a vehicle enters a tunnel. It could also be due to a lack of road boundary information, due to construction or the fact that the road has not been surveyed and the information recorded and made available to the vehicle, or a variety of other causes. It is contemplated, therefore, that each equipped vehicle will contain a warning light that warns the driver when he or she is at a position where the system is not operational. If this occurs on one of the especially designated highway lanes, the vehicle speed will be reduced until the system again becomes operational.

When the system is non-operational for a short distance, the vehicle will still accurately know its position if there is, in addition, one or more laser gyroscopes, micromachined angular rate sensors or equivalent, and one or more accelerometers that together are referred to as an Inertial Navigation System (INS). Generally, such an INS will have three gyroscopes and three accelerometers.

As more sensors which are capable of providing information on the vehicle position, velocity and acceleration are added onto the vehicle, the system can become sufficiently complicated as to require a neural network, or neural-fuzzy, system to permit the optimum usage of the available information. This becomes even more important when information from outside the vehicle other than the GPS related systems becomes more available. For example, a vehicle may be able to communicate with other vehicles that have similar systems and learn their estimated location. If the vehicle can independently measure the position of the other vehicle, for example through the use of the scanning impulse laser radar system described below, and thereby determine the relative position of the two or more vehicles, a further improvement of the position can be determined for all such vehicles. Adding all such additional information into the system would probably require a computational method such as neural networks or a combination of a neural network and a fuzzy logic system.

Conclusion—How Used

One way to imagine the system operation is to consider each car and roadway edge to behave as if it had a surrounding "force field" that would prevent it from crashing into another vehicle or an obstacle along the roadway. A vehicle operator would be prevented from causing his or her vehicle to leave its assigned corridor. This is accomplished with a control system that controls the steering, acceleration and perhaps the vehicle brakes based on its knowledge of the location of the vehicle, highway boundaries and other nearby vehicles. In a preferred implementation, the location of the vehicle is determined by first using the GPS L1 signal to determine its location within approximately 100 meters. Then using DGPS and corrections which are broadcast whether by FM or downloaded from geo-synchronous or Low Earth Orbiting (LEO) satellites or obtained from road based transmitters to determine its location within less than about 10 centimeters. Finally the use of a MIR or similar system periodically permits the vehicle to determine its exact location and thereby determine the GPS corrections, eliminate the carrier cycle ambiguity and set the INS system. If this is still not sufficient, then the phase of the carrier frequency provides the required location information to less than a few centimeters. Dead reckoning, using vehicle speed, steering angle and tire rotation information and/or inertial guidance, can be used to fill in the gaps. Where satellites are out of view, pseudolites, or other systems, are placed along the highway. A pulsed scanning infrared laser radar system, or an equivalent system, is used for obstacle detection. Communication to other vehicles is by short distance radio or by spread spectrum time domain pulse radar as described by Time Domain Incorporated.

One problem which will require addressing as the system becomes mature is temporary blockage of a satellite by large trucks or other movable objects. whose location cannot be foreseen by the system designers. Another concern is to prevent vehicle owners from placing items on the vehicle exterior that block the GPS and communication antennas.

Communication with Other Vehicles—Collision Avoidance

MIR might also be used for vehicle to vehicle communication except that it is line of sight. An advantage is that we can know when a particular vehicle will respond by range gating. Also, the short time of transmission permits many vehicles to communicate at the same time.

Description—Requirements

The communication between vehicles for collision avoidance purposes cannot solely be based on line-of-sight technologies as this is not sufficient since vehicles which are out of sight can still cause accidents. On the other hand, vehicles that are a mile away from one another but still in sight, need not be part of the communication system. Messages sent by each vehicle, in accordance with an embodiment of the invention, would contain information indicating exactly where it is located and perhaps information as to what type of vehicle it is. The type of vehicle can include emergency vehicles, construction vehicles, trucks classified by size and weight, automobiles, and oversized vehicles. The subject vehicle can therefore eliminate all of those vehicles that are not potential threats, even if such vehicles are very close, but on the other side of the highway barrier.

The use of an Ethernet protocol will satisfy the needs of the network, consisting of all threatening vehicles in the vicinity of the subject vehicle. Alternately, a network where the subject vehicle transmits a message to a particular vehicle and waits for a response could be used. From the response time, the relative position of other vehicles can be ascertained which provides one more method of position determination. Thus, the more vehicles that are on the road with the equipped system, the greater accuracy of the overall system and the safer the system becomes, as described above.

To prevent accidents caused by a vehicle leaving the road surface and impacting a roadside obstacle requires only an accurate knowledge of the position of the vehicle and the road boundaries. To prevent collisions with other vehicles requires that the position of all nearby automobiles must be updated continuously. But just knowing the position of a threatening vehicle is insufficient. The velocity, size and orientation of the vehicle are also important in determining what defensive action or reaction may be required. Once all vehicles are equipped with the system of this invention, the communication of all relevant information will take place via a communication link, e.g., a radio link. In addition to signaling its absolute position, each vehicle will send a message identifying the approximate mass, velocity, orientation, and other relevant information. This has the added benefit that emergency vehicles can make themselves known to all vehicles in their vicinity and all such vehicles can then take appropriate action. The same system can also be used to relay accident or other hazard information from vehicle to vehicle.

U.S. Pat. No. 5,128,669 to Dabbs provides for 2-way communication and addressing messages to specific vehicles. This is unnecessary and the communications can be general since the amount of information that is unique to one vehicle is small. A method of handing bidirectional communication is. disclosed in U.S. Pat. No. 5,506,584 to Boles.

Preferred System

One preferred method of communication between vehicles uses that portion of the electromagnetic spectrum that permits only line of sight communication. In this manner, only those vehicles that are in view can communicate. In most cases. a collision can only occur between vehicles that can see each other. This system has the advantage that the "communications network" only contains nearby vehicles. This would require that when a truck. for example, blocks another stalled vehicle that the information from the stalled vehicle be transmitted via the truck to a following vehicle. An improvement in this system would use a rotating aperture that would only allow communication from a limited angle at a time further reducing the chance for multiple messages to interfere with each other. Each vehicle transmits at all angles but receives at only one angle at a time. This has the additional advantage of confirming at least the direction of the transmitting vehicle. An infrared rotating receiver can be looked at as similar to the human eye. That is, it is sensitive to radiation from a range of directions and then focuses in on the particular direction, one at a time, from which the radiation is coming. It does not have to scan continuously. In fact, the same transmitter which transmits 360 degrees could also receive from 360 degrees with the scanning accomplished using software.

An alternate preferred method is to use short distance radio communication so that a vehicle can receive position information from all nearby vehicles such as the DS/SS system. The location information received from each vehicle can then be used to eliminate it from further monitoring if it is found to be on a different roadway or not in a potential path of the subject vehicle.

Many communications schemes have been proposed for inter-vehicle and vehicle-to-road communication. At this, time, a suggested approach utilizes DS/SS communications in the 2.4 GHz INS band. Experiments have shown that communications are 100 percent accurate at distances up to 200 meters. At a closing velocity of 200 KPH, at 0.5 g deceleration, it requires 30 meters for a vehicle to stop. Thus, communication accurate to 200 meters is sufficient to cover all vehicles that are threatening to a particular vehicle.

A related method would be to use a MIR system in a communications mode. Since the width of the pulses typically used by MIR is less than a nanosecond, many vehicles can transmit simultaneously without fear of interference.

With either system, other than the MIR system, the potential exists that more than one vehicle will attempt to send a communication at the same time and there will then be a 'data collision'. If all of the communicating vehicles are considered as being part of a local area network, the standard Ethernet protocol can be used to solve this problem. In that protocol, when a data collision occurs, each of the transmitting vehicles which was transmitting at the time of the data collision would be notified that a data collision had occurred and that they should retransmit their message at a random time later. When several vehicles are in the vicinity and there is the possibility of collisions of the data, each vehicle can retain the coordinates last received from the surrounding vehicles as well as their velocities and predict their new locations even though some data was lost.

If a line of sight system is used, an infrared or MIR system would be good choices. In the infrared case, and if an infrared system were also used to interrogate the environment for non-equipped vehicles, pedestrians, animals etc., as discussed below, both systems could use some of the same hardware.

If point-to-point communication can be established between vehicles, such as described in U.S. Pat. No. 5,528, 391 to Elrod, then the need for a collision detection system like Ethernet would not be required. If the receiver on a vehicle, for example, only has to listen to one sender from one other vehicle at a time, then the bandwidth can be considerably higher since there will not be any interruption.

When two vehicles are communicating their positions to each other, it is possible through the use of range gating or the sending of a "clear to send signal" and timing the response to determine the separation of the vehicles. This assumes that the properties of the path between the vehicles is known which would be the case if the vehicles are within view of each other. If, on the other hand, there is a row of trees, for example, between the two vehicles, a false distance measurement would be obtained if the radio waves pass through a tree. If the communication frequency is low enough that it can pass through a tree in the above example, it will be delayed. If it is a much higher frequency such that is blocked by the tree then it still might reach the second vehicle through a multi-path. Thus, in both cases an undetectable range error results. If a range of frequencies is sent, as in a spread spectrum pulse, and the first arriving pulse contains all of the sent frequencies then it is likely that the two vehicles are in view of each other and the range calculation is accurate. If any of the frequencies are delayed then the range calculation can be considered inaccurate and should be ignored. Once again, for range purposes, the results of many transmissions and receptions can be used to improve the separation distance accuracy calculation. Alternate methods for determining range can make use of radar reflections, RFID tags etc.

Enhancements

In the accident avoidance system of the present invention, the information indicative of a collision could come from a vehicle that is quite far away from the closest vehicles to the subject vehicle. This is a substantial improvement over the prior art collision avoidance systems, which can only react to a few vehicles in the immediate vicinity. The system described herein also permits better simultaneous tracking of several vehicles. For example, if there is a pileup of vehicles down the highway then this information can be transmitted to control other vehicles that are still a significant distance from the accident. This case cannot be handled by prior art systems. Thus, the system described here has the potential to be part of the U.S. Pat. No. 5,572,428 to Ishida, for example.

The network analogy, can be extended if each vehicle receives and retransmits all received data as a single block of data. In this way, each vehicle is assured in getting all of the relevant information even if it gets it from many sources. Even with many vehicles, the amount of data being transmitted is small relative to the bandwidth of the infrared optical or radio technologies. Naturally, in some particular cases, a receiver and retransmitter can be part of the highway infrastructure. Such a case might be on a hairpin curve in the mountains where the oncoming traffic is not visible.

In some cases, it may be necessary for one vehicle to communicate with another to determine which evasive action each should take. This could occur in a multiple vehicle situation when one car has gone out of control due to a blowout, for example. In such cases, one vehicle may have to tell the other vehicle what evasive actions it is planning. The other vehicle can then calculate whether it can avoid a collision based of the planned evasive action of the first vehicle and if not it can inform the first vehicle that it must change its evasive plans. The other vehicle would also inform the first vehicle as to what evasive action it is planning. Several vehicles communicating in this manner can determine the best paths for all vehicles to take to minimize the danger to all vehicles.

If a vehicle is stuck in a corridor and wishes to change lanes in heavy traffic, the operator's intention can be signaled by the operator activating the turn signal. This could send a message to other vehicles to slow down and let the signaling vehicle change lanes. This would be particularly helpful in an alternate merge situation.

Communication with Highway—Maps

Statement of the Problem

The initial maps showing roadway lane and boundary location for the CONUS should preferably be installed within the vehicle at the time of manufacture. The vehicle thereafter would check on a section by section basis whether it had the latest update information for the particular and surrounding locations where it is being operated. One method of verifying this information would be achieved if a satellite periodically broadcasts the latest date and time or version that each segment had been most recently updated. This matrix would amount to a small transmission requiring perhaps from a few seconds to one minute of airtime. Any additional emergency information could also be broadcast in between the periodic transmissions to cover accidents, trees falling onto roads etc. If the periodic transmission were to occur every five minutes and if the motion of a vehicle were somewhat restricted until it had received a periodic transmission, the safety of the system can be assured. If the vehicle finds that it does not have the latest map information, the cell phone in the vehicle can be used to log onto the Internet, for example, and the missing data downloaded. An alternate is for the LEOs, or other satellites, to broadcast the map corrections directly.

It is also possible that the map data could be off loaded from a transmitter on the highway itself. In that manner, the vehicles would only obtain that map information which it needed and the map information would always be up to the minute. As a minimum, temporal data communication stations can be placed before highway sections that are undergoing construction or where a recent blockage has occurred and where the maps have not yet been updated. Such an emergency data transfer would be signaled to all approaching vehicles to reduce speed and travel with care. Naturally such information could also contain maximum and minimum speed information which would limit the velocity of vehicles in the area.

There is other information that would be particularly useful to a vehicle operator or control system, including in particular the weather conditions especially at the road surface. Such information could be obtained by road sensors and then transmitted to all vehicles in the area by a permanently installed system. Alternately, there have been recent studies that show that icing conditions on road surfaces, for example, can be accurately predicted by local meteorological stations and broadcast to vehicles in the area. If such a system is not present, then, the best place to measure road friction is at the road surface and not on the vehicle. The vehicle requires advance information of an icing condition in order to have time to adjust its speed or take other evasive action. The same road based or local meteorological transmitter system could be used to warn the operators of traffic conditions, construction delays etc. and to set the local speed limit.

Maps

All information regarding the road, both temporary and permanent, should be part of the map database, including speed limits, presence of guard rails, width of each lane, width of the highway, width of the shoulder, character of the land beyond the roadway, existence of poles or trees and other roadside objects, exactly where the precise position location apparatus is located, etc. The speed limit associated with particular locations on the maps should be coded in such a way that the speeds limit can depend upon the time of day and the weather conditions. In other words, the speed limit is a variable that will change from time to time depending on conditions. It is contemplated that there will be a display for various map information present which will always be in view for the passenger and for the driver at least when the vehicle is operating under automatic control. Additional user information can thus also be displayed such as traffic conditions, weather conditions, advertisements, locations of restaurants and gas stations, etc.

A map showing the location of road and lane boundaries can be easily generated using a specially equipped survey vehicle that has the most accurate position measurement system available. In some cases, it might be necessary to set up one or more temporary local DGPS base stations in order to permit the survey vehicle to know its position within a few centimeters. The vehicle would drive down the roadway while operators, using specially designed equipment, sight the road edges and lanes. This would probably best be done with laser pointers and cameras. Transducers associated with the pointing apparatus record the angle of the apparatus and then by triangulation determine the distance of the road edge or lane marking from the survey vehicle. Since the vehicle's position would be accurately known, the boundaries and lane markings can be accurately determined. It is anticipated that the mapping activity would take place continuously such that all roads in a particular state would be periodically remapped in order to pickup up any changes which were missed by other monitoring systems and to improve the reliability of the maps by minimizing the chance for human error. Any roadway changes that were discovered would trigger an investigation as to why they were not recorded earlier thus adding feedback to the mapping part of the process.

The above-described method depends on human skill and attention and thus is likely to result in many errors. A preferred approach is to carefully photograph the edge of the road and use the laser pointers to determine the location of the road lines relative to the pointers and to determine the slope of the roadway through triangulation. In this case several laser pointers would be used emanating from above, below and to the sides of the camera. The reduction of the data is then done later using equipment that can automatically pick out the lane markings and the reflected spots from the laser pointers. One aid to the mapping process is to place chemicals in the line paint that could be identified by the computer software when the camera output is digitized. This may require the illumination of the area being photographed by an infrared or ultraviolet light, for example.

In some cases where the roadway is straight, the survey vehicle could travel at moderate speed while obtaining the boundary and lane location information. In other cases, where the road in turning rapidly, more readings would be required per mile and the survey vehicle would need to travel more slowly. In any case, the required road information can be acquired semi-automatically with the survey vehicle traveling at a moderate speed. Thus, the mapping of a particular road would not require significant time or resources. It is contemplated that a few such survey vehicles could map all of the interstate highways in the United States in less than one year.

The mapping effort could be supplemented and cross-checked though the use of accurate detailed digital photogrammetic systems which, for example, can determine the road altitude with an accuracy to <50 cm. Efforts are underway to map the earth with 1-meter accuracy. The generated maps could be used to check the accuracy of the road-determined maps.

Another improvement that can be added to the system based on the maps is to use a heads up display for in-vehicle signage. As the vehicle travels down the road, the contents of road side signs can be displayed on a heads up display, providing such a display is available in the vehicle, or on a specially installed LCD display. This is based on the inclusion in the map database the contents of all highway signs. A further improvement would be to include signs having varying messages which would require that the message be transmitted by the sign to the vehicle and received and processed for in vehicle display.

As the roadway is being mapped, the availability of GPS satellite view, and the presence of multipath reflections from fixed structures can also be determined. This information can then be used to determine the advisability of locating a local precise location system, or other infrastructure at a particular spot on the roadway. Cars can also be used as probes for this process and for continuous improvement to check the validity of the maps and report any errors.

Multipath is the situation where more than one signal from a satellite comes to a receiver with one of the signals resulting from a reflection off of a building or the ground, for example. Since multipath is a function of geometry, the system can be designed to eliminate its effects based on highway surveying and appropriate antenna design. Multipath from other vehicles can also be eliminated since the location of the other vehicles will be known.

Privacy

People do not necessarily want the government to know where they are going and therefore will not want information to be transmitted that can identify the vehicle. The importance of this issue may be overestimated. Most people will not object to this minor infraction if they can get to their destination more efficiently and safely.

On the other hand, it has been estimated that there are 100,000 vehicles on the road, many of them stolen, where the operators do not want the vehicle to be identified. If an identification process that positively identifies the vehicle were made part of this system, it could thus cut down on vehicle theft. Alternately, thieves might attempt to disconnect the system thereby defeating the full implementation of the system and thus increasing the danger on the roadways and defeating the RTZF objective. The state of the system would therefore need to be self-diagnosed and system readiness must be a condition for entry onto the restricted lanes.

Sensing of Non-RtZF Equipped Objects

Problem Statement

Vehicles with the RtZF™ system in accordance with the invention must also be able to detect those vehicles that do not have the system as well as pedestrians, animals, bicyclists, and other hazards that may cross the path of the equipped vehicle.

Prior Art

Although, there appears not to be any significant prior art involving a vehicle communicating safety information to another vehicle on the roadway, several patents discuss methods of determining that a collision might take place using infrared and radar. U.S. Pat. No. 5,249,128 to Markandey et al., for example, discusses methods of using infrared to determine the distance to a vehicle in front and U.S. Pat. No. 5,506,584 to Boles describes a radar-based system. Both systems suffer from a high false alarm rate and could be substantially improved if a pattern recognition system such as neural networks were used.

Description

Systems based on radar have suffered from the problem of being able to sufficiently resolve the images which are returned to be able to identify the other vehicles, bridges, etc. One method used for adaptive cruise control systems is to ignore everything that is not moving. This, of course, leads to accidents if this were used with the instant invention. The problem stems from the resolution achievable with radar unless the antenna is made very large. Since this is impractical for use with automobiles, only minimal collision avoidance can be obtained using radar.

Optical systems can provide the proper resolution but may require illumination with a bright light or laser. If the laser is in the optical range, there is a danger of causing eye damage to pedestrians or vehicle operators. As a minimum, it will be distracting and annoying to other vehicle operators.

A laser operating in the infrared part of the electromagnetic spectrum avoids the eye danger problem, provided the frequency is sufficiently far from the visible, and, since it will not be seen, it will not be annoying. Infrared also has the proper resolution so that pattern recognition technologies can be employed to recognize various objects, such as vehicles, in the reflected image. Infrared has another advantage from the object recognition perspective. All objects radiate and reflect infrared. The hot engine or tires of a moving vehicle in particular are recognizable signals. Thus, if the area around a vehicle is observed with both passive and active infrared, more information can be obtained than from radar, for example. Infrared is less attenuated by fog than optical frequencies, although it is not as good as radar. Infrared is also attenuated by snow but at the proper frequencies it has about five times the range of human sight.

An example of such an instrument is made by Sumitomo Electric and is sufficient for the purpose here. The Sumitomo product has been demonstrated to detect leaves of a tree at a distance of about 300 meters. The product operates at a 1.5 micron wavelength.

This brings up a philosophical discussion about the trade-offs between radar with greater range and infrared laser radar with more limited range but greater resolution. At what point should driving during bad weather conditions be prohibited? If the goal of zero fatalities is to be realized, then people should not be permitted to operate their vehicles during dangerous weather conditions. This may require closing roads and highways prior to the start of such conditions. Under such a policy, a system which accurately returns images of obstacles on the roadway that are two to five times the visual distance should be adequate. In such a case, radar would not be necessary.

Laser Radar Scanning System

The digital map can be used to define the field that the laser radar scanner will interrogate. The laser radar scanner will return information as to distance to an object in the scanned field. This will cover all objects that are on or adjacent to the highway. The laser pulse can be a pixel that is one inch in diameter at 100 feet, for example. The scanner must scan the entire road at such a speed that the motion of the car can be considered insignificant. Alternately, a separate aiming system that operates at a much lower speed, but at a speed to permit compensation for the car angle changes. Such an aiming system is also necessary due to the fact that the road curves up and down. Therefore two scanning methods, one a slow, but for large angle motion and the other fast but for small angles may be required. The large angular system requires a motor drive while the small angular system can be accomplished through the use of an acoustic wave system, such as Lithium Niobate (LiNbO$_3$), which is used to drive a crystal which has a large refractive index such as Tellurium dioxide.

Alternately, two systems can be used, a radar system for interrogating large areas and a laser radar for imaging small areas. Either or both systems can be range gated.

The laser radar scanner can be set up in conjunction with a range gate so that once it finds a object the range can be narrowed so that only that object and other objects at the same range, 65 to 75 feet for example, are allowed to pass to the receiver. In this way, an image of a vehicle can be separated from the rest of the scene for identification by pattern recognition software. Once the image of the particular object has been captured, the range gate is broadened, to about 20 to 500 feet for example, and the process repeated for another object. In this manner, all objects in the field of interest to the vehicle can be separated and individually imaged and identified. The field of interest, of course, is the field where all objects with which the vehicle can potentially collide reside. Particular known and mapped features on the highway can be used as aids to the scanning system so that the pitch and perhaps roll angles of the vehicle can be taken into account.

Prior to the time that all vehicles are equipped with the RtZF system described above, roadways will consist of a mix of vehicles. In this period, it will not be possible to totally eliminate accidents. It will be possible to minimize the probability of having an accident however, if a laser radar system similar to that described in Shaw (U.S. Pat. No. 5,529,138) with some significant modifications is used. It is correctly perceived by Shaw that the dimensions of a radar beam are too large to permit distinguishing various objects which may be on the roadway in the path of the instant vehicle. Laser radar provides the necessary resolution that is not provided by radar. Laser radar as used in the present invention however would acquire significantly more data than anticipated by Shaw. Sufficient data in fact would be attained to permit the acquisition of a 3-dimensional image of all objects in the field of view. The X and Y dimensions of such objects would, of course, be determined knowing the angular orientation of the laser radar beam. The longitudinal or Z dimension would be obtained by the time-of-flight of the laser beam to a particular point on the object and reflected back to the detector or by phase methods.

At least two methods are available for resolving the longitudinal dimension for each of the pixels in the image. In one method, a laser radar pulse having a pulse width of one nanosecond could be transmitted toward the area of interest and as soon as the reflection was received and the time-of-flight determined, a new pulse would be sent at a slightly different angular orientation. The laser, therefore, would be acting as a scanner covering the field of interest. A single detector could then be used since it would know which pixel was being illuminated. The distance to the reflection point could be determined bat time-of-flight thus giving the longitudinal distance to all points in view on the object.

Alternately, the entire area of interest can be illuminated and an image focused on a CCD or CMOS array. By checking the time-of-flight to each pixel, one at a time, the distance to that point on the vehicle would be determined. A variation of this would be to use a garnet crystal as a pixel shutter and only a single detector. In this case, the garnet crystal would permit the illumination to pass through one pixel at a time through to a detector.

Other methods of associating a distance to a particular reflection point, of course, can now be conceived by those skilled in the art. In the laser scanning cases, the total power required of the laser is significantly less than in the area of illuminated design. However, the ability to correctly change the direction of the laser beam in a sufficiently short period of time complicates the scanning design. The system would work approximately as follows: The entire area in front of the instant vehicle, perhaps as much as a full 180 degree arc in the horizontal plane would be scanned for objects using either radar or laser radar. Once one or more objects had been located, the scanning range would be severely limited to basically cover that particular object and some surrounding space using laser radar. Based on the range to that object, a range gate can be used to eliminate all background and perhaps interference from other objects. In this manner, a very clear picture or image of the object of interest can be obtained as well as its location and, through the use of a neural network pattern of recognition system, the identity of the object can be ascertained as to whether it is a sign, a truck, an automobile or other object. The identification of the object will permit an estimate to be made of the object's mass and thus the severity of any potential collision.

Once a pending collision is identified, this information can be made available to the driver and if the driver ceases to heed the warning, control of the vehicle could be taken from him or her by the system. The actual usurpation of vehicle control, however, is unlikely initially since there are many situations on the highway where the potential for a collision cannot be accurately ascertained. Consequently, this system can be thought of as an interim solution until all vehicles have the RtZF system described above.

To use the laser radar in a scanning mode requires some means of changing the direction of the emitted pulses of light. One method of using a ultrasonic wave to change the diffraction angle of a Tellurium dioxide crystal as disclosed above. This can also be done in a variety of other ways such as through the use of a spinning mirror, such as is common with laser scanners and printers. This mirror would control the horizontal scanning, for example, with the vertical scanning controlled though a stepping motor. Alternately, one or more piezoelectric materials can be used to cause the laser radar transmitter to rotate about a pivot point. A rotating system, such as described in Shaw is the least desirable of the available methods due to the difficult,y in obtaining a good electrical connection between the laser and the vehicle while the laser is spinning at a very high angular velocity. Another promising technology is to use MEMS mirrors to deflect the laser beam.

Although the system described above is intended for collision avoidance or at least the notification of a potential collision, when the roadway is populated by vehicles having the RtZF™ system and vehicles which do not, its use is still desirable after all vehicles are properly equipped. It can also be used to search for animals or other objects which may be on or crossing the highway, a box dropping off of a truck for example, a person crossing the road who is not paying attention to traffic. Naturally motorcycles, bicycles, and other vehicles can also be monitored.

One significant problem with all previous collision avoidance systems which use radar or laser radar systems to predict impacts with vehicles, is the inability to known whether the vehicle that is being interrogated is located on the highway or is off the road. In the system of the present invention, the location of the road at any distance ahead of the vehicle would be known precisely from the sub-meter accuracy maps, so that the scanning system can ignore, for example, all vehicles on lanes where there is a physical barrier separating the lanes from the lane on which the subject vehicle is traveling. This, of course, is a common situation on super highways. Similarly, a parked car on the side of the car would not be confused with a parked car that is in the lane of travel of the subject vehicle when the road is curving. This permits the subject invention to be used for automatic cruise control. In contrast with radar systems, it does not require that vehicles in the path of the subject vehicle to be moving, so that high speed impacts into stalled traffic can be avoided.

If a system with a broader beam to illuminate a larger area on the road in front of the subject vehicle is used, with the subsequent focusing of this image onto a CCD or CMOS array, this has an advantage of permitting a comparison of the passive infrared signal and the reflection of the laser radar active infrared. Metal objects, for example appear cold to passive infrared. This permits another parameter to be used to differentiate metallic objects from non-metallic objects such as foliage or animals such as deer. The breadth of the beam can be controlled and thereby a particular object can be accurately illuminated. With this system, the speed with which the beam steering is accomplished can be much slower. Naturally, both systems can be combined into the maximum amount of information to be available to the system.

Through the use of range gating, objects can be relatively isolated from the environment surrounding it other than for the section of highway which is at the same distance. For many cases, a properly trained neural network can use this data and identify the objects. An alternate approach is to use the Fourier transform of the scene as input to neural network. The advantages of this latter approach are that the particular location of the vehicle in the image is not critical for identification.

In the future, when the system can take control of the vehicle, it will be possible to have much higher speed travel. In such cases all vehicles on the controlled roadway will need to have the RtZF™ system as described above. Fourier transforms of the objects of interest can be done optically though the use of a diffraction system. The Fourier transform of the scene can then be compared with the library of the Fourier transforms of all potential objects and, through a system used in military target recognition, multiple objects can be recognized and the system then focused onto one at time to determine the degree of threat that it poses.

ITS+Adaptive Cruise Control
Problem—Traffic Congestion

The world is experiencing an unacceptable growth in traffic congestion and attention is increasingly turning to smart highway systems to solve the problem. It has been estimated that approximately $240 billion will be spent on smart highways over the next 20 years. All of the initiatives currently being considered involve a combination of vehicle-mounted sensors and sensors and other apparatus installed in or on the roadway. Such systems are expensive to install, difficult and expensive to maintain and will thus only be used on major highways, if at all. Although there will be some safety benefit from such systems, it will be limited to the highways which have the system and perhaps to only a limited number of lanes.

The RtZF™ system in accordance with the invention eliminates the shortcomings of the prior art by providing a system that does not require modifications to the highway. The information as to the location of the highway is determined, as discussed above, by mapping the edges of the roadway and the edges of the lanes of the roadway using a process whereby the major roads of the entire country can be mapped at very low cost. Thus, the system has the capability of reducing congestion as well as saving lives on all major roads, not just those which have been selected as high-speed guided lanes.

Description

According to U.S. Pat. No. 5,506,584 the stated goals of the US DOT IVHS system are:
 improving the safety of surface transportation
 increasing the capacity and operational efficiency of the surface transportation system
 enhancing personal mobility and the convenience and comfort of the surface transportation system
 reducing the environmental and energy impacts of the surface transportation system The RtZF™ system in accordance with the present invention satisfies all of these goals at a small fraction of the cost of prior art systems. The safety benefits have been discussed above. The capacity increase is achieved by confining vehicles to corridors where they are then permitted to travel at higher speeds. This can be achieved immediately where carrier phase DGPS is available or with the implementation of the highway located precise location systems as shown in FIG. 11. An improvement is to add the capability for the speed of the vehicles to be set by the highway. This is a simple additional few bytes of information that can be transmitted along with the road edge location map, thus, at very little initial cost. To account for the tolerances in vehicle speed control systems, the scanning laser radar, or other technology system, which monitors for the presence of vehicles without RtZF™ is also usable as an adaptive cruise control system. Thus, if a faster moving vehicle approaches a slower moving vehicle, it will automatically slow down to keep a safe separation distance from the leading, slower moving vehicle. Although the system is not planned for platooning, that will be the automatic result in some cases. The maximum packing of vehicles is automatically obtained and thus the maximum vehicle flow rate is also achieved with a very simple system.

For the Intelligent Highway System (ITS) application, some provision is required to prevent unequipped vehicles from entering the restricted lanes. In most cases, a barrier will be required since if an errant vehicle did enter the controlled lane, a serious accident could result. Vehicles would be checked while traveling down the road or at a tollbooth, or similar station, that the RtZF™ system was in operation without faults and with the latest updated map for the region. Only those vehicles with the RtZF™ system in good working order would be permitted to enter. The speed on the restricted lanes would be set according to the weather conditions and fed to the vehicle information system automatically, as discussed above.

For ITS use, there needs to be a provision whereby a driver can signal an emergency, for example, by putting on the hazard lights. This would permit the vehicle to leave the roadway and enter the shoulder when the vehicle velocity is below some level. Once the driver provides such a signal, the roadway information system, or the network of vehicle based control systems, would then reduce the speed of all vehicles in the vicinity until the emergency has passed. This roadway information system need not be actually associated with the particular roadway and also need not require any roadway infrastructure. It is a term used here to represent the collective system as operated by the network of nearby vehicles and the inter-vehicle communication system. Eventually, the occurrence of such emergency situations will be eliminated by vehicle based failure prediction systems such as described in U.S. Pat. No. 5,809,437 which is incorporated by reference herein in its entirety.

Enhancements—Vehicle

Emergency situations will develop on intelligent highways. It is difficult to access the frequency or the results of such emergencies. The industry has learned from airbags that if a system is developed which saves many lives but causes a few deaths, the deaths will not be tolerated. The ITS system, therefore, must operate with a very high reliability, that is approaching zero fatalities. Since the brains of the system will reside in each vehicle, which is under the control of individual owners, there will be malfunctions and the system must be able to adapt without causing accidents.

The spacing of the vehicles is the first line of defense. Secondly, each vehicle with a RtZF™ system has the ability to automatically communicate to all adjacent vehicles and thus immediately issue a warning when an emergency event is occurring. Finally, with the addition of a total vehicle diagnostic system, such as disclosed in U.S. Pat. No. 5,809,437 (Breed), "On Board Vehicle Diagnostic System", potential emergencies can be anticipated and thus eliminated with high reliability.

Although the application for ITS envisions a special highway lane and high speed travel, the potential exists in the invention to provide a lower measure of automatic guidance where the operator can turn control of the vehicle over to the RtZFrM system for as long as the infrastructure is available. In this case, the vehicle would operate in normal lanes but would retain its position in the lane and avoid collisions until a decision requiring operator assistance is required. At that time, the operator would be notified and if he or she did not assume control of the vehicle, an orderly stopping of the vehicle on the side of the road would occur.

For all cases where vehicle steering control is assumed by the RtZF™ system, an algorithm for controlling the steering should be developed using neural networks or neural fuzzy systems. This is especially true for the emergency cases discussed above where it is well known that operators frequently take the wrong actions and at the least, they are slow to react. Algorithms developed by other non-pattern recognition techniques do not in general have the requisite generality or complexity and are also likely to make the wrong decisions (although the use of the same is not precluded in the invention). When the throttle and breaking functions are also handled by the system, an algorithm based on neural networks or neural fuzzy systems is even more important.

For the ITS, the driver will enter his or her destination so that the vehicle knows ahead of time where to exit. Alternately, if the driver wishes to exit, he merely turns on his turn signal, which tells the system and other vehicles that he or she is about to exit the controlled lane.

Other Features

Blind Spot Detection

The RtZF™ system of this invention also can eliminate the need for blind spot detectors such as disclosed in U.S. Pat. No. 5,530,447 to Henderson. Alternately, if a subset of the complete RtZF™ system is implemented, as is expected in the initial period, the RtZF™ system can be made compatible with the blind spot detector described in the '447 patent.

Incapacitated Driver

As discussed above, the RtZF™ system of this invention also handles the problem of the incapacitated driver thus eliminating the need for sleep sensors that appear in numerous U.S. patents. Such systems have not been implemented because of their poor reliability. The RtZF™ system senses the result of the actions of the operator, which could occur for a variety of reasons including old age, drunkenness, heart attacks, drugs as well as falling asleep.

Emergencies—Car Jacking, Crime

Another enhancement that is also available is to prevent car jacking in which case the RtZF™ system can function like the Lojack™ system. In the case where a car-jacking occurs, the location of the vehicle can be monitored and if an emergency button is pushed, the location of the vehicle pith the vehicle ID can be transmitted.

Headlight Dimmer

The system also solves the automatic headlight dimmer problem. Since the RtZF™ system equipped vehicle knows where all other RtZF™ system equipped vehicles are located in its vicinity, it knows when to dim the headlights. Since it is also interrogating the environment in front of the vehicle, it also knows the existence and approximate location of all non-RtZF™ system equipped vehicles. This is one example of a future improvement to the system. The RtZF™ system is a system which lends itself to continuous improvement without having to change systems on an existing vehicle.

Rollover

It should be obvious from the above discussion that rollover accidents should be effectively eliminated by the RtZF™ system. In the rare case where one does occur, the RtZF™ system has the capability to sense that event since the location and orientation of the vehicle is known.

For large trucks that have varying inertial properties depending on the load that is being hauled, sensors can be placed on the vehicle that measure the angular and linear acceleration of a part of the vehicle. Since the geometry of the road is known, the inertial properties of the vehicle with load can be determined and thus the tendency of the vehicle to roll over can be determined. Again, since the road geometry is known the speed of the truck can be limited to prevent rollovers.

Anticipatory Sensing—Smart Airbags, Evolution of the System

The RtZF™ system is also capable of enhancing other vehicle safety systems. In particular, through knowing the location and velocity of other vehicles, for those cases where an accident cannot be avoided, the RtZF™ system will in general be able to anticipate a crash and make an assessment of the crash severity using, for example, neural network technology. Even with a limited implementation of the RtZF™ system, a significant improvement in smart airbag technology results when used in conjunction with a collision avoidance system such as described in Shaw (U.S. Pat. Nos. 5,314,037 and 5,529,138) and a neural network anticipatory sensing algorithm such as disclosed in U.S. patent application Ser. No. 08/247,760 to Breed. A further enhancement would be to code the signal from RtZF™ system equipped vehicles with information that includes the size and approximate weight of the vehicle. Then, if an accident is inevitable, the severity can be accurately anticipated and the smart airbag tailored to the pending event. Such a device can be implemented as an RFID tag and made part of the license plate.

It can be seen from the above discussion that the RtZF™ system will evolve in solving many safety, vehicle control and ITS problems. Even such technologies as steering and drive by wire will be enhanced by the RtZF™ system in accordance with invention since it will automatically adjust for failures in these systems and prevent accidents.

Other Advantages & Enhancements
GPS and Other Measurement Improvements

One of the possible problems with the RtZF™ system described herein is operation in large cities such as downtown New York. In such locations. unless there are a plurality of local pseudolites or precise position location system installations, the signals from the GPS satellites can be significantly blocked. Also there is a severe multipath problem. A solution is to use the LORAN system as a backup for such locations. The accuracy of LORAN can be comparable to DGPS. Naturally, the use of multiple roadway located precise positioning systems would be a better solution or a complementary solution. Additionally, some location improvement can result from application of the Snap-Track system as described in U.S. Pat. No. 5,874,914 which is included herein by reference and other patents to Krasner of SnapTrack.

The use of geo-synchronous satellites as a substitute for earth bound base stations in a DGPS system, with carrier phase enhancements for sub-meter accuracies. is also a likely improvement to the RtZF™ system that can have a significant effect in downtown areas.

Another enhancement that would be possible with dedicated satellites and/or earth bound pseudolites results from the greater control over the information transmitted than is available from the GPS system. Recognizing that this system could save up to 40,000 lives per year in the U.S. alone, the cost of deploying such special purpose stations can easily be justified. For example, say there exists a modulated wave that is 10000 kilometers long, another one which is 1000 km long etc. down to 1 cm. It would then be easy to determine the absolute distance from one point to the other. Other types of modulation are of course possible to achieve the desired result of simply eliminating the carrier integer uncertainty that is discussed in many U.S. patents and other literature. This is not meant to be a recommendation but to illustrate that once the decision has been made to provide information to every vehicle that will permit it to always know its location within 10 cm, many technologies will be there to make it happen. The cost savings resulting from eliminating fatalities and serious injuries will easily cover the cost of such technologies many times over.

Vehicle Enhancements

The RtZF™ system can now be used to improve the accuracy of other vehicle based instruments. The accuracy of the odometer and yaw rate sensors can be improved over time, for example, by regression against the DGPS data.

Highway Enhancements

Enhancements to the roadways that result from the use of the RtZF™ system include traffic control. The timing of the stoplights can now be automatically adjusted based on the relative traffic flow. The position of every vehicle within the vicinity of the light will be known. When all vehicles have the RtZF™ system, many stoplights will no longer be necessary since the flow of traffic through an intersection can be accurately controlled to avoid collisions.

Since the road conditions will now be known to the system, an enhanced RtZF™ system will be able to advise an operator not to travel or, alternately, it can pick an alternate route if certain roads have accidents or have iced over, for example. Some people may decide not drive if there is bad weather or congestion. The important point here is that sensors will be available to sense the road condition as to both traffic and weather, this information will be available automatically and not require reporting from weather stations which usually have only late and inaccurate information. Additionally, pricing for the use of certain roads can be based on weather, congestion, time of day, etc. That is, pricing can by dynamically controlled.

The system lends itself to time and congestion based allocation of highway facilities. A variable toll can automatically be charged to vehicles based on such considerations since the vehicle can be identified. In fact, automatic toll systems now being implemented will likely become obsolete as will all toll booths.

Finally, it is important to recognize that the RtZF™ system is not a "sensor fusion" system. Sensor fusion is based on the theory that you can take inputs from different sensors and combine them in such a way as to achieve more information from the combined sensors than from treating the sensor outputs independently in a deterministic manner. The ultimate sensor fusion system is based on artificial neural networks, sometimes combined with fuzzy logic to form a neural fuzzy system. Such systems are probabilistic. Thus there will always be some percentage of cases where the decision reached by the network will be wrong. The use of such sensor fusion, therefore, is inappropriate for the "Zero Fatalities" goal of the invention.

Map Enhancements

Once the road edge and lane locations, and other roadway information, are transmitted to the operator, it requires very little additional bandwidth to include other information such as the location of all businesses that a traveler would be interested in such as gas stations, restaurants etc. which could be done on a subscription basis. This concept was partially disclosed in the '482 patent discussed above and partially implemented in existing map databases.

Naturally, the communication of information to the operator could be done either visually or orally as described in U.S. Pat. No. 5,177,685 or U.S. provisional patent application Serial No. 60/170,973 filed Dec. 15, 1999, both of which are incorporated by reference herein. Finally, the addition of a route guidance system as described in other patents becomes even more feasible since the exact location of a destination can be determined. The system can be configured so that a vehicle operator could enter a phone number, for example, or an address and the vehicle would be automatically and safely driven to that location. Since the system knows the location of the edge of every roadway, very little, if any, operator intervention would be required. Even a cell phone number can be used if the cell phone has the SnapTrack GPS location system as soon to be provided by Qualcomm.

Other Uses

The RtZF™ system can even replace other sensors now on or being considered for automobile vehicles including pitch, roll and yaw sensors. This information can be found by using carrier phase GPS and by adding more antennas to the vehicle. Additionally, once the system is in place for land vehicles, there will be many other applications such as surveying, vehicle tracking and aircraft landing which will benefit from the technology and infrastructure improvements. The automobile safety issue and ITS will result in the implementation of a national system which provides any user with low cost equipment the ability to know precisely where he is within centimeters on the face of the earth. Many other applications will undoubtedly follow.

The RtZF™ System

The design of this system is only beginning. From the above discussion, two conclusions should be evident. There are significant advantages in accurately knowing where the vehicle, the roadway and other vehicles are and that possession of this information is the key to reducing fatalities to zero. Second, there are many technologies that are already in existence that can provide this information to each vehicle. Once there is a clear direction that this is the solution then many new technologies will emerge. There is nothing inherently expensive about these technologies and once the product life cycle is underway, the added cost to vehicle purchasers will be minimal. Roadway infrastructure costs will be minimal and system maintenance costs almost non-existent.

Most importantly, the system has the capability of reducing fatalities to zero!

Technical Issues

The accuracy of DGPS has been demonstrated numerous times in small controlled experiments, most recently by the University of Minnesota.

The second technical problem is the integrity of the signals being received and the major cause of the lack of integrity is the multi-path effect. Considerable research has gone into solving the multi-path effect and Trimble claims that this problem is no longer an issue.

The third area is availability of GPS and DGPS signals to the vehicle as it is driving down the road. The system is designed to tolerate temporary losses of signal, up to a few minutes. That is the prime function of the inertial navigation system (INS). Prolonged absence of the GPS signal will significantly degrade system performance. There are two primary causes of lack of availability, namely, temporary causes and permanent causes. Temporary causes result from a car driving between two trucks for an extended period of time, blocking the GPS signals. The eventual solution to this problem is to change the laws to prevent trucks from traveling on both sides of an automobile. If this remains a problem, a warning will be provided to the driver that he/she is losing system integrity and therefore he/she should speed up or slow down to regain a satellite view. This could also be done automatically.

Permanent blockage of the GPS signals, as can come from operating the vehicle in a tunnel or in the downtown of a large city, can be corrected through the use of pseudolites or other guidance systems such as the SnapTrack system or the PPS described here. This is not a serious problem since very few cars run off the road in a tunnel or in downtown Manhattan.

The final technical impediment is the operation of the diagnostic system that verifies that the system is operating properly. This requires an extensive failure mode and effect analysis and the design of a diagnostic system that answers all of the concerns of the FMEA.

Cost Issues

The primary cost impediment is the cost of the DGPS hardware. A single base station and roving receiver that will give an accuracy of 2 centimeters ($1\sigma$) currently costs about $25,000. This is a temporary situation brought about by low sales volume. Since there is nothing exotic in the receiving unit, the cost can be expected to follow typical automotive electronic life-cycle costs and therefore the projected high volume production cost of the electronics for the DGPS receivers is below $100 per vehicle. In the initial implementation of the system, an OmniSTAR™ DGPS system will be used providing an accuracy of 6 cm.

A similar argument can be made for the inertial navigation system. Considerable research and development effort is ongoing to reduce the size, complexity and cost of these systems. Three technologies are vying for this rapidly growing market: laser gyroscopes, fiber-optic lasers, and MEMS systems. The cost of these units today range from a few hundred and ten thousand dollars each, however, once again this is due to the very small quantity being sold. Substantial improvements are being made in the accuracies of the MEMS systems and it now appears that such a system will be accurate enough for RtZF™ purposes. The cost of these systems in high-volume production is expected to be below ten dollars each. This includes at least a yaw rate sensor with three accelerometers and probably three angular rate sensors. The accuracy of these units is currently approximately 0.003 degrees per second. This is a random error which can be corrected somewhat by the use of multiple vibrating elements. A new laser gyroscope has recently been announced by Intellisense Corporation which should provide a dramatic cost reduction and accuracy improvement.

Eventually when most vehicles on the road have the RtZF™ system then communication between the vehicles can be used to substantially improve the location accuracy, of each vehicle as described above.

The cost of mapping the continental United States (CONUS) is largely an unknown at this time. OmniSTAR has stated that they will map any area with sufficient detail at a cost of $300 per mile. They have also indicated the cost will drop substantially as the number of miles to be mapped increases. This mapping would be done by helicopter using cameras and their laser ranging system. Another method is to outfit a ground vehicle with equipment that will determine the location of the lane and shoulder boundaries of road and other information. Such a system has been used for mapping a Swedish highway. One estimate is that the mapping of a road will be reduced to approximately $50 per mile for major highways and rural roads and a somewhat higher number for urban areas. The,goal is to map the country to an accuracy of 2 centimeters ($1\sigma$).

Related to the costs of mapping is the cost of converting the raw data acquired either by helicopter or by ground vehicle into a usable map database. The cost for manually performing this vectorization process has been estimated at $100 per mile by OmniSTAR. This process can be substantially simplified through the use of raster to vector conversion software. Such software is currently being used for converting hand drawings into CAD systems, for example. The Intergraph Corp. provides hardware and software for simplifying this task. It is therefore expected that the cost for vectorization of the map data will follow proportionately a similar path to the cost of acquiring the data and may eventually reach $10 to $20 per mile for the rural mapping and $25 to a $50 per mile for urban areas. Considering that there are approximately four million miles of roads in the CONUS, and assuming we can achieve an average of $150 for acquiring the data and converting the data to a GIS database can be achieved, the total cost for mapping all of the roads in United States will amount to $600 million. This cost would obviously be spread over a number of years and thus the cost per year is manageable and small in comparison to the $215 billion lost every year due to death, injury and lost time from traffic congestion.

Another cost factor is the lack of DGPS base stations. The initial analysis indicated that this would be a serious problem as using the latest DGPS technology requires a base station every 30 miles. Upon further research, however, it has been determined that the OmniSTAR company has now deployed a nationwide WADGPS system with 6 cm accuracy. The initial goal of the RtZF™ stem was to achieve 2 cm accuracy for both mapping and vehicle location. The 2 cm accuracy can be obtained in the map database since temporary differential base stations will be installed for the mapping purposes. By relaxing the 2 cm requirement to 6 cm, the need for base stations every 30 miles disappears and the cost of adding a substantial number of base stations is no longer a factor.

The next impediment is the lack of a system for determining when changes are planned for the mapped roads. This will require communication with all highway and road maintenance organizations in the mapped area.

A similar impediment to the widespread implementation of this RtZF™ system is the lack of a communication system for supplying map changes to the equipped vehicles.

Educational Issues

A serious impediment to the implementation of this system that is related to the general lack of familiarity with the system, is the belief that significant fatalities and injuries on the U.S. highways are a fact of life. This argument is presented in many forms such as "the perfect is the enemy of the good". This leads to the conclusion that any system that portends to reduce injury should be implemented rather than taking the viewpoint that driving an automobile is a process and as such it can be designed to achieve perfection. As soon as it is admitted that perfection cannot be achieved, then any fatality gets immediately associated with this fact. This of course was the prevailing view among all manufacturing executives until the zero defects paradigm shift took place. The goal of the "Zero Fatalities" program is not going to be achieved in a short period of time. Nevertheless, to plan anything short of zero fatalities is to admit defeat and to thereby allow technologies to enter the market that are inconsistent with a zero fatalities goal.

Potential Benefits When the System is Deployed

Assumptions for the Application Benefits Analysis

The high volume incremental cost of an automobile will be $200.

The cost of DGPS correction signals will be a onetime charge of $50 per vehicle.

The benefits to the vehicle owner from up-to-date maps and to the purveyors of services located on these maps. will cover the cost of updating the maps as the roads change.

The cost of mapping substantially all roads in the Continental U.S. will be $600 million.

The effects of phasing in the system will be ignored.

There are 15 million vehicles sold in the U.S. each year.

Of the 40,000 plus people killed on the roadways, at least 10% are due to road departure, yellow line infraction, stop sign infraction, excessive speed and other causes which will be eliminated by the Phase Zero deployment.

$165 billion are lost each year due to highway accidents.

The cost savings due to secondary benefits will be ignored.

Analysis Methods Described

The analysis method will be quite simple. Assume that 10% of the vehicles on the road will be equipped with RtZF™ systems in the first year and that this will increase by 10 percent each year. Ten percent or 4000 lives will be saved and a comparable percentage of injuries. Thus, in the first year, one percent of $165 billion dollars will be saved or $1.65 billion. In the second year, this saving will be $3.3 billion and the third year $4.95 billion. The first-year cost of implementation of the system will be $600 million for mapping and $3.75 billion for installation onto vehicles. The first year cost therefore will be $4.35 billion and the cost for the second and continuing years will be $3.75 billion. Thus, by the third year the benefits exceed the costs and by the 10th year the benefits will reach $16.5 billion compared with costs of $3.75 billion yielding a benefits to cost ratio of more than 4.

Before the fifth year of deployment, it is expected that the other parts of the RtZF™ system will begin to be deployed and that the benefits therefore are substantially understated. It is also believed that the $250 price for the Phase Zero system on a long-term basis is high and it is expected that the price to drop substantially. No attempt has been made to estimate the value of the time saved in congestion or efficient operation of the highway system. Estimates that have been presented by others indicate that as much as a two to three times improvement in traffic through flow, is possible. Thus, a substantial portion of the $50 billion per year lost in congestion delays will also be saved when the full RRtZF™ system is implemented.

It is also believed that the percentage reduction of fatalities and injuries has been substantially understated. For the first time, there will be some control over the drunk or otherwise incapacitated driver. If the excessive speed feature is implemented, then gradually the cost of enforcing the nation's speed limits will begin to be substantially reduced. Since it is expected that large trucks will be among first vehicles to be totally covered with the system, perhaps on a retrofit basis, it is expected that the benefits to commercial vehicle owners and operators will be substantial. Naturally, the retrofit market may rapidly develop and the assumptions of vehicles with deployed systems may be low. None of these effects have been taken into account in the above analysis.

The automated highway systems resulting from RtZF implementation is expected to double or even triple in effective capacity by increasing speeds and shortening distances between vehicles. Thus, the effect on highway construction cost could be significant.

Initial System Deployment

The initial implementation of the RtZF™ system would include the following services:

1. A warning is issued to the driver when the driver is about to depart from the road.
2. A warning is issued to the driver when the driver is about to cross a yellow line or other lane boundary.
3. A warning is provided to the driver when the driver is exceeding a safe speed limit for the road geometry.
4. A warning is provided to the driver when the driver is about to go through a stop sign without stopping.
5. A warning is provided to the driver when the driver is about run the risk of a rollover.
6. A warning will be issued prior to a rear end impact by the equipped vehicle.
7. In-vehicle signage will be provided for highway signs.
8. A recording will be logged whenever a warning is issued.

Detailed Description of the Illustrations

FIG. 1 shows the current GPS satellite system associated with the earth and including 24 satellites 2, each satellite revolving in a specific orbital path 4 around the earth. By means of such a GPS satellite system, the position of any object can be determined with varying degrees of precision as discussed in detail above.

Figure 2:
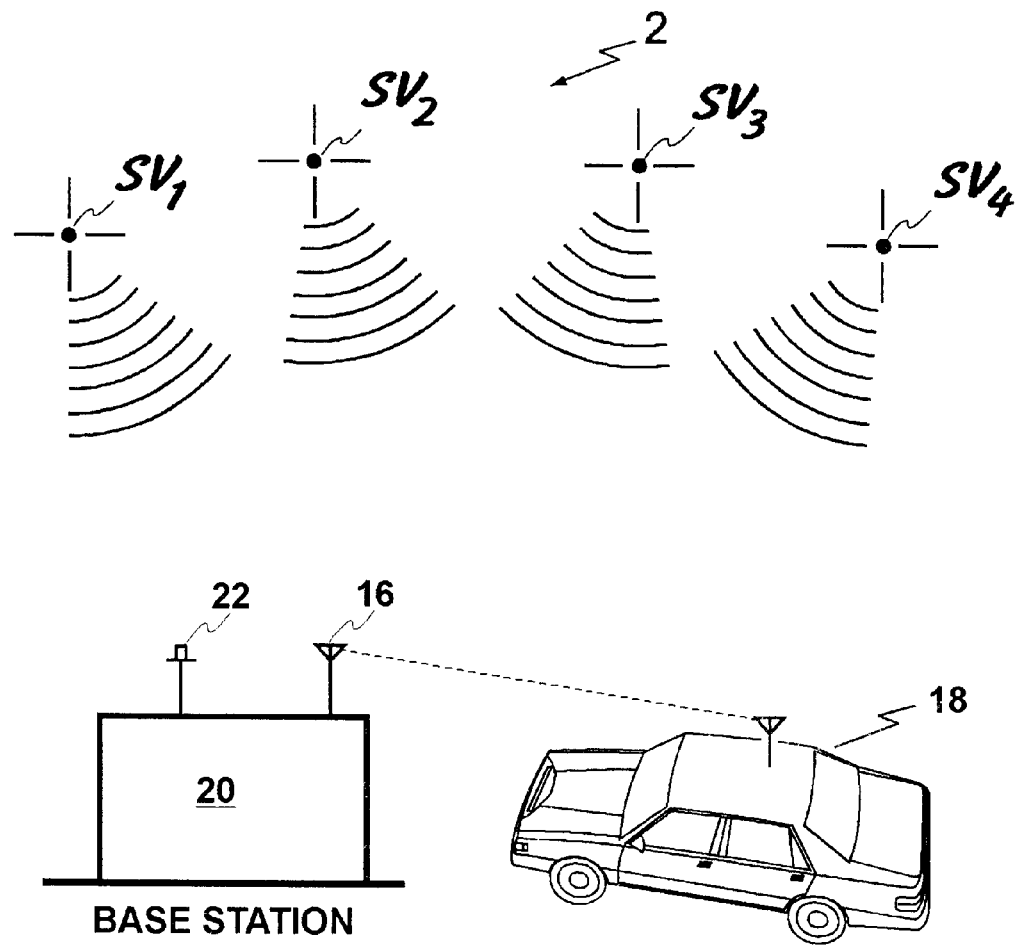
FIG. 2 illustrates four GPS satellites transmitting position information to a vehicle and to a base station which in turn transmits the differential correction signal to the vehicle.

FIG. 2 shows an arrangement of four satellites 2 designated $SV_1$, $SV_2$, $SV_3$ and $SV_4$ of the GPS satellite system shown in FIG. 1 transmitting position information to receiver means of a base station 20, such as an antenna 22, which in turn transmits a differential correction signal via transmitter means associated with that base station, such as a second antenna 16, to a vehicle 18.

Additional details relating to FIGS. 1–2 can be found in U.S. Pat. No. 5.606,506 to Kyrtsos.

Figure 3:
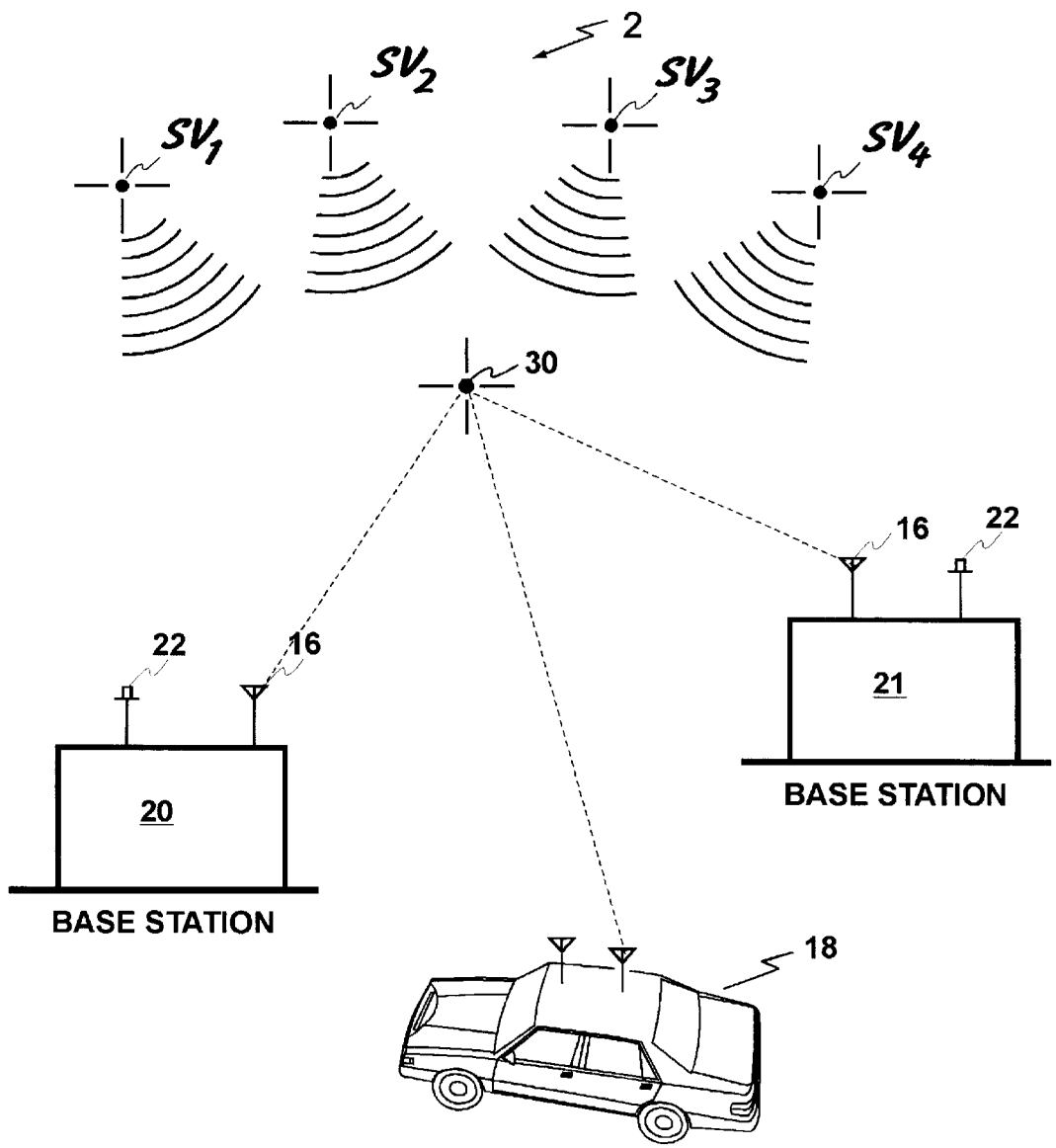
FIG. 3 illustrates a WADGPS system with four GPS satellites transmitting position information to a vehicle and to a base station which in turn transmits the differential correction signal to the vehicle.

FIG. 3 shows an arrangement of four satellites 2 designated $SV_1$, $SV_2$, $SV_3$ and $SV_4$ of the GPS satellite system as in FIG. 2 transmitting position information to receiver means of base stations 20 and 21, such as an antenna 22, which in turn transmit a differential correction signal via transmitter means associated with that base stations, such as a second antenna 16, to a geocentric or low earth orbiting (LEO) satellite 30 which in turn transmits the differential correction signals to vehicle 18. In this case, one or more of the base stations 20,21 receives and performs a mathematical analysis on all of the signals received from a number of base stations that cover the area under consideration and forms a mathematical model of the errors in the GPS signals over the entire area. For the continental United States, for example, a group of 13 base stations are operated by OmniStar that are distributed around the country. By considering data from the entire group of such stations, the errors in the GPS signals for the entire area can be estimated resulting in a position accuracy of about 6–10 cm over the entire area. The corrections are then uploaded to the geocentric or low earth orbiting satellite 30 for retransmission to vehicles on the roadways. In this way, such vehicles are able to determine their absolute position to within about 6–10 centimeters. This is known as Wide Area Deferential GPS or WADGPS.

The WAAS system is another example of WADGPS for use with airplanes. The U.S. Government estimates that the accuracy of the WAAS system is about 1 meter in three dimensions. Since the largest error is in the vertical direction, the horizontal error is much less.

Figure 4:
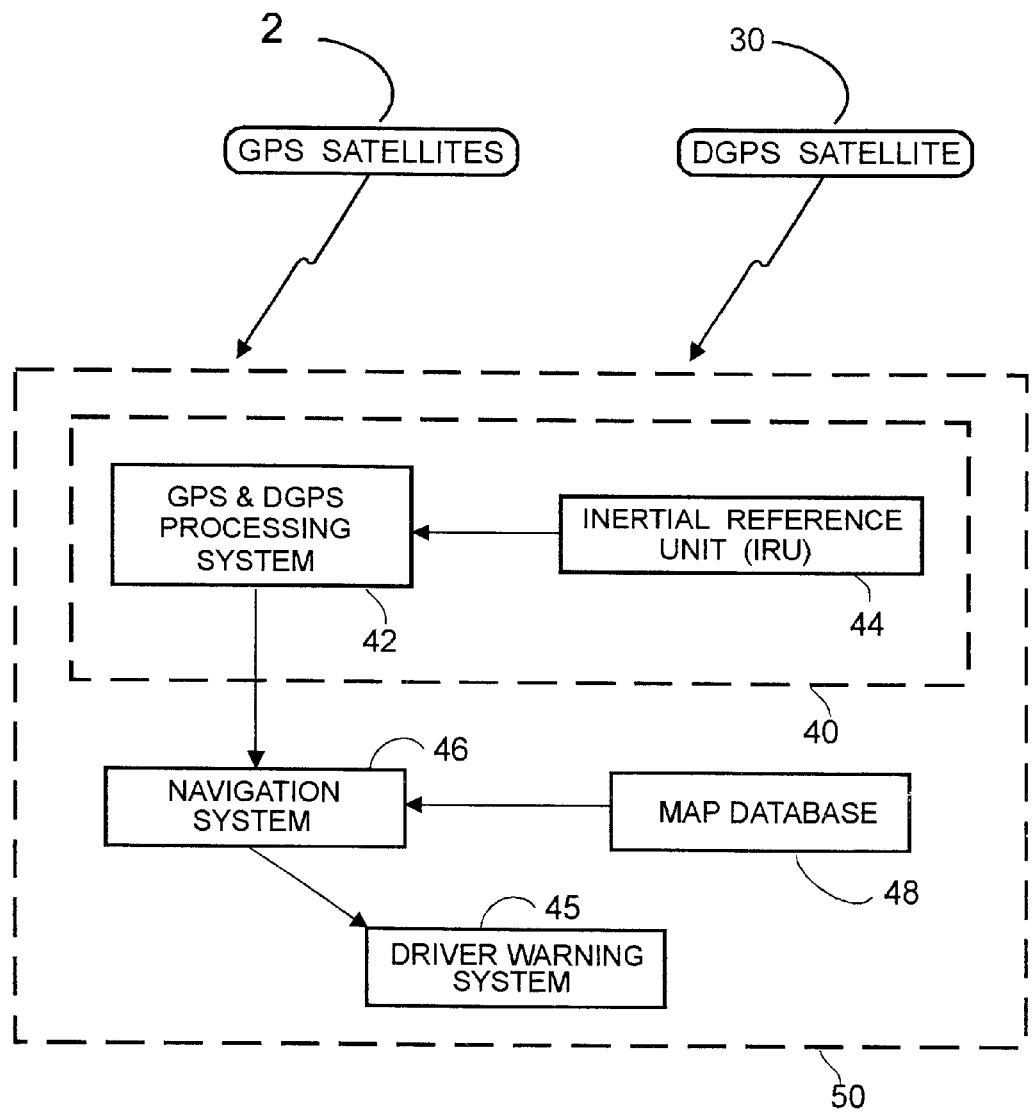
FIG. 4 is a logic diagram showing the combination of the GPS system and an inertial navigation system.

FIG. 4 is a logic diagram of the system 50 in accordance with the invention showing the combination 40 of the GPS and DGPS processing systems 42 and an inertial reference unit (IRU) or inertial navigation system 44. The GPS system includes a unit for processing the received information from the satellites 2 of the GPS satellite system, the information from the satellites 30 of the DGPS system and data from the inertial reference unit (IRU) 44. The inertial reference unit 44 contains accelerometers and laser or MEMS gyroscopes.

The system shown in FIG. 4 is a minimal RtZF™ system that can be used to prevent road departure, lane crossing and intersection accidents, which together account for more than about 50% of the fatal accidents in the United States.

Map database 48 works in conjunction with a navigation system 46 to provide a warning to the driver when he or she is about to run off the road, cross a yellow line, run a stop sign, or run a red stoplight. The map database 48 contains a map of the roadway to an accuracy of 2 cm (1 sigma), i.e., data on the edges of the lanes of the roadway and the edges of the roadway, and the location of all stop signs and stoplights and other traffic control devices such as other types of road signs. Another sensor, not shown, provides input to the vehicle indicating that an approaching stoplight is red, yellow or green. Navigation system 46 is coupled to the GPS and DGPS processing system 42. For this simple system, the driver is warned if any of the above events is detected by a driver warning system 45 coupled to the navigation system 46. The driver warning system 45 can be an alarm, light, buzzer or other audible noise, or, preferably, a simulated rumble strip for yellow line and "running off of road" situations and a combined light and alarm for the stop sign and stoplight infractions.

Figure 5:
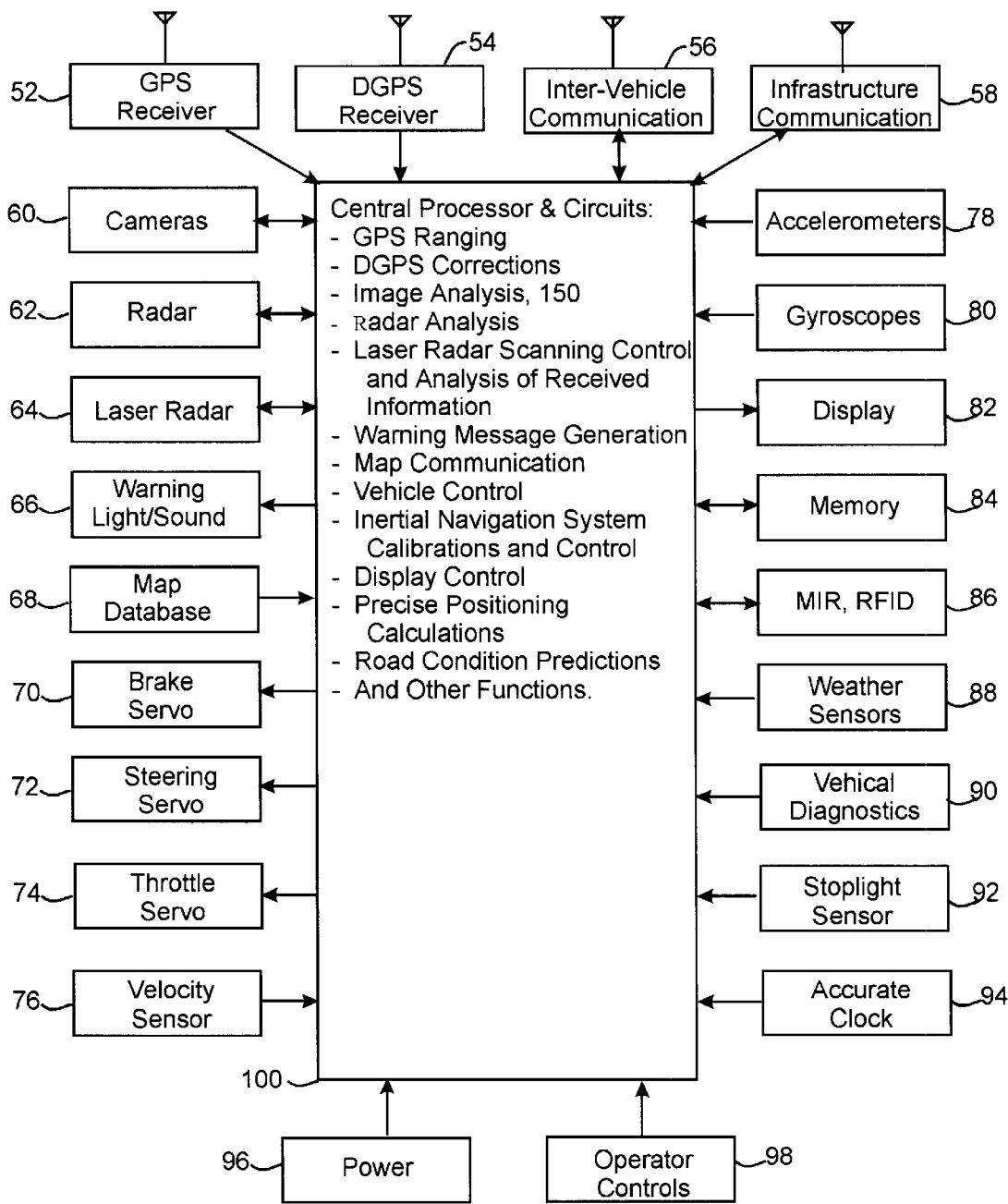
FIG. 5 is a block diagram of the overall vehicle accident avoidance, warning, and control system and method of the present invention illustrating system sensors, radio transceivers, computers, displays, input/output devices and other key elements.

FIG. 5 is a block diagram of the more advanced accident avoidance system of this invention and method of the present invention illustrating system sensors, transceivers, computers, displays, input and output devices and other key elements.

As illustrated in FIG. 5, the vehicle accident avoidance system is implemented using a variety of microprocessors and electronic circuits 100 to interconnect and route various signals between and among the illustrated subsystems. GPS receiver 52 is used to receive GPS radio signals as illustrated in FIG. 1. DGPS receiver 54 receives the differential correction signals from one or more base stations either directly or via a geocentric stationary or LEO satellite. Inter-vehicle communication subsystem 56 is used to transmit and receive information between various nearby vehicles. This communication will in general take place via broad band or ultra-broad band communication techniques, or on dedicated frequency radio channels. This communication may be implemented using multiple access communication methods including frequency division multiple access (FDMA), timed division multiple access (TDMA), or code division multiple access (CDMA) in a manner to permit simultaneous communication with and between a multiplicity of vehicles. Naturally, other forms of communication between vehicles are possible such as through the Internet. This communication will consist of such information as the precise location of a vehicle, the latest received signals from the GPS satellites in view, other road condition information, emergency signals, hazard warnings, vehicle velocity and intended path, and any other information which is useful to improve the safety of the vehicle road system.

Infrastructure communication system 58 permits bidirectional communication between the host vehicle and the infrastructure and includes such information transfer as updates to the digital maps, weather information, road condition information, hazard information, congestion information, temporary signs and warnings, and any other information which can improve the safety of the vehicle highway system.

Cameras 60 are used generally for interrogating environment nearby the host vehicle for such functions as blind spot monitoring, backup warnings, anticipatory crash sensing, visibility determination, lane following, and any other visual information which is desirable for improving the safety of the vehicle highway system. Generally, the cameras will be sensitive to infrared and/or visible light, however, in some cases a passive infrared camera will the used to detect the presence of animate bodies such as deer or people on the roadway in front of the vehicle. Frequently, infrared or visible illumination will be provided by the host vehicle.

Radar 62 is primarily used to scan an environment further from the vehicle than the range of the cameras and to provide an initial warning of potential obstacles in the path of the vehicle. The radar 62 can also be used when conditions of a reduced visibility are present to provide advance warning to the vehicle of obstacles hidden by rain, fog, snow etc. Pulsed, continuous wave or micropower impulse radar systems can be used as appropriate. Also Doppler radar can be used to determine the object to host vehicle relative velocity.

Laser radar 64 is primarily used to illuminate potential hazardous objects that are in the path of the vehicle. Since the vehicle will be operating on accurate mapped roads, the precise location of objects discovered by he radar or camera systems can be determined using range gating and scanning laser radar as described above or phase techniques.

The driver warning system 66 provides visual and audible warning messages to the driver or others that a hazard exists. In addition to activating a warning system within the vehicle, this system can activate sound and light systems to warn other people, animals, or vehicles of a pending hazardous condition. In such cases, the warning system could activate the vehicle headlights, tail lights, horn and/or the vehicle to vehicle, internet or infrastructure communication system to inform other vehicles, a traffic control station or other base station. This system will be important during the early stages of implementation of RtZF, however as more and more vehicles are equipped with the system, there will be less to warn the driver or others of potential problems.

Map database subsystem 68, which could reside on an external memory module, will contain all of the map information such as road edges to 2 cm accuracy, the locations of stop signs, stoplights, lane markers etc. as described in detail above. The fundamental map data can be organized on read-only magnetic or optical memory with a read/write associated memory for storing map update information. Alternatively, the map information can be stored on rewritable media that can be updated with information from the infrastructure communication subsystem 58. This updating can take place while the vehicle is being operated or, alternatively, while the vehicle is parked in a garage or on the street.

Three servos are provided for controlling the vehicle during the later stages of implementation of the RtZF™ product and include the brake servo 70, the steering servo 72, and the throttle servo 74. The vehicle can be controlled using deterministic, fuzzy logic, neural network or, preferably, neural-fuzzy algorithms.

As a check on the inertial system, a velocity sensor 76 based on a wheel speed sensor, for example, can be provided for the system. Other systems are preferably used for this purpose such as the GPS/DGPS or precise position systems.

The inertial navigation unit, sometimes called the inertial reference unit or IRU, comprises one or more accelerometers 78 and one or more gyroscopes 80. Usually, three accelerometers would be required to provide the vehicle acceleration in the latitude, longitude and vertical directions and three gyroscopes would be required to provide the angular rate about the pitch, yaw and roll axes.

Display subsystem 82 includes an appropriate display driver and either a heads-up or other display system for providing system information to the vehicle operator. The information can be in the form of non-critical information such as the location of the vehicle on a map, as chosen by the vehicle operator and/or it can consist of warning or other emergency messages provided by the vehicle subsystems or from communication with other vehicles or the infrastructure. An emergency message that the road has been washed out ahead, for example, would be an example of such a message.

Generally, the display will make use of icons when the position of the host vehicle relative to obstacles or other vehicles is displayed. Occasionally, as the image can be displayed especially when the object cannot be identified.

A general memory unit 84 which can comprise read-only memory or random access memory or any combination thereof, is shown. This memory module, which can be either located at one place or distributed throughout the system, supplies the information storage capability for the system.

For advanced RtZF™ systems containing the precise positioning capability, subsystem 86 provides the capability of sending and receiving information to infrastructure-based precise positioning tags or devices which may be based on micropower impulse radar technology or RFIR technology or equivalent.

In some locations where weather conditions can deteriorate and degrade road surface conditions, various infrastructure-based sensors can be placed either in or adjacent to the road surface. Subsystem 88 is designed to interrogate and obtained information from such road-based systems. An example of such a system would be an RFID tag containing a temperature sensor. This device may be battery-powered or, preferably, would receive its power from the vehicle-mounted interrogator, or other host vehicle-mounted source, as the vehicle passes nearby the device. In this manner, the vehicle can obtain the temperature of the road surface and receive advanced warning when the temperature is approaching conditions which could cause icing of the roadway, for example. An infrared sensor on the vehicle can also be used to determine the road temperature and the existence of ice or snow.

In order to completely eliminate automobile accidents, a diagnostic system is required on the vehicle that will provide advanced warning of any potential vehicle component failures. Such a system is described in U.S. Pat. No. 5.809,437 (Breed), incorporated by reference herein.

For some implementations of the RtZF™ system, stoplights mill be fitted with transmitters which will broadcast a signal when the light is red. This signal can be then received by a vehicle that is approaching the stoplight provided that vehicle has the proper sensor as shown as 92. Alternatively, a camera can be aimed in the direction of stoplights and, since the existence of the stoplight will be known by the system as it will have been recorded on the map, the vehicle will know when to look for a stoplight and determine the color of the light.

Although atomic clocks are probably too expensive to the deployed on automobiles, nevertheless there has been significant advances recently in the accuracy of clocks to the extent that it is now feasible to place a reasonably accurate clock as a subsystem 94 to this system. Since the clock can be recalibrated from each GPS transmission, the clock drift can be accurately measured and used to predict the precise time even though the clock by itself may be incapable of doing so. To the extent that the vehicle contains an accurate time source, the satellites in view requirement can temporarily drop from 4 to 3.

Naturally, power must be supplied to the system as shown by power subsystem 96. Certain operator controls are also permitted as illustrated in subsystem 98.

The control processor or central processor and circuit board subsystem 100 to which all of the above components 52–98 are coupled, performs such functions as GPS ranging, DGPS corrections, image analysis, radar analysis, laser radar scanning control and analysis of received information, warning message generation, map communication, vehicle control, inertial navigation system calibrations and control, display control, precise positioning calculations, road condition predictions, and all other functions needed for the system to operate according to design.

Figure 6:
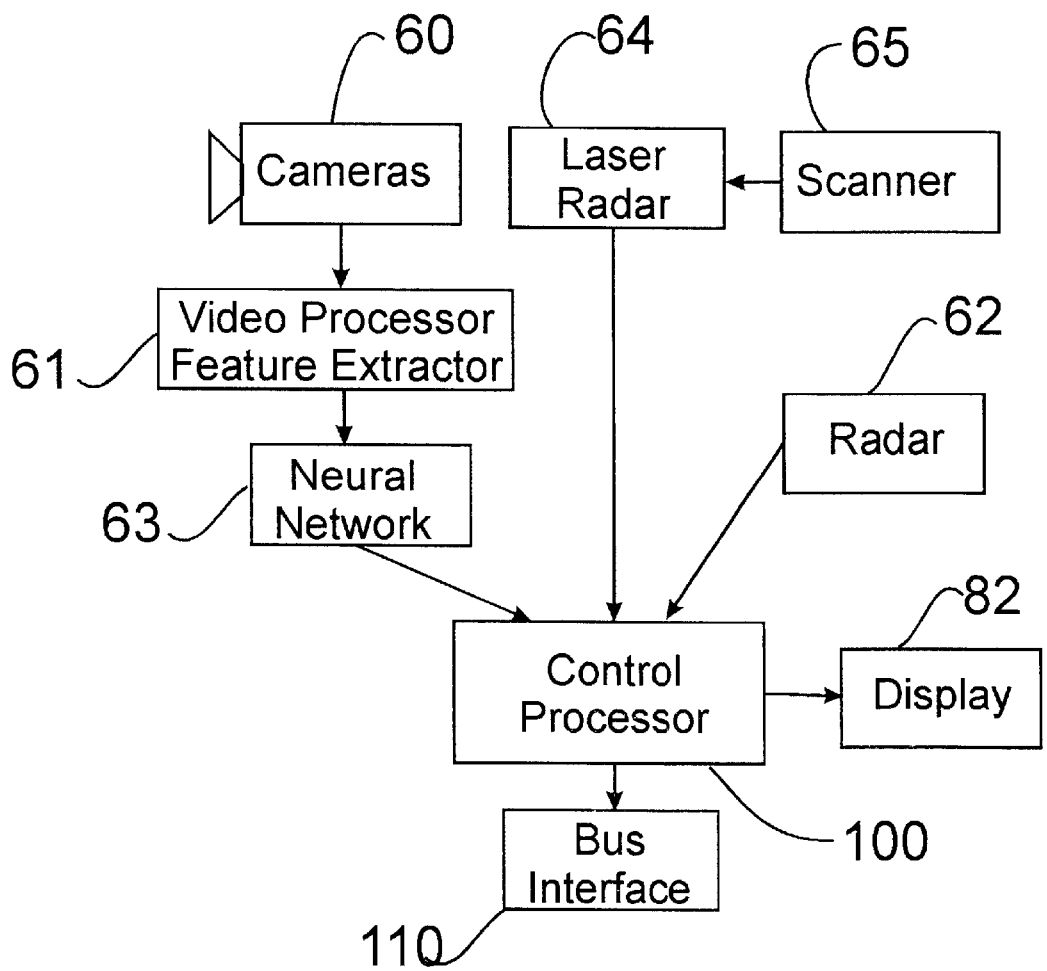
FIG. 6 is a block diagram of an image analysis computer of the type that can be used in the accident avoidance system and method of this invention.

FIG. 6 is a block diagram of the host vehicle exterior surveillance system. Cameras 60 are primarily intended for observing the immediate environment of the vehicle. They are used for recognizing objects that could be most threatening to the vehicle, i.e., closest to the vehicle. These objects include vehicles or other objects that are in the vehicle blind spot, objects or vehicles that are about to impact the most vehicle from any direction, and objects either in front of or behind the host vehicle which the host vehicle is about to impact. These functions are normally called blind spot monitoring and collision anticipatory sensors.

As discussed above, the cameras 60 can use naturally occurring visible or infrared radiation or they may be supplemented with sources of visible or infrared illumination from the host vehicle. The cameras 60 used are preferably high dynamic range cameras that have a dynamic range exceeding 60 db and preferably exceeding 100 db. Such commercially available cameras include those manufactured by the Photobit Corporation in California and the IMS Chips Company in Stuttgart Germany.

These cameras are based on CMOS technology and have the important property that pixels are independently addressable. Thus, the control processor may decide which pixels are to be read at a particular time. This permits the system to concentrate on certain objects of interest and thereby make more effective use of the available bandwidth.

Video processor printed circuit boards 61 can be located adjacent and coupled to the cameras 60 so as to reduce the information transferred to the control processor. The video processor boards 61 can also perform the function of feature extraction so that all values of all pixels do not need to be sent to the neural network for identification processing. The feature extraction includes such tasks as determining the edges of objects in the scene and, in particular, comparing and subtracting one scene from another to eliminate unimportant background images and to concentrate on those objects which had been illuminated with infrared radiation, for example, from the host vehicle. By these and other techniques, the amount of information to be transferred to the neural network is substantially reduced.

The neural network 63 receives the feature data extracted from the camera images by the video processor feature extractor 61 and uses this data to determine the identification of the object in the image. The neural network 63 has been previously trained on a library of images that can involve as many as one million such images. Fortunately, the images seen from one vehicle are substantially the same as those seen from another vehicle and thus the neural network 63 in general does not need to be trained for each host vehicle type.

Although the neural network 63 has in particular and described above and will be described in more detail below, other pattern recognition techniques are also applicable. One such technique uses the Fourier transform of the image and utilizes either optical correlation techniques or a neural network trained on the Fourier transforms of the images rather than on the image itself. In one case, the optical correlation is accomplished purely optically wherein the Fourier transform of the image is accomplished using diffraction techniques and projected onto a display, such as a garnet crystal display, while a library of the object Fourier transforms is also displayed on the display. By comparing the total light passing through the display, an optical correlation can be obtained very rapidly.

The laser radar system 64 is typically used in conjunction with a scanner 65. The scanner 65 is typically comprised of two oscillating mirrors which cause the laser light to scan the two dimensional angular field. Alternately, the scanner can be a solid-state device utilizing a crystal having a high index of refraction which is driven by an ultrasonic vibrator as discussed above or rotating mirrors. The ultrasonic vibrator establishes elastic waves in the crystal which diffracts and changes the direction of the laser light.

The laser beam can be modulated so that the distance to the object reflecting the light can be determined. The laser light strikes an object and is reflected back to the same scanning system where it is guided onto a pin diode, or other high speed photo detector. Since the direction of laser light is known, the angular location of the reflected object is also known and since the laser light is modulated the distance to the reflected point can be determined. By varying modulation frequency of the laser light, the distance can be very precisely measured.

Alternatively, the time-of-flight of a short burst of laser light can be measured providing a direct reading of the distance to the object that reflected the light. By either technique, a three-dimensional map can be made of the surface of the reflecting object. Objects within a certain range of the host vehicle can be easily separated out using the range information. This can be done electronically using a technique called range gating, or it can be accomplished mathematically based on the range data. By this technique, an image of an object can be easily separated from other objects based on distance from the host vehicle.

Since the vehicle knows its position accurately and in particular it knows the lane on which it is driving, a determination can be made of the location of any reflective object and in particular whether or not the reflective object is on the same lane as the host vehicle. This fact can be determined since the host vehicle has a map and, the reflective object can be virtually placed on that map to determine its location on the roadway, for example.

The laser radar system will generally operate in the near infrared part of the electromagnetic spectrum. The laser beam will be of relatively high intensity compared to the surrounding radiation and thus even in conditions of fog, snow, and heavy rain, the penetration of the laser beam and its reflection will permit somewhat greater distance observations than the human driver can perceive. Under the RIZF plan, it is recommended that the speed of the host vehicle be limited such that vehicle can come to a complete stop in one half or less of the visibility distance. This will permit the laser radar system to observe and identify threatening objects that are beyond the visibility distance providing an added degree of safety to the host vehicle.

Radar system 62 is mainly provided to supplement laser radar system. It is particularly useful for low visibility situations where the penetration of the laser radar system is limited. The radar system can also be used to provide a crude map of objects surrounding the vehicle. The most common use for automotive radar systems is for adaptive cruise control systems where the radar monitors the distance and, in some cases, the velocity of the vehicle immediately front of the host vehicle. The radar system 62 is controlled by the control processor 100.

The display system 82 was discussed previously and can be either a heads up or other appropriate display.

The control processor 100 can be attached to a vehicle special or general purpose bus 110 for transferring other information to and from the control processor to other vehicle subsystems.

Figure 7:
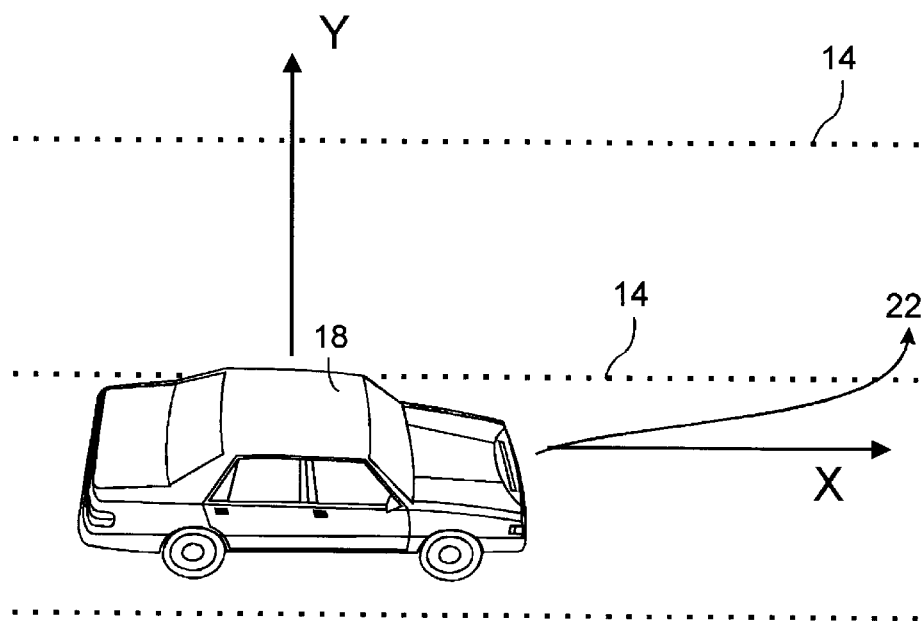
FIG. 7 illustrates a vehicle traveling on a roadway in a defined corridor.

FIG. 7 shows the implementation of the invention in which a vehicle 18 is traveling on a roadway in a defined corridor in the direction X. Each corridor is defined by lines 14. If the vehicle is traveling in one corridor and strays in the direction Y so that it moves along the line 22, e.g., the driver is falling asleep, the system on board the vehicle in accordance with the invention will activate a warning. More specifically, the system continually detects the position of the vehicle, such as by means of the GPS, DGPS and PPS, and has stored the locations of the lines 14 defining the corridor. Upon an intersection of the position of the vehicle and one of the lines 14 as determined by a processor, the system may be designed to sound an alarm to alert the driver to the deviation or possibly even correct the steering of the vehicle to return the vehicle to within the corridor defined by lines 14.

Figure 8:
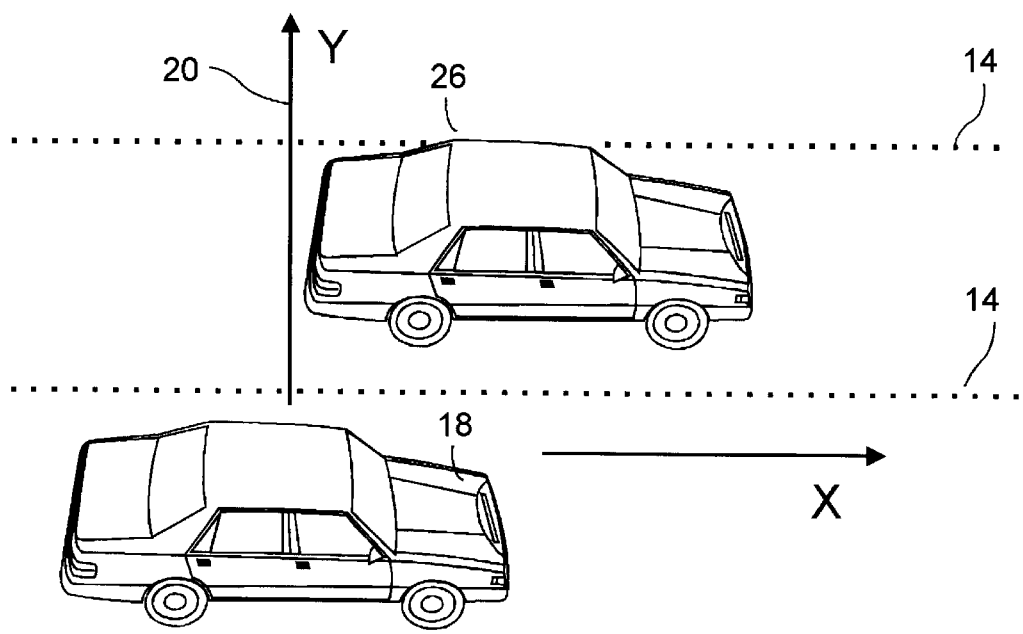
FIG. 8 illustrated two adjacent vehicles traveling on a roadway and communicating with each other.

FIG. 8 shows the implementation of the invention in which a pair of vehicles 18, 26 are traveling on a roadway each in a defined corridor defined by lines 14 and each is equipped with a system in accordance with the invention. The system in each vehicle 18,26 will receive data informing it of the position of the other vehicle and prevent accidents from occurring, e.g., if vehicle 18 moves in the direction of arrow 20. This can be accomplished via direct wireless broad band communication, or through another path such as via the Internet or through a base station. wherein each vehicle transmits its best estimate of its absolute location on the earth along with an estimate of the accuracy of this location. If one of the vehicles has recently passed a precise positioning station, for example, then it will know its position stern accurately to within 2 centimeters, for example. Each vehicle will also send the latest satellite messages that it received permitting each vehicle to precisely determine its relative location to the other since the errors in the signals will be the same for both vehicles. To the extent that both vehicles are near each other, even the carrier phase ambiguity can be determined and each vehicle will know its position relative to the other to within better than 2 centimeters. As more and more vehicles become part of the community and communicate their information to each other, each vehicle can even more accurately determine its absolute position and especially if one vehicle knows its position very accurately, if it recently passed a PPS for example, then all vehicles will know their position with approximately the same accuracy and that accuracy will be able to be maintained for as long as a vehicle keeps its lock on the satellites in view. If that lock is lost temporarily, the INS system will fill in the gaps and, depending on the accuracy of that system, the approximate 2 centimeter accuracy can be maintained even if the satellite lock is lost for up to approximately five minutes.

A five minute loss of satellite lock is unlikely expect in locations where buildings or geological features interfere with the signals. In the building case, the problem can be eliminated through the placement of PPS stations and the same would be true for the geological obstruction case except in remote areas where ultra precise positioning accuracy is probably not required. In the case of tunnels, for example, the cost of adding PPS stations is very small compared with the cost of building and maintaining the tunnel.

Figure 9:
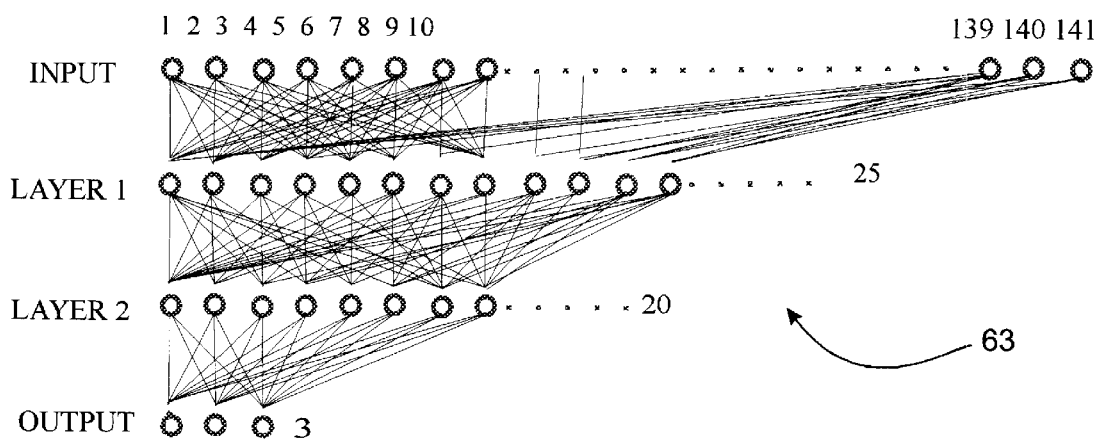
FIG. 9 is a schematic diagram illustrating a neural network of the type useful in the image analysis computer of FIG. 5.

FIG. 9 is a schematic diagram illustrating a neural network of the type useful in image analysis. Data representing features from the images from the CMOS cameras 60 are input to the neural network circuit 63, and the neural network circuit 63 is then trained on this data. More specifically, the neural network circuit 63 adds up the feature data from the CMOS cameras 60 with each data point multiplied by an associated weight according to the conventional neural network process to determine correlation function.

In this embodiment, 141 data points are appropriately interconnected at 25 connecting points of layer 1, and each data point is mutually correlated through the neural network training and weight determination process. In some implementations, each of the connecting points of the layer 1 has an appropriate threshold value, and if the sum of measured data exceeds the threshold value, each of the connecting points will output a signal to the connecting points of layer 2. In other cases, an output value or signal will always be outputted to layer 2 without thresholding.

The connecting points of the layer 2 comprises 20 points, and the 25 connecting points of the layer 1 are appropriately interconnected as the connecting points of the layer 2. Similarly, each data value is mutually correlated through the training process and weight determination as described above and in the above referenced neural network texts. Each of the 20 connecting points of the layer 2 can also have an appropriate threshold value, if thresholding is used, and if the sum of measured data exceeds the threshold value, each of the connecting points will output a signal to the connecting points of layer 3.

The connecting points of the layer 3 comprises 3 points in this example, and the connecting points of the layer 2 are interconnected at the connecting points of the layer 3 so that each data is mutually correlated as described above.

The value of each connecting point is determined by multiplying weight coefficients and summing up the results in sequence, and the aforementioned training process is to determine a weight coefficient Wj so that the value (ai) is a previously determined output.

$$ai = \Sigma W_j \cdot X_j (j=1 \text{ to } N) + W_0$$

wherein

Wj is the weight coefficient,

Xj is the data

N is the number of samples and $W_0$ is bias weight associated with each node.

Based on this result of the training, the neural network circuit 63 generates the weights and the bias weights for the coefficients of the correlation function or the algorithm.

At the time the neural network circuit 63 has learned from a suitable number of patterns of the training data, the result of the training is tested by the test data. In the case where the rate of correct answers of the object identification unit based on this test data is unsatisfactory, the neural network circuit 63 is further trained and the test is repeated. Typically about 200,000 feature patterns are used to train the neural network 63 and determine all of the weights. A similar number is then used for the validation of the developed network. In this simple example chosen, only three outputs are illustrated. These can represent another vehicle, a truck and a pole or tree. This might be suitable for an early blind spot detector design. The number of outputs depends on the number of classes of objects that are desired. However, too many outputs can result in an overly complex neural network and then other techniques such as modular neural networks can be used to simplify the process. When a human looks at a tree, for example, he or she might think "what kind of tree is that?" but not "what kind of tiger is that". The human mind operates with modular neural networks where the object to be identified is first determined to belong to a general class and then to a subclass etc. Object recognition neural networks can frequently make use of this principle with a significant simplification resulting.

In the above example, the image was first subjected to a feature extraction process and the feature data was input to the neural network. In other cases, especially as processing power continues to advance, the entire image is input to the neural network for processing. This generally requires a larger neural network. Alternate approaches use data representing the difference between two frames and the input data to the neural network. This is especially useful when a moving object of interest is in an image containing stationary scenery that is of no interest. This technique can be used even when everything is moving by using the relative velocity as a filter to remove unwanted pixel data. Naturally, any variations on this theme are possible and will now be obvious to those skilled in the art. Alternately, this image can be filtered based on range, which will also significantly reduce the number of pixels to be analyzed.

In another implementation, the scenes are differenced based on illumination. If infrared illumination is used, for example, the illumination can be turned on and off and images taken and then differenced. If the illumination is known only to illuminate an object of interest then such an object can be extracted from the background by this technique. A particularly useful method is to turn the illumination on and off for alternate scan lines in the image. Adjacent scan lines can then be differenced and the resulting image sent to the neural network for identification.

The neural network can be implemented as an algorithm on a general purpose microprocessor or on a dedicated parallel processing DSP, neural network ASIC or other dedicated parallel processor. The processing speed is generally considerably faster when parallel processors are used and this can also permit the input of the entire image for analysis rather than using feature data. Naturally, a combination of feature and pixel data can also be used.

Neural networks have certain known defects that various researchers have attempted to eliminate. For example, if data representing an object that is totally different from those objects present in the training data is input to the neural network, an unexpected result can occur which, in some cases, can cause a system failure. To solve this and other neural network problems, researchers have resorted to adding in some other computational intelligence principles such as fuzzy logic resulting in a neural-fuzzy system, for example. As the RtZF™ system evolves, such refinements will be implemented to improve the accuracy of the system. Thus, although pure neural networks are currently being applied to the problem, hybrid neural networks such as modular, ensemble and fuzzy neural networks will undoubtedly evolve.

Figure 10:
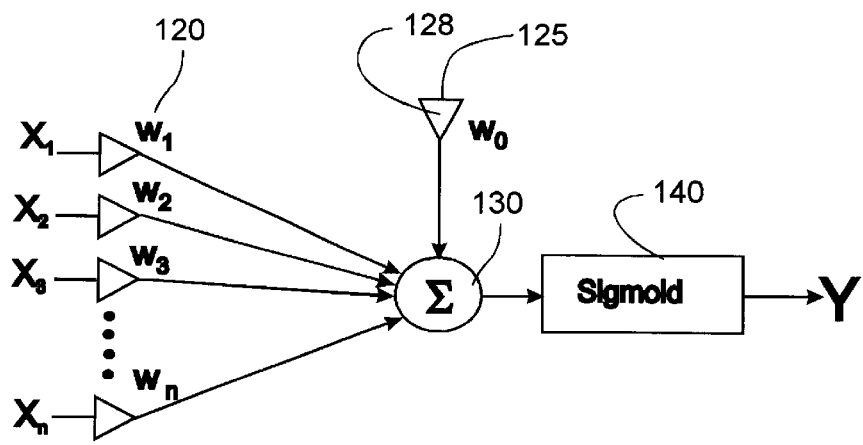
FIG. 10 is a schematic diagram illustrating the structure of a node processing element in the neural network of FIG. 9.

A typical neural network processing element known to those skilled in the art is shown in FIG. 10 where input vectors, (X1, X2 . . . Xn) are connected via weighing elements 120 (W1, W2 . . . Wn) to a summing node 130. The output of node 130 is passed through a nonlinear processing element 140, typically a sigmoid function, to produce an output signal, Y. Offset or bias inputs 125 can be added to the inputs through weighting circuit 128. The output signal from summing node 130 is passed through the nonlinear element 140 which has the effect of compressing or limiting the magnitude of the output Y.

Neural networks used in the accident avoidance system of this invention are trained to recognize roadway hazards including automobiles, trucks, and pedestrians. Training involves providing known inputs to the network resulting in desired. output responses. The weights are automatically adjusted based on error signal measurements until the desired outputs are generated. Various learning algorithms may be applied with the back propagation algorithm with the Delta Bar rule as a particularly successful method.

FIG. 11 shows the implementation of the invention using the Precise Positioning System (PPS) 151, 152, 153, in which a pair of vehicles 18, 26 are traveling on a roadway each in a defined corridor delineated by lines 14 and each is equipped with a system in accordance with the invention and in particular, each is equipped with PPS receivers. Two versions of the PPS system will now be described. This invention is not limited to these two examples but they will serve to illustrate the principals involved. Vehicle 18 contains two receivers 160,161 for the micropower impulse radar (MIR) implementation of the invention. MIR transmitter devices are placed at 151,152 and 153 respectively. They are linked together with a control wire, not shown, (or possibly a wireless connection) such that each device transmits a short radar pulse that a precise timing relative to the others. These pulses can be sent simultaneously or at a precise known delay. Vehicle 18 knows from its map database the existence and location of the three MIR transmitters. The transmitters 151,152 and 153 can either transmit a coded pulse or non-coded pulse. In the case of the coded pulse, the vehicle PPS system will be able to verify that the three transmitters are in fact the ones that appear on the map database. Since the vehicle will know reasonably accurately it's location and it is, unlikely that other PPS transmitters will be nearby or within range, the coded pulse may not be necessary. Two receivers 160 and 161 are illustrated on vehicle 18. For the MIR implementation, only a single receiver is necessary since the position of the vehicle will be uniquely determined by the time of arrival of the three MIR pulses. A second receiver can be used for redundancy and also to permit the vehicle to determine the angular position of the MIR transmitters as a further check on the system accuracy. This can be done since the relative time of arrival of a pulse from one of the transmitters 151,152,153 can be used to determine is the distance to each transmitter and by geometry it's angular position relative to the vehicle 18. If the pulses are coded, then the direction to the MIR devices 151,152,153 will also be determinable.

The micropower impulse radar units require battery or other power to operate. Since they may be joined together with a wire in order to positively control the timing of the three pulses, a single battery can be used to power all three units. this battery can also be coupled with a solar panel to permit maintenance free operation of the system. Since the MIR devices use very small amounts of power, they can operate for many years on a single battery.

Although the MIR systems are relatively inexpensive, on the order of ten dollars each, the installation cost of the system will be significantly higher than the RFID solution discussed next. The MIR system is also significantly more complex than the RFFD system; however, its accuracy can be checked by each vehicle that uses the system. Tying the MIR system to a GPS receiver and using the accurate clock on the GPS satellites as the trigger for the sending of the radar pulses can add additional advantages and complexity. This will permit vehicles passing by to additionally accurately set their clocks to be in synchronization with the GPS clocks. Since the MIR system will know its precise location, all errors in the GPS signals can be automatically corrected and in that case, the MIR system becomes a differential GPS base station. For most implementations, this added complexity is not necessary since the vehicle themselves will be receiving GPS signals and they will also know precisely their location from the MIR transmitter triad 151,152,153.

A considerably simpler alternate approach to the MIR system described above utilizes reflective RFID tags. These tags when interrogated by an interrogator type of receiver 160,161, reflect a modified RF signal with the modification being the identification of the tag. Such tags are described in many patents on RFID technology and can be produced for substantially less than one dollar each. The implementation of the RFID system would involve the accurate placement of these tags on known objects on the infrastructure. These objects could be spots on the highway, posts, signs, sides of buildings, poles, or structures that are dedicated specifically for this purpose. In fact, any structure that is rigid and unlikely to changes position can be used for mounting RFID tags. In downtown Manhattan, building sides, street lights, stoplights, or other existing structures are ideal locations for such tags. A vehicle 18 approaching a triad of such RFID tags represented by boxes 151,152,153 would transmit an interrogation pulse from interrogator 160 or 161. The pulse would reflect off of each tag within range and the reflected signal would be received by the same interrogator(s) 160, 161 or other devices on the vehicle. Once again, a single interrogator is sufficient.

Electronic circuitry, not shown, associated with the interrogator 160 or 161 would determine the precise distance from the vehicle to the RFID tag 151,152,153 based on the round trip time of flight. This will provide the precise distance is to the three RFID tags 151, 152, 153. Once again, a second interrogator 161 can also be used, in which case, it could be a receiver only and would provide redundancy information to the main interrogator 160 and also provide a second measure of the distance to each of the RFID tags. Based on the displacement of the two receivers 160, 161, the angular location of each of the RFID tags relative into the vehicle can be determined providing further redundant information as to the position of the vehicle relative to the tags.

Using the PPS system, a vehicle can precisely determine its location within two centimeters or better relative to the MIR or RFID tags and since the precise location of these devices has previously been recorded on the map database, the vehicle will be able to determine its precise location on the surface of the earth. With this information, the vehicle will be thereafter able to use the carrier wave phase to maintain its precise knowledge of its location until the locks on the satellites arc lost. Similarly, the vehicle 18 can broadcast this information to vehicle 26, for example, permitting a vehicle that has not passed through the PPS triad to also greatly improve the accuracy with which it knows its position. Each vehicle that has recently passed through a PPS triad now becomes a differential GPS station for as long as the satellite locks are maintained. Therefore, through inter-vehicle communications, all vehicles in the vicinity can also significantly improve their knowledge of their position accuracy resulting in a system which is extremely redundant and therefore highly reliable and consistent with the "Road to Zero Fatalities"™ process. Once this system is operational, it is expected that the U.S. and other governments will launch additional GPS type satellites, or other similar satellites, further strengthening the system and adding further redundancy eventually resulting in a highly interconnected system that approaches 100% reliability and, like the Internet, cannot be shut down.

As the system evolves, the problems associated with urban canyons, tunnels, and other obstructions to satellite view will be solved by the placement of large numbers of MIR systems, RFID tags, or other devices providing similar location information.

Although the system has been illustrated for use with automobiles, naturally the same system would apply for all vehicles including trucks, trains an even airplanes taxing on runways. It also would be useful for use with cellular phones and other devices carried by humans. The combination of the PPS system and cellular phones permits the precise location of a cellular phone to be determined within centimeters by an emergency operator receiving a 911 call. for example. Such RFID tags can be inexpensively placed both inside and outside of buildings, for example.

The range of RFID tags is somewhat limited to approximately 10 meters for current technology. If there are obstructions preventing a clear view of the RFID tag by the interrogator, the distance becomes less. For some applications where it is desirable to use larger distances, battery power can be provided to the RFID tags. In this case, the interrogator would send a pulse to the tag that would turn on the tag and at a precise time later the tag would transmit an identification message. In some cases, the interrogator itself can provide the power to drive the RFID circuitry, in which case the tag would again operate in the transponder mode as opposed to the reflective mode.

From the above discussion, those skilled in the art will think of other devices that can be interrogated by a vehicle traveling down the road. Such devices might include radar reflectors, mirrors, other forms of transponders, or other forms of energy reflectors. All such devices are contemplated by this invention and the invention is not limited to be specific examples described.

Any communication device can be coupled with an interrogator that utilizes the MIR or RFID PPS system described above. Many devices are now being developed that make use of the Bluetooth communication specification. All such Bluetooth enabled devices can additionally be outfitted with a PPS system permitting the location of the Bluetooth device to be positively determined. This enabling technology will permit a base station to communicate with a Bluetooth-enabled device whose location is unknown and have the device transmit back its precise location on the surface of the earth. As long as the Bluetooth-enabled device is within the range of the base station, its location can be precisely determine. Thus, the location of mobile equipment in a factory, packages within the airplane cargo section, laptop computers, cell phones. PDAs, and eventually even personal glasses or car keys or any device upon which a Bluetooth enabled deice can be attached can be determined. Actually, this invention is not limited to Bluetooth devices but encompasses any device that can communicate with any other devices.

Once the location of an object can be determined, many other services can be provided. These include finding the device, or the ability to provide information to that device or to the person accompanying that device such as the location of the nearest bathroom, restaurant, or the ability to provide guided tours or other directions to people in traveling to other cities, for example.

Figure 12A:
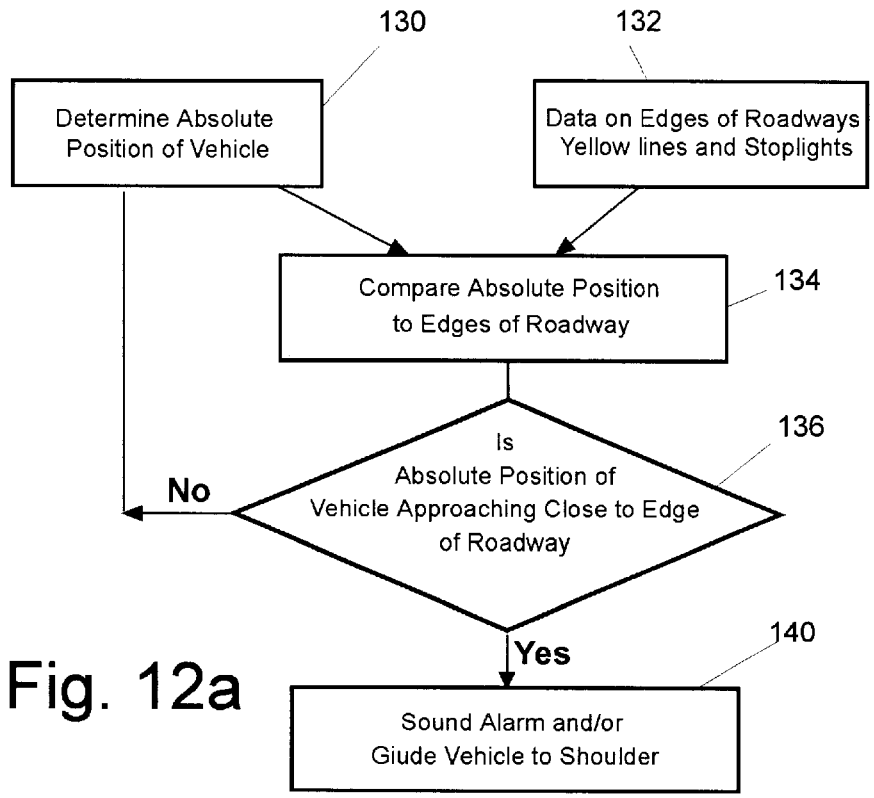
FIG. 12a is a flow chart of the method in accordance with the invention for preventing run off the road accidents.

FIG. 12a is a flow chart of the method in accordance with the invention. The absolute position of the vehicle is determined at 130, e.g., using a GPS, DGPS PPS system, and compared to the edges of the roadway at 134, which is obtained from a memory unit 132. Based on the comparison at 134, it is determined whether the absolute position of the vehicle is approaching close to or intersects an edge of the roadway at 136. If not, then the position of the vehicle is again obtained, e.g., at a set time interval thereafter, and the process continues. If yes, an alarm or warning system will be activated or the system will take control of the vehicle (at 140) to guide it to a shoulder of the roadway or other safe location.

Figure 12B:
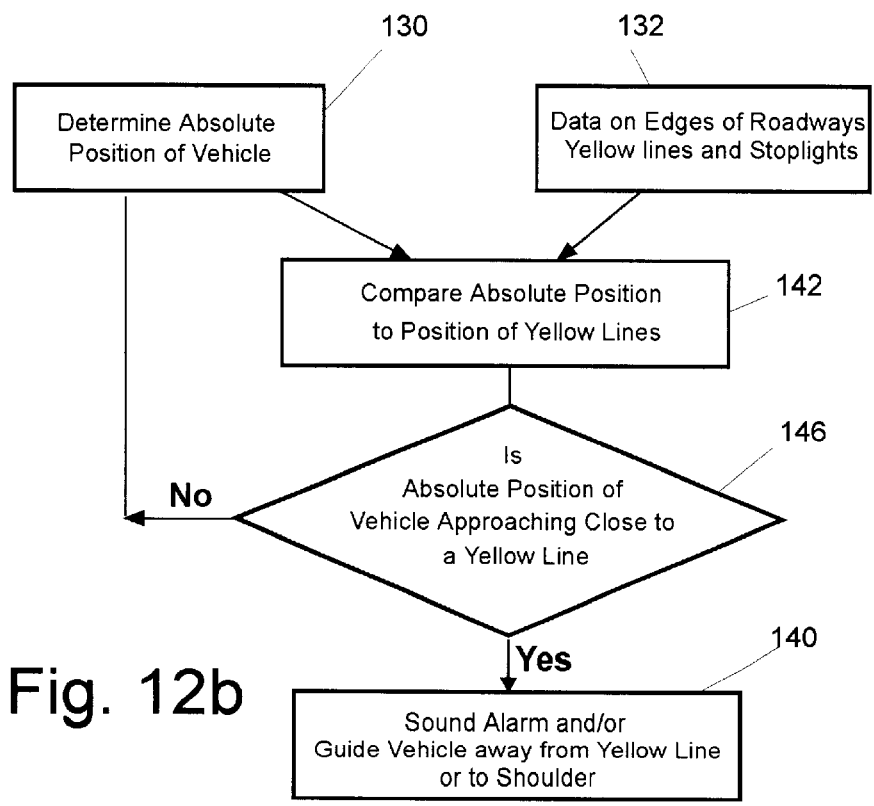
FIG. 12b is a flow chart of the method in accordance with the invention for preventing yellow line crossing accidents.

FIG. 12b is another flow chart of the method in accordance with the invention similar to FIG. 12a. Again the absolute position of the vehicle is determined at 130, e.g., using a GPS, DGPS PPS system, and compared to the location of a roadway yellow line at 142 (or possibly another line which indicates an edge of a lane of a roadway), which is obtained from a memory unit 132. Based on the comparison at 144, it is determined whether the absolute position of the vehicle is approaching close to or intersects the yellow line 144. If not, then the position of the vehicle is again obtained, e.g., at a set time interval thereafter, and the process continues. If yes, an alarm will sound or the system will take control of the vehicle (at 146) to control the steering or guide it to a shoulder of the roadway or other safe location.

Figure 12C:
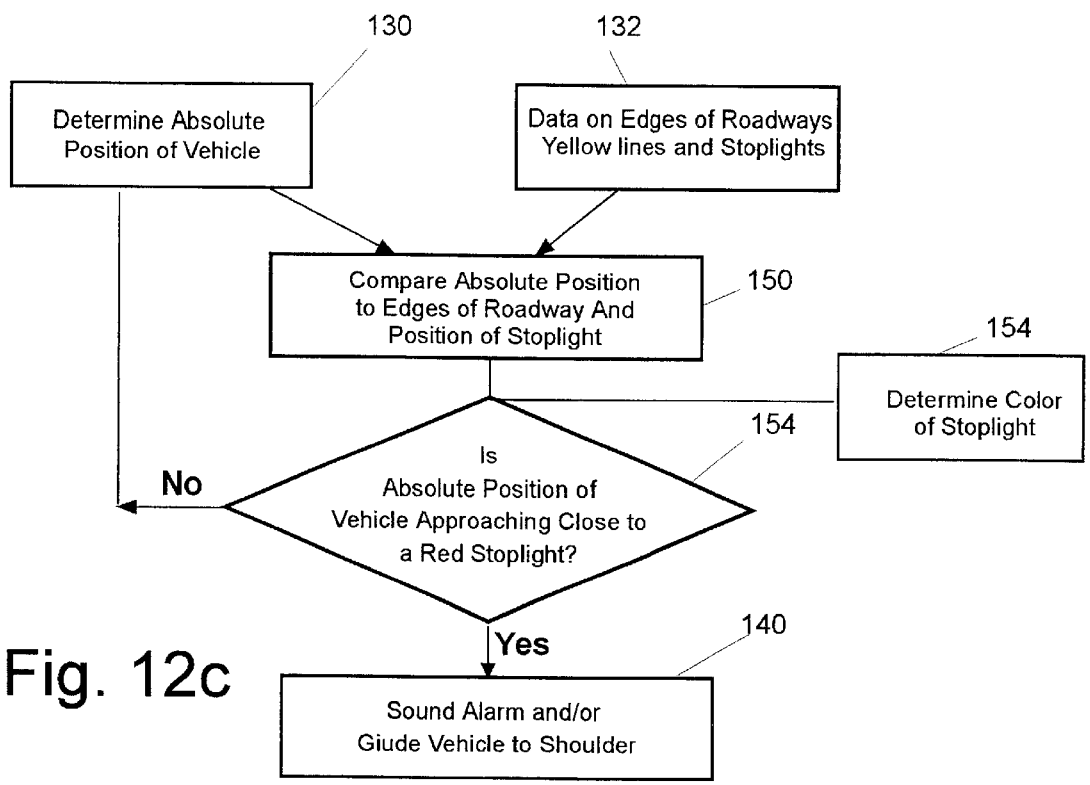
FIG. 12c is a flow chart of the method in accordance with the invention for preventing stoplight running accidents.

FIG. 12c is another flow chart of the method in accordance with the invention similar to FIG. 12a. Again the absolute position of the vehicle is determined at 130, e.g., using a GPS, DGPS PPS system, and compared to the location of a roadway stoplight at 150, which is obtained from a memory unit 132. Based on the comparison at 150, it is determined whether the absolute position of the vehicle is approaching close to a stoplight. If not, then the position of the vehicle is again obtained, e.g., at a set interval thereafter, and the process continues. If yes, a sensor determines whether the stoplight is red (e.g., a camera) and if so, an alarm will sound or the system will take control of the vehicle (at 154) to control the brakes or guide it to a shoulder of the roadway or other safe location. A similar flow chart can be now drawn by those skilled in the art for other conditions such as stop signs, vehicle speed control, collision avoidance etc.

Figure 13:
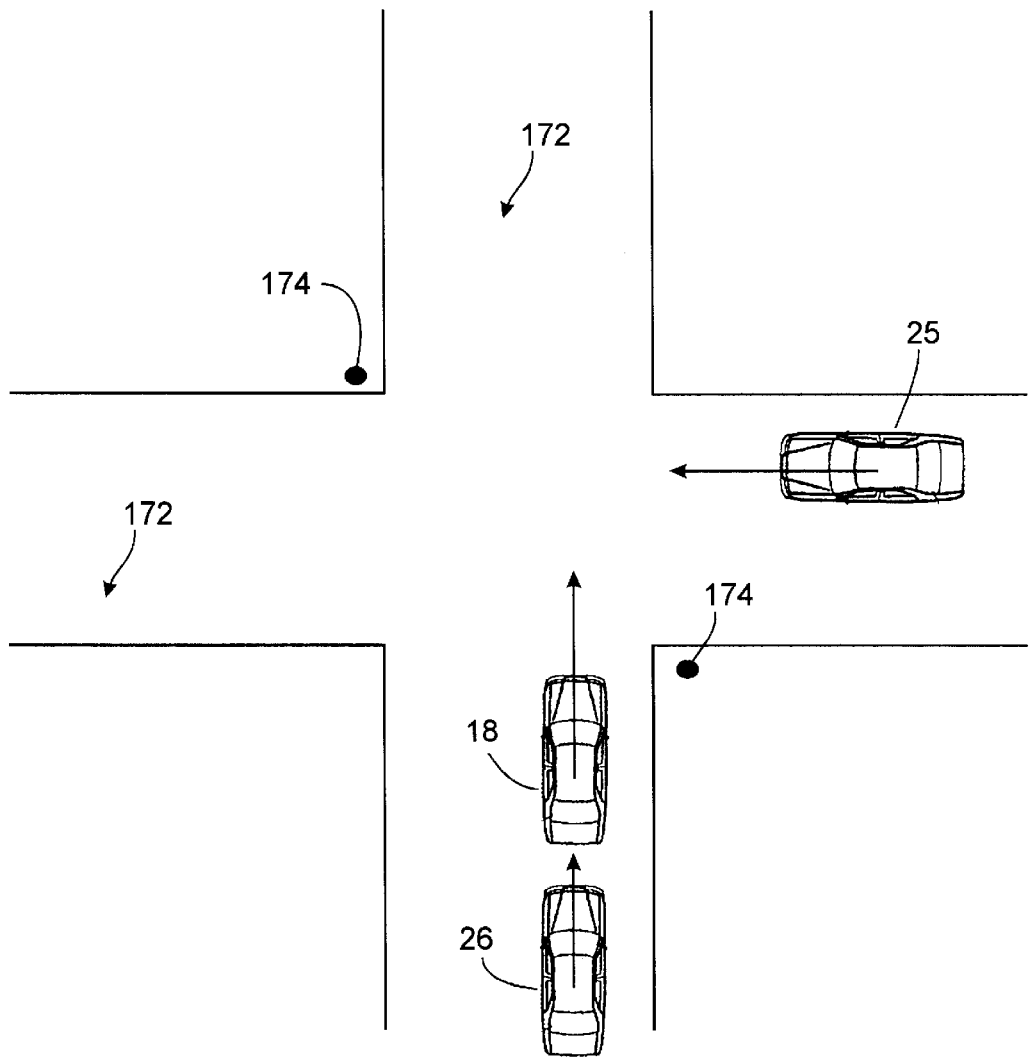
FIG. 13 illustrates an intersection with stop signs on the lesser road where there is a potential for a front to side impact and a rear end impact.

FIG. 13 illustrates an intersection of a major road 170 with a lesser road 172. The road 170 has the right of way and stop signs 174 have been placed to control the traffic on the lesser road 172. Vehicles 18 and 26 arc proceeding on road 172 and vehicle 25 is proceeding on road 170. A very common accident is caused when vehicle 18 ignores the stop sign 174 and proceeds into the intersection where it is struck in the side by vehicle 25 or strikes vehicle 25 in the side.

Using the teachings of this invention, vehicle 18 will know of the existence of the stop sign and if the operator attempts to proceed without stopping, the system will sound a warning and if that warning is not heeded, the system will automatically bring the vehicle 18 to a stop preventing it from intruding into the intersection.

Another common accident is where vehicle 18 does in fact stop but then proceeds forward without noticing vehicle 25 thereby causing an accident. Since in the fully deployed RtZF™ system, vehicle 18 will know through the vehicle-to-vehicle communication the existence and location of vehicle 25 and can calculate its velocity, the system can once again take control of vehicle 18 if a warning is not heeded and prevent vehicle from 18 from proceeding into the intersection and thereby prevent the accident.

In the event that the vehicle 25 is not equipped with the RtZF™ system, vehicle 18 will still sense the present of vehicle 25 through the laser radar, radar and camera systems. Once again, when the position and velocity of vehicle 25 is sensed, appropriate action can be taken by the system in vehicle 18 to eliminate the accident.

In another scenario where vehicle the 18 does properly stop at the stop sign, but vehicle 26 proceeds without observing the presence of the stopped vehicle 18, the laser radar, radar and camera systems will all operate to warn the driver of vehicle 26 and if that warning is not heeded, the system in vehicle 26 will automatically stop the vehicle 26 prior to its impacting vehicle 18. Thus, in the scenarios described above the "road to zero fatalities"™ system and method of this invention will prevent common intersection accidents from occurring.

Figure 14:
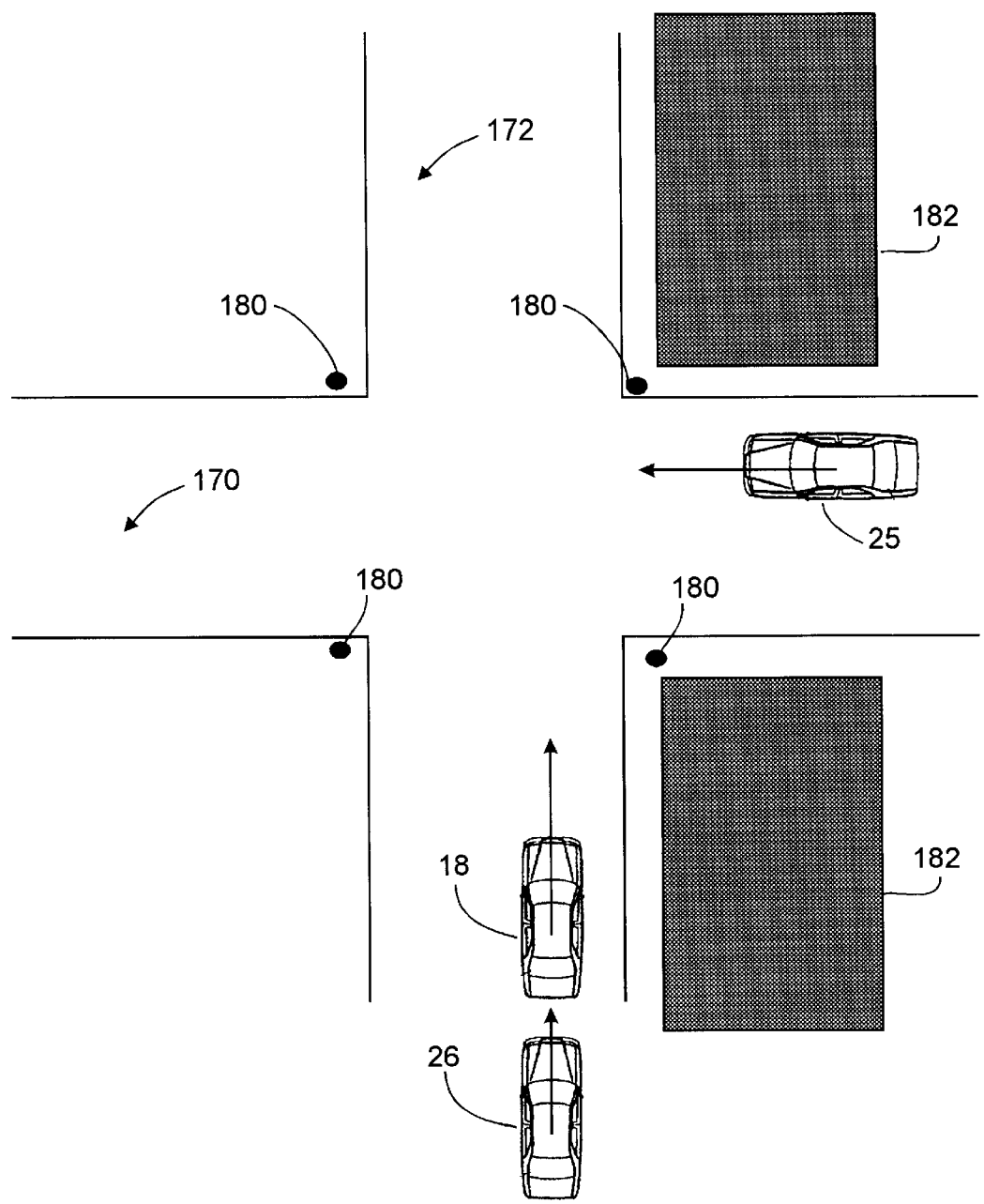
FIG. 14 illustrates a blind intersection with stoplights where there is a potential for a front side to front side impact.

FIG. 14 is a view of an intersection where traffic is controlled by stoplights 180. If the vehicle 18 does not respond in time to a red stoplight, the system as described above will issue a warning and if not heeded, the system will take control of the vehicle 18 to prevent it from entering the intersection and colliding vehicle 25. In this case, the stoplight 180 will either emit a signal indicating its color or vehicle 18 will have a camera mounted such that it can observe the color of the stoplight. In this case buildings 182 obstruct the view from car 18 to car 25 thus an accident can still be prevented even when the operators are not able to visually see the threatening vehicle.

Figure 15:
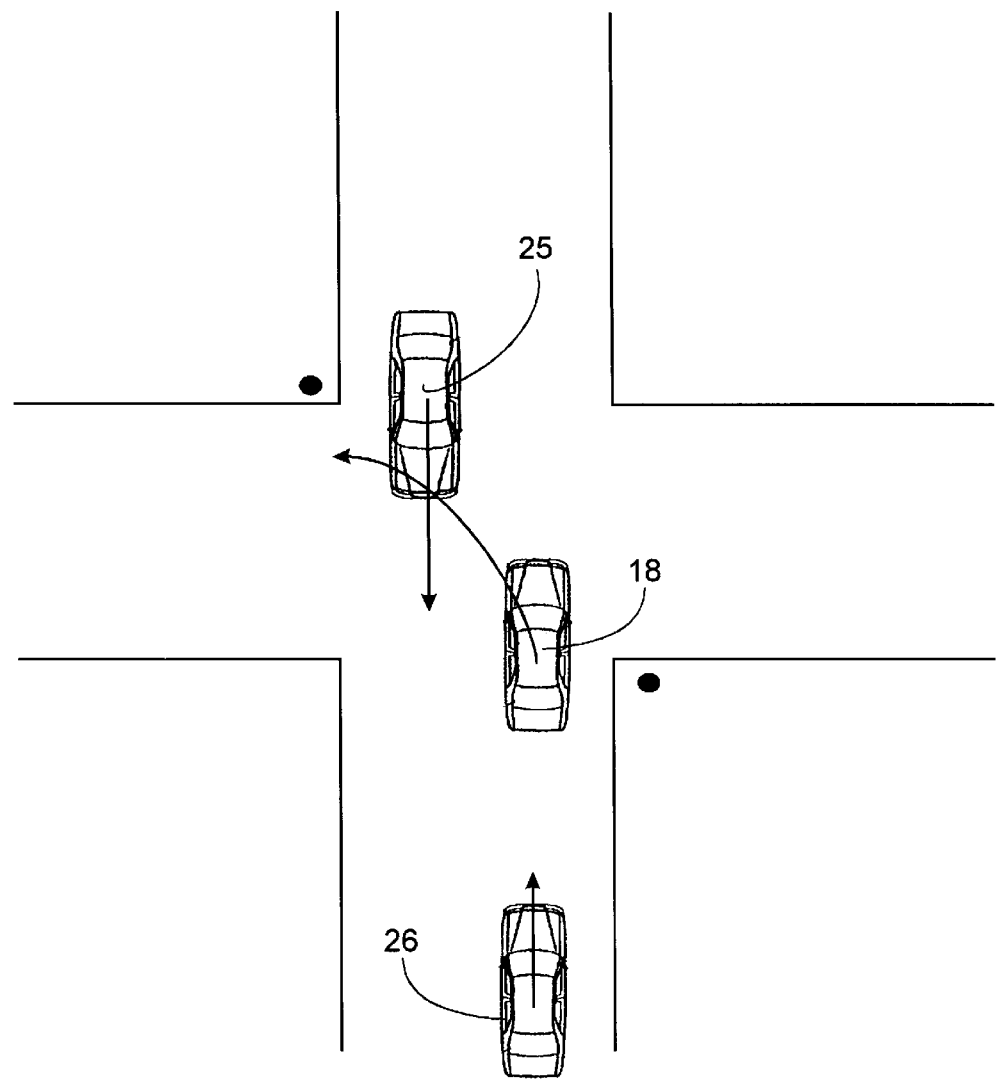
FIG. 15 illustrates an intersection where there is a potential for a front-to-front impact as a vehicle turns into oncoming traffic.

FIG. 15 illustrates the case where vehicle 18 is about to execute a left-hand turn into the path of vehicle 25. This accident will be prevented if both cars have the RtZF™ system since the locations and velocities of both vehicles 18,25 will be known to each other. If vehicle 25 is not equipped and vehicle 18 is, then the cam and laser radar subsystems will operate to prevent vehicle 18, turning into the path of vehicle 25. Thus, once again common intersection accidents are prevented by this invention.

The systems described above can be augmented by infrastructure based sensing and warning systems. Camera, laser radar or radar subsystems such as placed on the vehicle can also be placed at intersections to warn the oncoming traffic if a collision is likely to occur. Additionally, simple sensors that sense the signals emitted by oncoming vehicles, including radar, thermal radiation, etc., can be used to operate warning systems that notify oncoming traffic of potentially dangerous situations. Thus, many of the teachings of this invention can be applied to infrastructure-based installations in addition to the vehicle resident systems.

An important part of this invention is the digital map that contains relevant information relating to the road on which the vehicle is traveling. The digital map usually includes the location of the edge of the road, the edge of the shoulder, the elevation and surface shape of the road, the character of the land beyond the road, trees, poles, guard rails, signs, lane markers, speed limits, etc. as discussed in more detail elsewhere herein. This data or information is acquired in a unique manner for use in the invention and the method for acquiring the information and its conversion to a map database that can be accessed by the vehicle system is part of the invention. The acquisition of the data for the maps will now be discussed. It must be appreciated though that the method for acquiring the data and forming the digital map can also be used in other inventions.

Local area differential GPS can be utilized to obtain maps with an accuracy of 2 cm (one sigma). Temporary local differential stations are available from such companies as Trimble Navigation. These local differential GPS stations can be placed at an appropriate spacing for the road to be mapped, typically every 30 kilometers. Once a local differential GPS station is placed, it requires several hours for the station to determine its precise location. Therefore, sufficient stations are required to cover the area that is to be mapped within, for example, four hours. This may require as many as 10 or more such differential stations for efficient mapping.

Figure 16B:
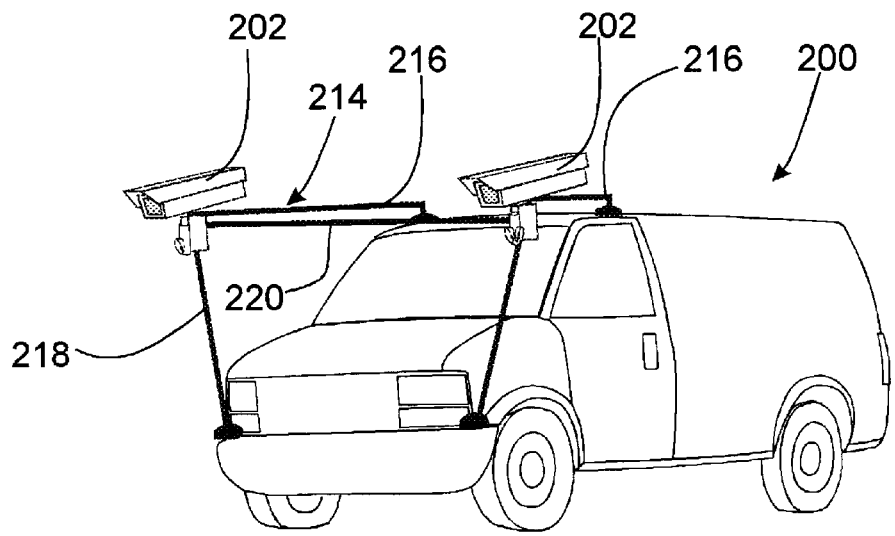
FIG. 16B is a front perspective view of a vehicle equipped with the road-mapping arrangement in accordance with the invention.
Figure 16A:
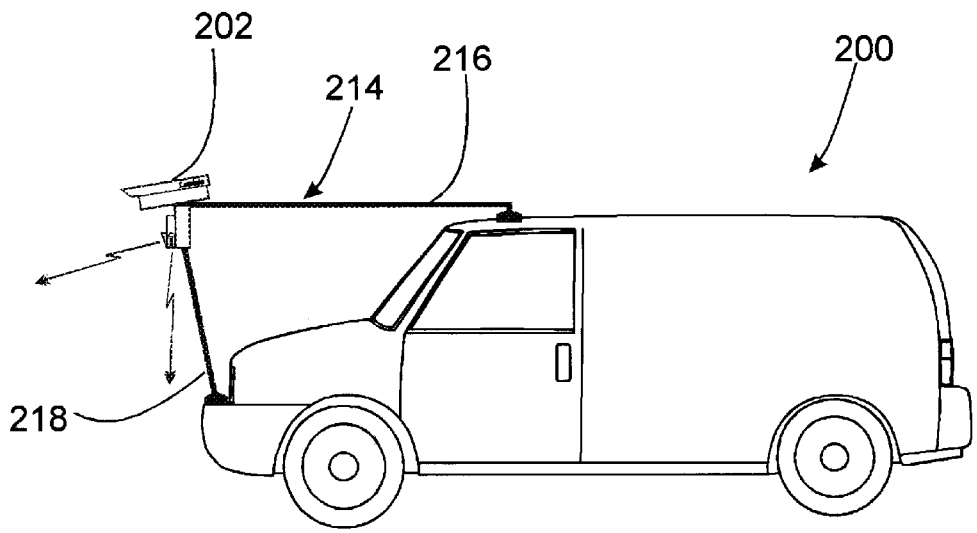
FIG. 16A is a side view of a vehicle equipped with a road-mapping arrangement in accordance with the invention.
Figure 17:
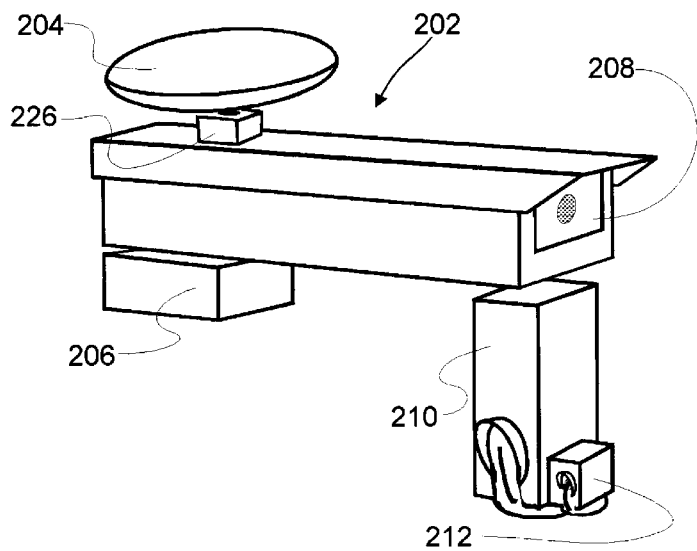
FIG. 17. is a schematic perspective view of a data acquisition module in accordance with the invention.

A mapping vehicle 200, such as shown in FIGS. 16A, 16B and 17, is used and the mapping vehicle obtains its location from GPS satellites and its corrections from the local differential stations. Such a system is capable of providing the 2 cm accuracy desired for the map database. Typically, at least two GPS receivers 226 are mounted on the mapping vehicle 200. Each GPS receiver 226 is contained within or arranged in connection with a respective data acquisition module 202, which data acquisition modules 202 also contain a GPS antenna 204, an accurate inertial measurement unit (IMU) 206, a forward-looking video camera 208, a downward and outward looking linear array camera 210 and a scanning laser radar 212. The relative position of these components in FIG. 17 is not intended to limit the invention.

A processor including a printed circuit board 224 is coupled to the GPS receivers 226, the IMUs 206, the video cameras 208, the linear cameras 210 and the scanning laser radars 212. The processor receives information regarding the position of the vehicle from the GPS receivers 226, and optionally the IMUs 206, and the information about the road from both linear cameras 210 or from both laser radars 212, or from all of the linear cameras 210 and laser radars 212, and forms the road map database. Information about the road can also come from one or both of the video cameras 208 and be incorporated into the map database.

The map database can be of any desired structure or architecture. Preferred examples of the database structure are of the type disclosed in U.S. Pat. No. 6,144,338 (Davies) and U.S. Pat. No. 6,247,019 (Davies), incorporated by reference herein in their entirety.

The data acquisition modules 202 are essentially identical and each mounts to the vehicle roof on an extension assembly 214 which extends forward of the front bumper. Extension assembly 214 includes a mounting bracket 216 from the roof of the vehicle 200 forward to each data acquisition module 210, a mounting bracket 218 extending from the front bumper upward to each data acquisition module 202 and a cross mounting bracket 220 extending between the data acquisition modules 202 for support. Since all of the data acquisition equipment is collocated, its precise location is accurately determined by the IMU and the differential GPS system.

Figure 18:
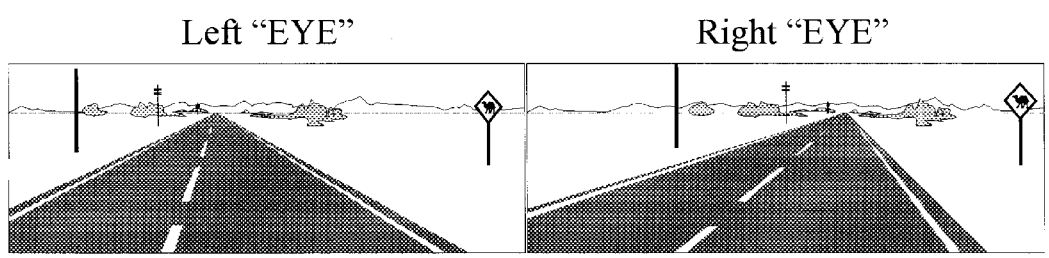
FIG. 18 shows the view of a road from the video cameras in both of the data acquisition modules.
Figure 17A:
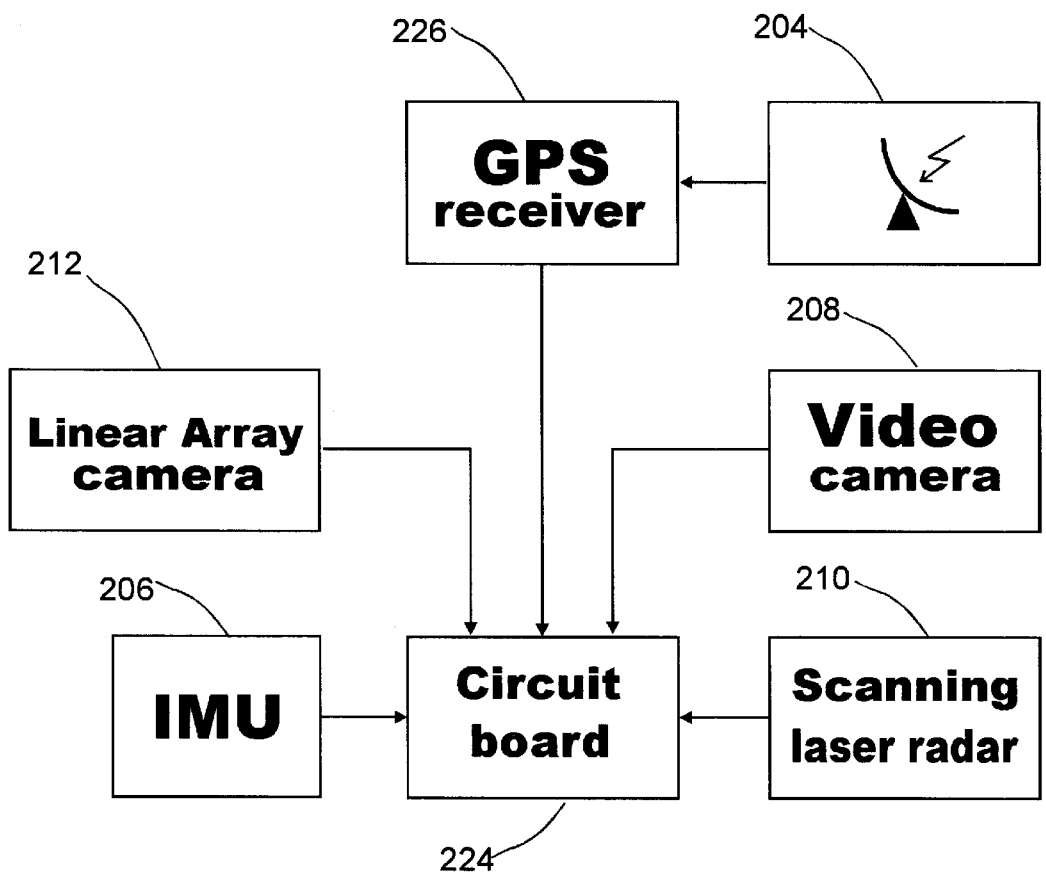
FIG. 17A is a schematic view of the data acquisition module in accordance with the invention.

The forward-looking video cameras 208 provide views of the road as shown in FIG. 18. These cameras 208 permit the database team to observe the general environment of the road and to highlight any anomalies. They also permit the reading of traffic signs and other informational displays all of which will be incorporated into the database. The cameras 208 can be ordinary color video cameras, high-speed video cameras, wide angle or telescopic cameras, black and white video cameras, infrared cameras, etc. or combinations thereof. In some cases, special filters are used to accentuate certain features. For example, it has been found that lane markers frequently are more readily observable at particular frequencies, such as infrared. In such cases, filters can be used in front of the camera lens or elsewhere in the optical path to block unwanted frequencies and pass desirable frequencies. Polarizing lenses have also been found to be useful in many cases. Normally, natural illumination is used in the mapping process, but for some particular cases, particularly in tunnels, artificial illumination can also be used in the form of a floodlight or spotlight that can be at any appropriate frequency of the ultraviolet, visual and infrared portions of the electromagnetic spectrum or across many frequencies. Laser scanners can also be used for some particular cases when it is desirable to illuminate some part of the scene with a bright spot. In some cases, a scanning laser rangefinder can be used in conjunction with the forward-looking cameras 204 to determine the distance to particular objects in the camera view.

The video camera system can be used by itself with appropriate software as is currently being done by Lamda Tech International Inc. of Waukesha, Wis., to obtain the location of salient features of a road. However, such a method to obtain accurate maps is highly labor intensive and therefore expensive. The cameras and associated equipment in the present invention are therefore primarily used to supplement the linear camera and laser radar data acquisition systems to be described now.

The mapping vehicle data acquisition modules will typically contain both a linear camera and a scanning laser radar, however, for some applications one or the other may be omitted.

The linear camera 210 is a device that typically contains a linear CCD, CMOS or other light sensitive arrays of, for example, four thousand pixels. An appropriate lens provides a field of view to this camera that typically extends from approximately the center of the vehicle out to the horizon. This camera records a one-dimensional picture covering the entire road starting with approximately the center of the lane and extending out to the horizon. This linear array camera 210 therefore covers slightly more than 90 degrees. Typically, this camera operates using natural illumination and produces effectively a continuous picture of the road since it obtains a linear picture, or column of pixels, for tropically every one inch of motion of the vehicle. Thus, a complete two-dimensional panoramic view of the road traveled by the mapping vehicle is obtained. Since there are two such measurement units, a 180 degree view is obtain This camera will typically record in full color thus permitting the map database team to have a complete view of the road looking perpendicular from the vehicle. The view is recorded in a substantially vertical plane. This camera will not be able to read text on traffic signs, thus the need for the forward-looking cameras 208. Automated software can be used with the images obtained from these cameras to locate the edge of the road, lane markers, the character of land around and including the road and all areas that an errant vehicle may encounter. The full color view allows the characterization of the land to be accomplished automatically with minimal human involvement.

The scanning laser radar 212 is typically designed to cover a 90 degree or less scan thus permitting a rotating mirror to acquire at least four such scans per revolution. The scanning laser radar 212 can be coordinated or synchronized with the linear camera so that each covers the same field of view with the exception that the camera typically will cover more than 90 degrees. Naturally, the scanning laser radar can be designed to cover more or less than 90 degrees as desired for a particular installation. The scanning laser radar can operate in any appropriate frequency from ultraviolet to the far infrared. Typically, it will operate in the eye-safe portion of the infrared spectrum for safety reasons. The scanning laser radar 212 can operate either as a pulse-modulated or a tone-modulated laser as is known in the art. If operating in the tone-modulated regime, the laser light will be typically modulated with three or more frequencies in order to eliminate distance ambiguities.

For each scan, the laser radar 212 provides the distance from the scanner to the ground for up to several thousand points in a vertical plane extending from approximately the center of the lane out to near the horizon. This device therefore provides precise distances and elevations to all parts of the road and its environment. The precise location of signs that were observed with the forward-looking cameras 204, for example, can now be easily and automatically retrieved. The scanning laser radar therefore provides the highest level of mapping automation.

Scanning laser radars have been used extensively for mapping purposes from airplanes and in particular from helicopters where they have been used to map portions of railway lines in the United States. This is the first known use of the scanning laser radar system for mapping roadways where the radar is mounted onto a vehicle that is driving the road.

Ideally, all of the above-described systems are present on the mapping vehicle. Although there is considerable redundancy between the linear camera and the scanning laser radar, the laser radar operates at one optical frequency and therefore does not permit the automatic characterization of the roadway and its environment.

As with the forward-looking cameras, it is frequently desirable to use filters and polarizing lenses for both the scanning laser radar and the linear camera. In particular, reflections from the sun can degrade the laser radar system unless appropriate filters are used to block all frequencies except frequency chosen for the laser radar.

Laser radars are frequently also referred to as ladars and lidars. All such devices that permit ranging to be accomplished from a scanning system, including radar, are considered equivalent for the purposes of this invention.

A particularly important enhancement to the above-described system uses precise positioning technology independent of GPS. The precise positioning system, also known as the calibration system, generally permits a vehicle to precisely locate itself independently of the IMU or DGPS systems.

One example of this technology involves the use of a radar and reflector system wherein radar transceivers are placed on the vehicle that send radar waves to reflectors that are mounted at the side of road. The location of reflectors either is already precisely known or is determined by the mapping system during data acquisition process. The radar transceivers transmit a pulse or frequency modulated radar signal to the road-mounted reflectors, typically corner reflectors, which reflect a signal back to the radar transceiver. This permits the radar system to determine the precise distance from the transceiver to the reflector by either time-of-flight or phase methods.

In one possible implementation, each vehicle is equipped with two radar devices operating in the 24–77 GHz spectrum. Each radar unit will be positioned on the vehicle and aimed outward, slightly forward and up toward the sides of the roadway. Poles would be positioned along the roadway at appropriate intervals and would have multiple corner cube radar reflectors mounted thereon to thereto, possibly in a vertical alignment. The lowest reflector on the pole would be positioned so that the vehicle radar will illuminate the reflector when the vehicle is in the lane closest to the pole. The highest reflector on the pole would be positioned so that the vehicle radar will illuminate the reflector when the vehicle is in the lane most remote from the pole. The frequency of the positioning of the poles will be determined by such considerations as the availability of light poles or other structures currently in place, the probability of losing access to GPS satellites, the density of vehicle traffic, the accuracy of the IMU and other similar considerations. Initially rough calculations have found that a spacing of about ¼ mile would likely be acceptable.

If the precise location of the reflectors has been previously determined and is provided on a road map database, then the vehicle can use this information to determine its precise location on the road. In the more typical case, the radar reflectors are installed and the mapping vehicle knows its location precisely from the differential GPS signals and the IMU, which for the mapping vehicle is typically of considerably higher accuracy then will be present in the vehicles that will later use the system. As a result, the mapping vehicle can also map a tunnel, for example, and establish the locations of radar reflectors that will later be used by non-mapping vehicles to determine their precise location when the GPS and differential GPS signals are not available. Similarly, such radar reflectors can be located for an appropriate distance outside of the tunnel to permit an accurate location determination to be made by a vehicle until it acquires the GPS and differential GPS signals. Such a system can also be used in urban canyons and at all locations where the GPS signals can be blocked or are otherwise not available. Since the cost of radar reflectors is very low, it is expected that eventually they will be widely distributed on the 4 million miles of roads in the U.S.

The use of radar and reflectors for precise positioning is only one of many systems being considered for this purpose. Others include markings on roadway, RFID tags, laser systems, laser radar and reflectors, magnetic tags embedded in the roadway, magnetic tape, etc. The radar and reflector technology has advantages over some systems in that it is not seriously degraded by bad weather conditions, is not affected if covered with snow, does not pose a serious maintenance problem, and other cost and durability features.

The radar transceivers used are typically mounted on either side of vehicle and pointed upward at between 30 and 60 degrees. They are typically aimed so that they project across the top of the vehicle so that several feet of vertical height can be achieved prior to passing over adjacent lanes where the signal could be blocked by the truck, for example. Naturally, other mounting and aiming systems can be used.

The radar reflectors are typically mounted onto a pole, building, overpass, or other convenient structure. They can provide a return code by the placement of several such reflectors such that the reflected pulse contains information that identifies this reflector with a particular reflector on the map database. This can be accomplished in numerous ways including the use of a collection of radar reflectors in a spaced apart geometric configuration on a radius from the vehicle. The presence or absence of a reflector can provide a returned binary code, for example.

The operation of the system is as follows. A vehicle traveling down a roadway in the vicinity of the reflector poles would transmit radar pulses at a frequency of perhaps once per millisecond. These radar pulses would be encoded so that each vehicle knows exactly what radar returns are from its transmissions. As the vehicle approaches a reflector pole, it will begin to receive reflections based on the speed of the vehicle. By observing a series of reflections, the vehicle software can select either the maximum amplitude reflection or the average or some other scheme to determine the proper reflection to consider. The radar pulse will also be modulated to permit a distance to the reflector calculation to be made based on the phase of the returned signal. Thus, as a vehicle travels down the road and passes a pair of reflector poles, it will be able to determine its longitudinal position on the roadway based on the pointing angle of the radar devices and the chosen maximum return as described above. It will also be able to determine its lateral position on the roadway based on the measured distance from the radar to the reflector.

Each reflector pole will have multiple reflectors determined by intersections of the radar beam from the vehicle traveling in the closest and furthest lanes. The spacing of reflectors on the pole would be determined by the pixel diameter of the radar beam. For example, a typical situation may require radar reflectors beginning at 4 m from the ground and ending at 12 m with a reflector every one-meter. For the initial demonstrations it is expected that existing structures will be used. The corner cube radar reflectors are very inexpensive so therefore the infrastructure investment will be small as long as existing structures can be used. In the downtown areas of cities, buildings etc. can also be used as reflector locations.

To summarize this aspect of the invention, an inexpensive infrastructure installation concept is provided which will permit a vehicle to send a radar pulse and receive a reflection wherein the reflection is identifiable as the reflection from the vehicle's own radar and contains information to permit an accurate distance measurement. The vehicle can thus locate itself accurately longitudinally and laterally along the road.

While the invention has been illustrated and described in detail in the drawings and the foregoing description, the same is to be considered as illustrative and not restrictive in character, it being understood that only the preferred embodiments have been shown and described and that all changes and modifications that come within the spirit of the invention are desired to be protected.

We claim:

1. An arrangement for attaching to a vehicle to enable mapping of a road during travel of the vehicle, comprising:
    a first data acquisition module adapted to be arranged on a first side of the vehicle;
    a second data acquisition module adapted to be arranged on a second side of the vehicle;
    each of said modules comprising a GPS receiver and an antenna for enabling a determination of the position of the vehicle to be obtained and a linear camera adapted to provide one-dimensional images of an area on a respective one of the first and second sides of the vehicle, said linear cameras providing images of a vertical plane perpendicular to the road such that a view of the road in a direction perpendicular to the road is obtained and information about the road is obtainable from that view; and
    processor means coupled to said modules for forming a map database of the road by correlating the position of the vehicle on the road and the information about the road.

2. The arrangement of claim 1, wherein said linear camera in each of said modules comprises at least one of a linear CCD, CMOS and another light sensitive array.

3. The arrangement of claim 1, wherein said linear camera in each of said modules comprises a lens for providing a field of view from an approximate center of the vehicle to the horizon whereby said linear cameras are adapted to record one-dimensional pictures covering the entire road starting with approximately the center of a lane in which the vehicle travels and extending out to the horizon.

4. The arrangement of claim 1, wherein each of said modules further comprises a scanning laser radar adapted to transmit waves downward in a plane perpendicular to the road and receive reflected radar waves to thereby provide information about distance between said laser radar and the ground which constitutes information about the road.

5. The arrangement of claim 4, wherein in each of said modules, said laser radar is coordinated or synchronized with said linear camera to cover a common field of view.

6. The arrangement of claim 4, wherein said laser radars are pulse-modulated or tone-modulated.

7. The arrangement of claim 1, wherein each of said modules further comprises a video camera adapted to provide images of an area in front of the vehicle whereby images of an environment of the road including traffic signs and other informational displays are obtained and provide information about the road.

8. The arrangement of claim 7, wherein said video camera in each of said modules is selected from group consisting of color video cameras, high-speed video cameras, wide angle cameras, telescopic cameras, and white video cameras and infrared cameras.

9. The arrangement of claim 7, further comprising means for providing artificial illumination at least when an absence of sufficient natural illumination for obtaining images from said video cameras is detected.

10. The arrangement of claim 9, wherein said means for providing artificial illumination comprise a laser scanner adapted to illuminate a particular part of the area in front of the vehicle with a bright spot.

11. The arrangement of claim 7, further comprising a scanning laser rangefinder arranged in connection with at least one of said video cameras for determining the distance to particular objects in the images obtained by said at least one video camera whereby the distance constitutes information about the road.

12. The arrangement of claim 1, wherein each of said modules further comprises an inertial measurement unit.

13. The arrangement of claim 1, further comprising a mounting assembly for mounting said modules to the vehicle.

14. The arrangement of claim 13, wherein said mounting assembly comprises a mounting bracket for attaching each of said modules to a roof of the vehicle, a mounting bracket for attaching each of said modules to a front of the vehicle and a mounting bracket for connecting said modules together.

15. An arrangement for attaching to a vehicle to enable mapping of a road during travel of the vehicle, comprising:
    a first data acquisition module adapted to be arranged on a first side of the vehicle;
    a second data acquisition module adapted to be arranged on a second side of the vehicle;
    each of said modules comprising a GPS receiver and an antenna for enabling a determination of the position of the vehicle to be obtained and a scanning laser radar adapted to transmit waves downward in a plane perpendicular to the road and receive reflected radar waves to thereby provide information about distance between said laser radar and the ground which constitutes information about the road; and processor means coupled to said modules for forming a map database of the road by correlating the position of the vehicle on the road and the information about the road.

16. The arrangement of claim 15, wherein each of said modules further comprises a linear camera adapted to provide one-dimensional images of an area on a respective one of the first and second sides of the vehicle, said linear cameras providing images of a vertical plane perpendicular to the road such that a view of the road in a direction perpendicular to the road is obtained and information about the road is obtained from that view.

17. The arrangement of claim 16, wherein said linear camera in each of said modules comprises at least one of a linear CCD, CMOS and another light sensitive array.

18. The arrangement of claim 16, wherein said linear camera in each of said modules comprises a lens for providing a field of view from an approximate center of the vehicle to the horizon whereby said linear cameras are adapted to record one-dimensional pictures covering the entire road starting with approximately the center of a lane in which the vehicle travels and extending out to the horizon.

19. The arrangement of claim 16, wherein in each of said modules, said laser radar is coordinated or synchronized with said linear camera to cover a common field of view.

20. The arrangement of claim 15, wherein said laser radars are pulse-modulated or tone-modulated.

21. The arrangement of claim 15, wherein each of said modules further comprises a video camera adapted to provide images of an area in front of the vehicle whereby images of an environment of the road including traffic signs and other informational displays are obtained and provide information about the road.

22. The arrangement of claim 21, wherein said video camera in each of said modules is selected from a group consisting of color video cameras, high-speed video cameras, wide angle cameras, telescopic cameras, black and white video cameras and infrared cameras.

23. The arrangement of claim 21, further comprising means for providing artificial illumination at least when an absence of sufficient natural illumination for obtaining images from said video cameras is detected.

24. The arrangement of claim 23, wherein said means for providing artificial illumination comprise a laser scanner adapted to illuminate a particular part of the area in front of the vehicle with a bright spot.

25. The arrangement of claim 21, further comprising a scanning laser rangefinder arranged in connection with at least one of said video cameras for determining the distance to particular objects in the images obtained by said at least one video camera whereby the distance constitutes information about the road.

26. The arrangement of claim 15, wherein each of said modules further comprises an inertial measurement unit.

27. The arrangement of claim 15, further comprising a mounting assembly for mounting said modules to the vehicle.

28. The arrangement of claim 27, wherein said mounting assembly comprises a mounting bracket for attaching each of said modules to a roof of the vehicle, a mounting bracket for attaching each of said modules to a front of the vehicle and a mounting bracket for connecting said modules together.

29. A method for mapping a road, comprising the steps of:

arranging a first data acquisition module on a first side of the vehicle;

arranging a second data acquisition module on a second side of the vehicle, each of the modules comprising a GPS receiver and an antenna and a linear camera oriented to provide one-dimensional images in a vertical plane of an area on a respective one of the first and second sides of the vehicle;

operating the vehicle on the road while continually obtaining the position of the vehicle using the GPS receiver and antenna and obtaining images from the linear cameras of vertical planes perpendicular to the road; and forming a map database of the road by correlating the position of the vehicle on the road and information about the road obtained from the images from the linear cameras.

30. The method of claim 29, further comprising the step of arranging a lens in connection with each of the linear cameras to provide a field of view from an approximate center of the vehicle to the horizon whereby the video cameras obtain one-dimensional images covering the entire road starting with approximately the center of the road on which the vehicle travels and extending out to the horizon.

31. The method of claim 29, further comprising the steps of:

arranging a scanning laser radar in each of the modules; and while operating the vehicle, transmitting waves from the laser radars downward in a plane perpendicular to the road and receiving reflected radar waves to thereby provide information about distance between the laser radars and the ground which constitutes information about the road for use in formation of the map database.

32. The method of claim 31, further comprising the step of coordinating or synchronizing the laser radars and the linear cameras in each of the modules to cover a common field of view.

33. The method of claim 29, further comprising the steps of:

arranging a video camera in each of the modules to provide images of an area in front of the vehicle including traffic signs and other informational displays; and while operating the vehicle, obtaining images from the video cameras to thereby provide information about the road for use in formation of the map database.

34. The method of claim 33, further comprising the step of arranging a scanning laser rangefinder in connection with at least one of the video cameras for determining the distance to particular objects in the images obtained by the at least one video camera.

35. A method for mapping a road, comprising the steps of:

arranging a first data acquisition module on a first side of the vehicle;

arranging a second data acquisition module on a second side of the vehicle; each of the modules comprising a GPS receiver and an antenna and a scanning laser radar oriented to transmit waves downward in a plane perpendicular to the road and receive reflected radar waves;

operating the vehicle on the road while continually obtaining the position of the vehicle using the GPS receiver and antenna and obtaining information about the distance between the laser radars and the ground by transmitting and receiving radar waves; and forming a map database of the road by correlating the position of the vehicle on the road and the information about distance between the laser radars and the ground.

36. The method of claim 35, further comprising the steps of:

arranging a linear camera in each of the modules;

positioning the linear cameras oriented to provide one-dimensional images of a vertical plane of an area on a respective one of the first and second sides of the vehicle; and while operating the vehicle, obtaining one-dimensional images from the linear cameras to thereby provide information about the road from the images for use in formation of the map database.

37. The method of claim 36, further comprising the step of arranging a lens in connection with each of the linear cameras to provide a field of view from an approximate center of the vehicle to the horizon whereby the video cameras obtain one-dimensional images covering the entire road starting with approximately the center of the road on which the vehicle travels and extending out to the horizon.

38. The method of claim 36, further comprising the step of coordinating or synchronizing the laser radars and the linear cameras in each of the modules to cover a common field of view.

39. The method of claim 25, further comprising the steps of:

arranging a video camera in each of the modules to provide images of an area in front of the vehicle including traffic signs and other informational displays; and while operating the vehicle, obtaining images from the video cameras to thereby provide information about the road for use in formation of the map database.

40. The method of claim 39, further comprising the step of arranging a scanning laser rangefinder in connection with at least one of the video cameras for determining the distance to particular objects in the images obtained by the at least one video camera.

* * * * *